(12) United States Patent
Babaei

(10) Patent No.: US 12,095,686 B2
(45) Date of Patent: Sep. 17, 2024

(54) WIRELESS DEVICE PROCESSES FOR A SCHEDULING SECONDARY CELL OF A PRIMARY CELL

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

(21) Appl. No.: 17/691,586

(22) Filed: Mar. 10, 2022

(65) Prior Publication Data
US 2022/0294581 A1   Sep. 15, 2022

Related U.S. Application Data

(60) Provisional application No. 63/159,117, filed on Mar. 10, 2021.

(51) Int. Cl.
*H04L 5/00* (2006.01)

(52) U.S. Cl.
CPC .......... *H04L 5/0032* (2013.01); *H04L 5/0051* (2013.01)

(58) Field of Classification Search
CPC ............................ H04L 5/0051; H04L 5/0032
See application file for complete search history.

(56) References Cited

U.S. PATENT DOCUMENTS

| | | | | |
|---|---|---|---|---|
| 2012/0300715 A1* | 11/2012 | Pelletier | ............ | H04W 56/0005 370/329 |
| 2018/0124648 A1* | 5/2018 | Park | .................. | H04W 36/0005 |
| 2021/0274535 A1* | 9/2021 | Yi | .......................... | H04L 5/0032 |
| 2022/0029758 A1* | 1/2022 | Bae | ........................ | H04L 5/0033 |
| 2022/0039142 A1* | 2/2022 | Li | .......................... | H04L 5/0094 |

OTHER PUBLICATIONS

3GPP TS 38.211 V16.4.0 (Dec. 2020); Technical Specification; 3rd Generation Partnership Project; Technical Specification Group Radio Access Network; NR; Physical channels and modulation; (Release 16).
3GPP TS 38.212 V16.4.0 (Dec. 2020); Technical Specification; 3rd Generation Partnership Project; Technical Specification Group Radio Access Network; NR; Multiplexing and channel coding; (Release 16).
3GPP TS 38.213 V16.4.0 (Dec. 2020); Technical Specification; 3rd Generation Partnership Project; Technical Specification Group Radio Access Network; NR; Physical layer procedures for control; (Release 16).
3GPP TS 38.214 V16.4.0 (Dec. 2020); Technical Specification; 3rd Generation Partnership Project; Technical Specification Group Radio Access Network; NR; Physical layer procedures for data; (Release 16).

(Continued)

*Primary Examiner* — Kevin M Cunningham
(74) *Attorney, Agent, or Firm* — Alireza Babaei

(57) ABSTRACT

A wireless device may receive one or more configuration parameters indicating changing a scheduling secondary cell from a first secondary cell to a second secondary cell. A scheduling secondary cell may be for receiving scheduling information for a primary cell. The wireless device may activate the second secondary cell in response to: receiving the one or more configuration parameters, and the second secondary cell being deactivated prior to receiving the one or more configuration parameters.

20 Claims, 49 Drawing Sheets

(56) References Cited

OTHER PUBLICATIONS

3GPP TS 38.300 V16.4.0 (Dec. 2020); Technical Specification; 3rd Generation Partnership Project; Technical Specification Group Radio Access Network; NR; NR and NG-RAN Overall Description; Stage 2; (Release 16).
3GPP TS 38.321 V16.3.0 (Dec. 2020); Technical Specification; 3rd Generation Partnership Project; Technical Specification Group Radio Access Network; NR; Medium Access Control (MAC) protocol specification; (Release 16).
3GPP TS 38.331 V16.3.1 (Jan. 2021); Technical Specification; 3rd Generation Partnership Project; Technical Specification Group Radio Access Network; NR; Radio Resource Control (RRC); Protocol specification; (Release 16).
3GPP TSG RAN WG1 Meeting #103-e; R1-2007579; E-meeting, Oct. 26-Nov. 13, 2020; Agenda Item: 8.13.1; Source: Huawei, HiSilicon; Title: Discussion on SCell PDCCH scheduling P(S)Cell PDSCH or PUSCH; Document for: Discussion and Decision.
3GPP TSG RAN WG1 #103-e; R1-2007695; e-Meeting, Oct. 26-Nov. 13, 2020; Source: vivo; Title: Discussion on Scell scheduling P(S)cell; Agenda Item: 8.13.1; Document for: Discussion and Decision.
3GPP TSG RAN WG1 #103-e; R1-2007839; e-Meeting, Oct. 26-Nov. 13, 2020; Source: CATT; Title: Discussion on cross-carrier scheduling from Scell to Pcell; Agenda Item: 8.13.1; Document for: Discussion and Decision.
3GPP TSG RAN WG1 #103-e; R1-2008062; e-Meeting, Oct. 26-Nov. 13, 2020; Agenda Item: 8.13.1; Source: LG Electronics; Title: Discussion on cross-carrier scheduling from SCell to PCell; Document for: Discussion and decision.
3GPP TSG RAN WG1 #103-e; R1-2008110; e-Meeting, Oct. 26-Nov. 13, 2020; Agenda item: 8.13.1; Source: Spreadtrum Communications; Title: Discussion on cross-carrier scheduling from SCell to Pcell; Document for: Discussion and decision.
3GPP TSG RAN WG1 #103-e; R1-2008195; e-Meeting, Oct. 26-Nov. 13, 2020; Agenda item: 8.13.1; Source: Samsung; Title: Cross-carrier scheduling from SCell to PCell; Document for: Discussion and decision.
3GPP TSG RAN WG1 #103-e; R1-2008284; e-Meeting, Oct. 26-Nov. 13, 2020; Source: OPPO; Title: Discussion on cross-carrier scheduling for Scell to Pcell; Agenda Item: 8.13.1; Document for: Discussion and Decision.
3GPP TSG-RAN WG1 Meeting #103-e; R1-2008451; e-Meeting, Oct. 26-Nov. 13, 2020; Agenda Item: 8.13.1; Source: Apple Inc.; Title: Views on Rel-17 DSS SCell scheduling PCell; Document for: Discussion/Decision.
3GPP TSG RAN WG1 #103; R1-2008695; e-Meeting, Oct. 26-Nov. 13, 2020; Agenda Item: 8.13.1; Source: ASUSTeK; Title: Discussion on cross-carrier scheduling from SCell to PCell; Document for: Discussion and Decision.
3GPP TSG RAN WG1 Meeting #103-e; R1-2008830; e-Meeting, Oct. 26-Nov. 13, 2020; Source: ZTE; Title: Discussion on Cross-Carrier Scheduling from SCell to PCell; Agenda item: 8.13.1; Document for: Discussion/Decision.
3GPP TSG RAN WG1 Meeting #103_e; R1-2009003; e-Meeting, Oct. 26-Nov. 13, 2020; Agenda Item: 8.13.1; Source: Intel Corporation; Title: On SCell scheduling PCell transmissions; Document for: Discussion/Decision.
3GPP TSG RAN WG1 #103-e; R1-2009023; e-Meeting, Oct. 26-Nov. 13, 2020; Source: ETRI; Title: Cross-carrier scheduling from SCell to PCell; Agenda Item: 8.13.1 Cross-carrier scheduling (from Scell to Pcell); Document for: Discussion/Decision.
3GPP TSG-RAN WG1 #103-e; R1-2009040; e-Meeting, Oct. 26-Nov. 13, 2020; Source: Xiaomi; Title: Discussion on Cross-carrier scheduling from SCell to PCell; Agenda Item: 8.13.1; Document for: Discussion.
3GPP TSG RAN WG1 #103; R1-2009046; e-Meeting, Oct. 26-Nov. 13, 2020; Agenda item: 8.13.1; Source: Nokia, Nokia Shanghai Bell; Title: Cross-carrier scheduling from SCell to PCell; Document for: Discussion and Decision.
3GPP TSG RAN WG1 #103-e; R1-2009085; e-Meeting, Oct. 26-Nov. 13, 2020; Agenda Item: 8.13.1; Source: InterDigital, Inc.; Title: Search space monitoring to support SCell scheduling PCell; Document for: Discussion and Decision.
3GPP TSG RAN WG1 #103-e; R1-2009110; e-Meeting, Oct. 26-Nov. 13, 2020; Agenda Item: 8.13.1; Source: Lenovo, Motorola Mobility; Title: Cross-carrier scheduling (from Scell to Pcell); Document for: Discussion.
3GPP TSG-RAN WG1 #103-e; R1-2009206; eMeeting, Oct. 26-Nov. 13, 2020; Source: Ericsson; Title: Enhanced cross-carrier scheduling for DSS; Agenda Item: 8.13.1; Document for: Discussion and Decision.
3GPP TSG RAN WG1 Meeting #103-e; R1-2009277; E-meeting, Oct. 26-Nov. 13, 2020; Source: Qualcomm Incorporated; Title: Views on cross-carrier scheduling from an SCell to the PCell/PSCell; Agenda Item: 8.13.1; Document for: Discussion and Decision.
3GPP TSG RAN WG1 Meeting #104-e; R1-2100110; e-Meeting, Jan. 25-Feb. 5, 2021; Source: ZTE; Title: Discussion on Cross-Carrier Scheduling from SCell to PCell; Agenda item: 8.13.1; Document for: Discussion/Decision.
3GPP TSG RAN WG1 #104-e; R1-2100186; e-Meeting, Jan. 25-Feb. 5, 2021; Source: OPPO; Title: Discussion on cross-carrier scheduling from Scell to Pcell; Agenda Item: 8.13.1; Document for: Discussion and Decision.
3GPP TSG RAN WG1 Meeting #104-e; R1-2100193; E-meeting, Jan. 25-Feb. 5, 2021; Agenda Item: 8.13.1; Source: Huawei, HiSilicon; Title: Discussion on SCell PDCCH scheduling P(S)Cell PDSCH or PUSCH; Document for: Discussion and Decision.
3GPP TSG RAN WG1 #104-e; R1-2100358; e-Meeting, Jan. 25-Feb. 5, 2021; Source: CATT; Title: Discussion on cross-carrier scheduling from Scell to Pcell; Agenda Item: 8.13.1; Document for: Discussion and Decision.
3GPP TSG RAN WG1 #104-e; R1-2100473; e-Meeting, Jan. 25-Feb. 5, 2021; Source: vivo; Title: Discussion on Scell scheduling P(S)cell; Agenda Item: 8.13.1; Document for: Discussion and Decision.
3GPP TSG RAN WG1 Meeting #104_e; R1-2100677; e-Meeting, Jan. 25-Feb. 5, 2021; Agenda Item: 8.13.1; Source: Intel Corporation; Title: On SCell scheduling PCell transmissions; Document for: Discussion/Decision.
3GPP TSG RAN WG1 #104-e; R1-2100694; e-Meeting, Jan. 25-Feb. 5, 2021; Agenda Item: 8.13.1; Source: NEC; Title: Discussion on cross carrier scheduling for NR DSS; Document for: Discussion.
3GPP TSG RAN WG1 #104; R1-2100719; e-Meeting, Jan. 25-Feb. 5, 2021; Agenda item: 8.13.1; Source: Nokia, Nokia Shanghai Bell; Title: Cross-carrier scheduling from sSCell to PCell; Document for: Discussion and Decision.
3GPP TSG RAN WG1 #104-e; R1-2100794; e-Meeting, Jan. 25-Feb. 5, 2021; Agenda item: 8.13.1; Source: Spreadtrum Communications; Title: Discussion on cross-carrier scheduling from SCell to Pcell; Document for: Discussion and decision.
3GPP TSG RAN WG1 #104-e; R1-2100885; e-Meeting, Jan. 25-Feb. 5, 2021; Agenda Item: 8.13.1; Source: LG Electronics; Title: Discussion on cross-carrier scheduling from SCell to PCell; Document for: Discussion and decision.
3GPP TSG RAN WG1 #104-e; R1-2100992; e-Meeting, Jan. 25-Feb. 5, 2021; Agenda Item: 8.13.1; Source: Lenovo, Motorola Mobility; Title: Cross-carrier scheduling (from Scell to Pcell); Document for: Discussion.
3GPP TSG RAN WG1 #104-e; R1-2101066; e-Meeting, Jan. 25-Feb. 5, 2021; Source: CMCC; Title: Discussion on cross-carrier scheduling from SCell to Pcell; Agenda item: 8.13.1; Document for: Discussion & Decision.
3GPP TSG RAN WG1 #104-e; R1-2101088; e-Meeting, Jan. 25-Feb. 5, 2021; Source: ETRI; Title: Cross-carrier scheduling from SCell to PCell; Agenda Item: 8.13.1 Cross-carrier scheduling (from Scell to Pcell); Document for: Discussion/Decision.
3GPP TSG RAN WG1 #104-e; R1-2101100; e-Meeting, Jan. 25-Feb. 5, 2021; Agenda item: 8.13.1; Source: Xiaomi; Title: Discussion on Cross-carrier scheduling from SCell to PCell; Document for: Discussion.

(56) References Cited

OTHER PUBLICATIONS

3GPP TSG RAN WG1 #104-e; R1-2101237; e-Meeting, Jan. 25-Feb. 5, 2021; Agenda item: 8.13.1; Source: Samsung; Title: Cross-carrier scheduling from SCell to PCell; Document for: Discussion and decision.

3GPP TSG RAN WG1 #104-e; R1-2101292; e-Meeting, Jan. 25-Feb. 5, 2021; Agenda Item: 8.13.1; Source: InterDigital, Inc.; Title: USS monitoring in sSCell and PCell; Document for: Discussion and Decision.

3GPP TSG RAN WG1 #104-e; R1-2101362; e-Meeting, Jan. 25-Feb. 5, 2021; Agenda Item: 8.13.1; Source: Apple Inc.; Title: Views on Rel-17 DSS SCell scheduling PCell; Document for: Discussion/Decision.

3GPP TSG RAN WG1 Meeting #104-e; R1-2101490; E-meeting, Jan. 25-Feb. 5, 2021; Source: Qualcomm Incorporated; Title: Cross-carrier scheduling from an SCell to the PCell/PSCell; Agenda Item: 8.13.1; Document for: Discussion and Decision.

3GPP TSG RAN WG1 #104-e; Tdoc R1-2101561; e-Meeting, Jan. 25-Feb. 5, 2021; Source: Ericsson; Title: Enhanced cross-carrier scheduling for DSS; Agenda Item: 8.13.1; Document for: Discussion and Decision.

3GPP TSG RAN WG1#104-e; R1-2101632; e-Meeting, Jan. 25-Feb. 5, 2021; Source: NTT DOCOMO, Inc.; Title: Discussion on cross-carrier scheduling enhancements for NR DSS; Agenda Item: 8.13.1; Document for: Discussion and Decision.

3GPP TSG RAN WG1 #104; R1-2101655; e-Meeting, Jan. 25-Feb. 5, 2021; Agenda Item: 8.13.1; Source: ASUSTek; Title: Discussion on cross-carrier scheduling from SCell to PCell; Document for: Discussion and Decision.

\* cited by examiner

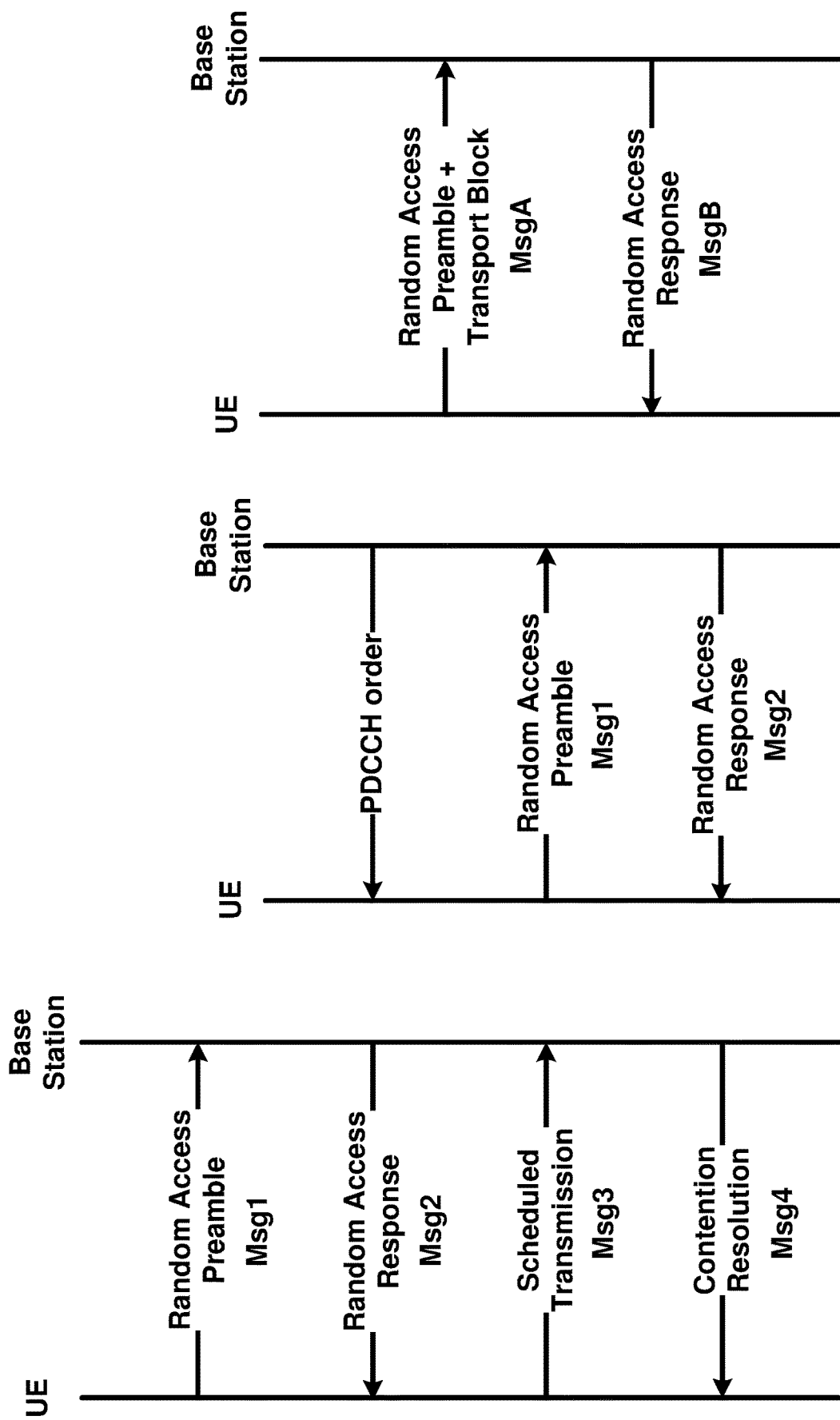

```
┌─────────────────────────────────────────────────────────────┐
│ Receive 1st message(s) comprising 1st configuration         │
│ parameter(s) indicating that a 1st secondary cell is a      │
│ scheduling secondary cell for a primary cell                │
│                                                             │
│ Receiving scheduling information for an UL transmission or  │
│ a DL transmission via the primary cell is based on          │
│ monitoring search space(s) of a scheduling secondary cell   │
│                            3410                             │
└─────────────────────────────────────────────────────────────┘
                              │
                              ▼
┌─────────────────────────────────────────────────────────────┐
│ Receive 2nd message(s) comprising 2nd configuration         │
│ parameter(s) indicating changing the scheduling secondary   │
│ cell                                                        │
│                            3420                             │
└─────────────────────────────────────────────────────────────┘
                              │
                              ▼
┌─────────────────────────────────────────────────────────────┐
│ Activate a second secondary cell in response to:            │
│                                                             │
│ receiving the 2nd message(s),                               │
│                                                             │
│ the 2nd configuration parameter(s) indicating changing the  │
│ scheduling secondary cell from the 1st secondary cell to    │
│ the 2nd secondary cell, and                                 │
│                                                             │
│ the 2nd secondary cell being deactivated prior ti receiving │
│ the 2nd message(s)                                          │
│                            3430                             │
└─────────────────────────────────────────────────────────────┘
```

FIG. 34

Receive message(s) comprising configuration parameter(s) indicating changing a scheduling secondary cell from a 1st secondary cell to a 2nd secondary cell Receiving scheduling information for an UL transmission or a DL transmission via a primary cell is based on monitoring search space(s) of a scheduling secondary cell

3510

Activate the 2nd secondary cell in response to:

receiving the message(s), and the 2nd secondary cell being deactivated prior to receiving the 2nd message(s)

Receive configuration parameter(s) indicating changing a scheduling secondary cell from a 1st secondary cell to a 2nd secondary cell A scheduling secondary cell is for receiving scheduling information for a primary cell

3610

Activate the 2nd secondary cell in response to:

receiving the configuration parameter(s), and the 2nd secondary cell being deactivated prior to receiving the configuration parameter(s)

Receive RRC message(s) comprising a configuration parameter indicating a BWP identifier of a 1st active BWP of a secondary cell

4110

Switch to the 1st active BWP as an active BWP of the secondary cell in response to:

receiving the RRC message(s); and the 1st secondary cell being configured as a scheduling secondary cell for a primary cell.

4120

```
┌─────────────────────────────────────────────────────┐
│                                                     │
│  Receive configuration parameters of 1st search     │
│  space(s) of a primary cell and 2nd search          │
│  space(s) of a secondary cell                       │
│                                                     │
│  The 1st search space(s) and the 2nd search         │
│  space(s) are associated with receiving scheduling  │
│  information for the primary cell                   │
│                                                     │
│                      4410                           │
│                                                     │
└─────────────────────────────────────────────────────┘
                          │
                          ▼
┌─────────────────────────────────────────────────────┐
│                                                     │
│  Determine, based on the configuration parameters:  │
│                                                     │
│  1st monitoring occasions for monitoring the 1st    │
│  search space(s)                                    │
│                                                     │
│  2nd monitoring occasions for monitoring the 2nd    │
│  search space(s)                                    │
│                                                     │
│                      4420                           │
│                                                     │
└─────────────────────────────────────────────────────┘
                          │
                          ▼
┌─────────────────────────────────────────────────────┐
│                                                     │
│  Based on a 1st monitoring occasion of the 1st      │
│  monitoring occasions and a 2nd monitoring          │
│  occasion of the 2nd monitoring occasions           │
│  overlapping in the symbol(s):                      │
│                                                     │
│  monitor the 1st search space(s) in the 1st         │
│  monitoring occasion and not monitor the 2nd        │
│  search space(s) in the 2nd monitoring              │
│  occasion; or                                       │
│                                                     │
│  monitor the 2nd search space(s) in the 2nd         │
│  monitoring and not monitor the 1st search          │
│  space(s) in the 1st monitoring occasion            │
│                                                     │
│                      4430                           │
│                                                     │
└─────────────────────────────────────────────────────┘
```

FIG. 44

Receive configuration parameters of cells comprising a 1st secondary cell and a primary cell The 1st secondary cell is a scheduling cell of a primary cell The 1st secondary cell and the primary cell are in the same PUCCH group

4510

Receive a 1st TB via the primary cell based on a 1st DCI received via the primary cell

4520

Receive a 2nd TB via the primary cell based on a 2nd DCI received via the 1st secondary cell

4530

Transmit a 1st HARQ feedback, associated with the 1st TB, and a 2nd HARQ feedback, associated with the 2nd TB, via one or more cells in the PUCCH group

```
┌─────────────────────────────────────────────────────────────┐
│  Receive configuration parameters indicating that a 1st     │
│        secondary cell is a scheduling cell of a primary cell│
│                                                             │
│                           4610                              │
└─────────────────────────────────────────────────────────────┘
                              │
                              ▼
┌─────────────────────────────────────────────────────────────┐
│  Receive, in a 1st timing via the 1st secondary cell, 1st   │
│  scheduling information for an UL or a DL transmission of a │
│                    1st TB via the primary cell              │
│                                                             │
│                           4620                              │
└─────────────────────────────────────────────────────────────┘
                              │
                              ▼
┌─────────────────────────────────────────────────────────────┐
│  Receive, in a 2nd timing that overlaps with the 1st timing │
│  and via the primary cell, 2nd scheduling information for   │
│    an UL or a DL transmission of a 2nd TB via the primary   │
│                             cell                            │
│                                                             │
│  A relative timing of a 3rd timing of the 2nd TB and a 4th  │
│  timing of the 1st TB is based on the 2nd timing and the    │
│                    1st timing overlapping.                  │
│                                                             │
│                           4630                              │
└─────────────────────────────────────────────────────────────┘
```

FIG. 46

Transmit, to a BS, capability message(s) comprising IEs indicating that the wireless device is capable of monitoring for scheduling information of DL or UL transmissions on a primary cell, on the primary cell and the scheduling secondary cell during a time window associated with a first process on the primary cell

4810

Receive configuration parameters of 1st search space(s) of a primary cell and 2nd search space(s) of a secondary cell The 1st search space(s) and the 2nd search space(s) are associated with scheduling UL or DL transmissions on the primary cell

4820

Monitor the 1st search space(s) and the 2nd search space(s) during the time window associated with the 1st process on the primary cell

4830

Transmit or receive a TB via the primary cell

WIRELESS DEVICE PROCESSES FOR A SCHEDULING SECONDARY CELL OF A PRIMARY CELL

CROSS-REFERENCE TO RELATED APPLICATIONS

This application claims the benefit of U.S. Provisional Application No. 63/159,117, filed Mar. 10, 2021, which is hereby incorporated by reference in its entirety.

BRIEF DESCRIPTION OF THE DRAWINGS

FIG. 12A, FIG. 12B and FIG. 12C show example random access processes in accordance with several of various embodiments of the present disclosure.

FIG. 34 shows an example flow diagram in accordance with several of various embodiments of the present disclosure.

FIG. 35 shows an example flow diagram in accordance with several of various embodiments of the present disclosure.

FIG. 36 shows an example flow diagram in accordance with several of various embodiments of the present disclosure.

FIG. 44 shows an example flow diagram in accordance with several of various embodiments of the present disclosure.

FIG. 45 shows an example flow diagram in accordance with several of various embodiments of the present disclosure.

FIG. 46 shows an example flow diagram in accordance with several of various embodiments of the present disclosure.

FIG. 48 shows an example flow diagram in accordance with several of various embodiments of the present disclosure.

DETAILED DESCRIPTION

The exemplary embodiments of the disclosed technology enable processes for a wireless device and/or one or more base stations for carrier aggregation. The exemplary disclosed embodiments may be implemented in the technical field of wireless communication systems. More particularly, the embodiments of the disclosed technology may enhance processes associated with scheduling of a primary cell from a scheduling secondary cell.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
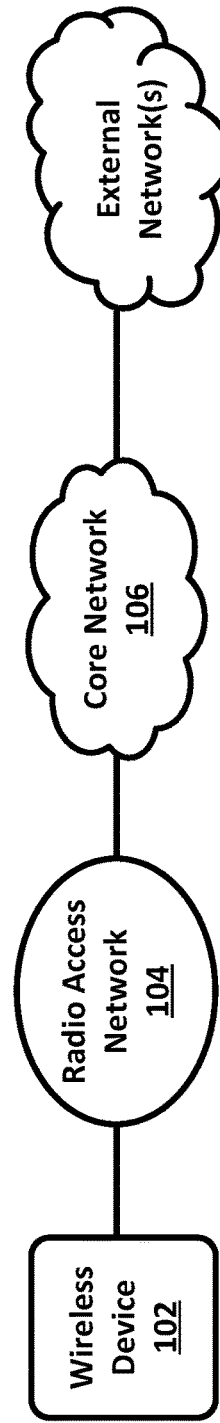
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some examples, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
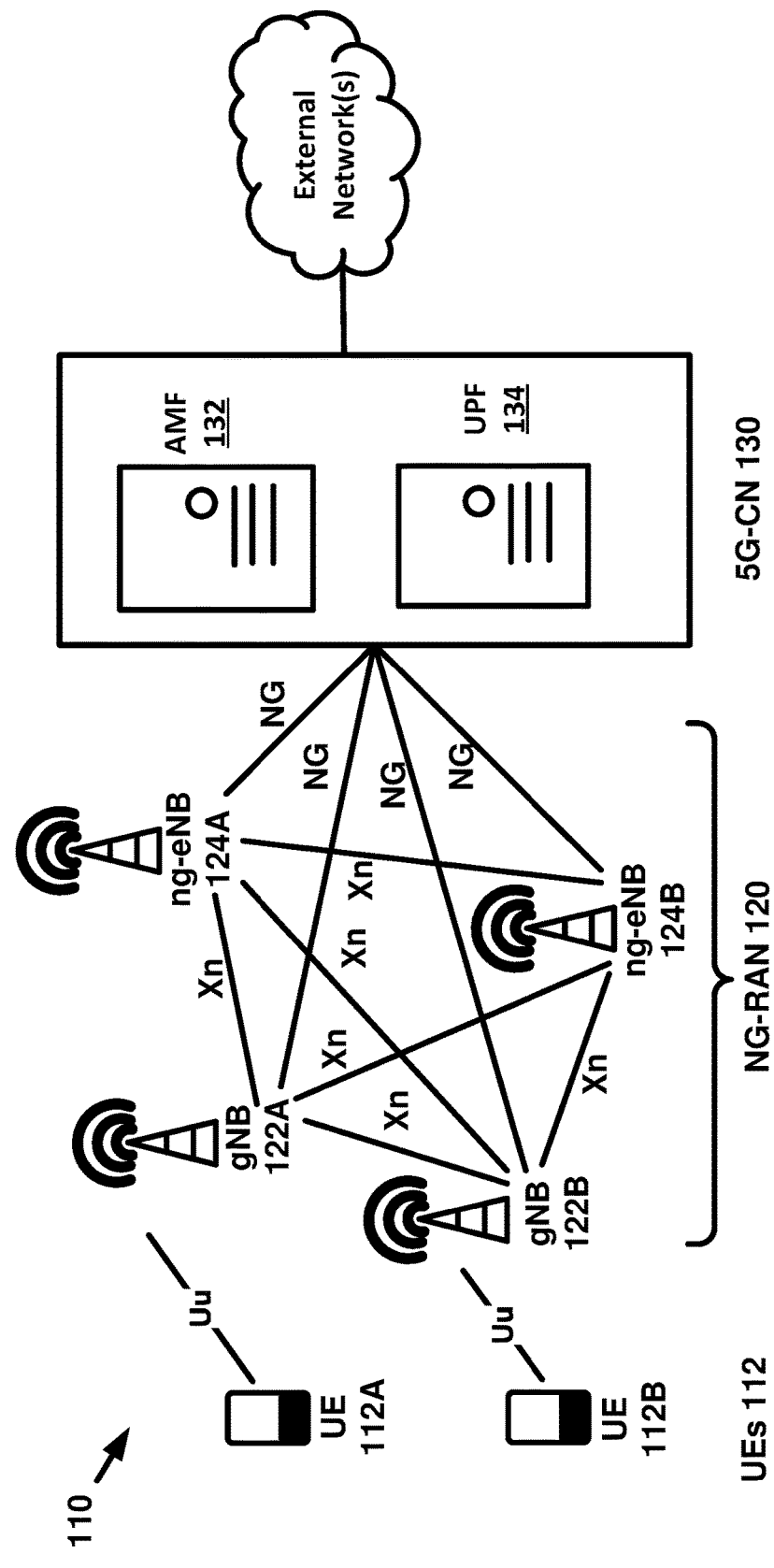

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNB s 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNB s 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
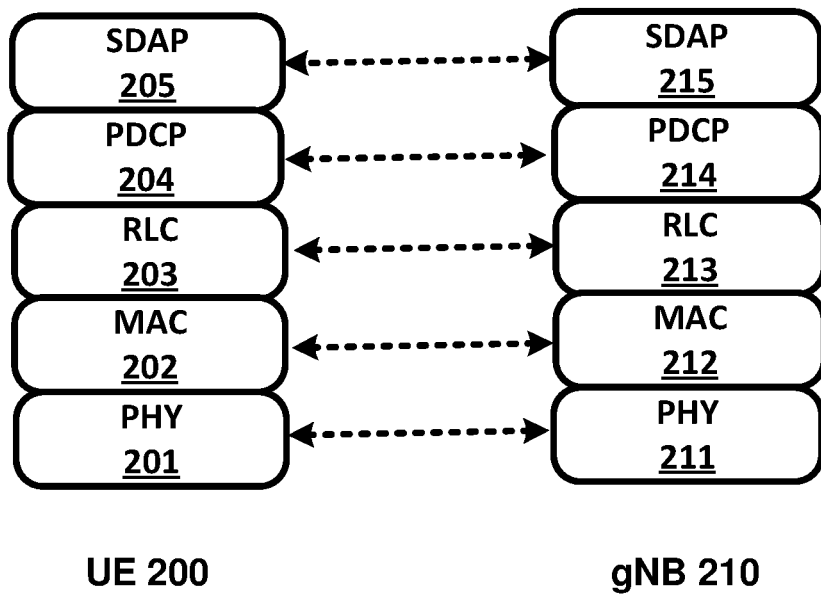
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
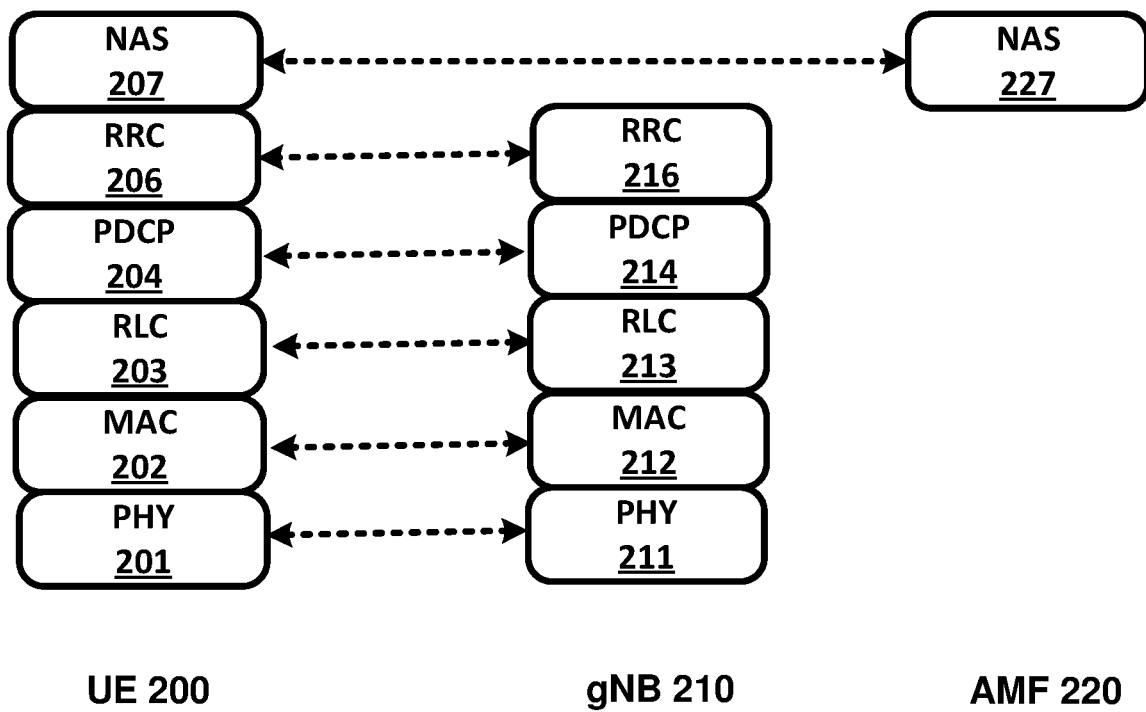

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
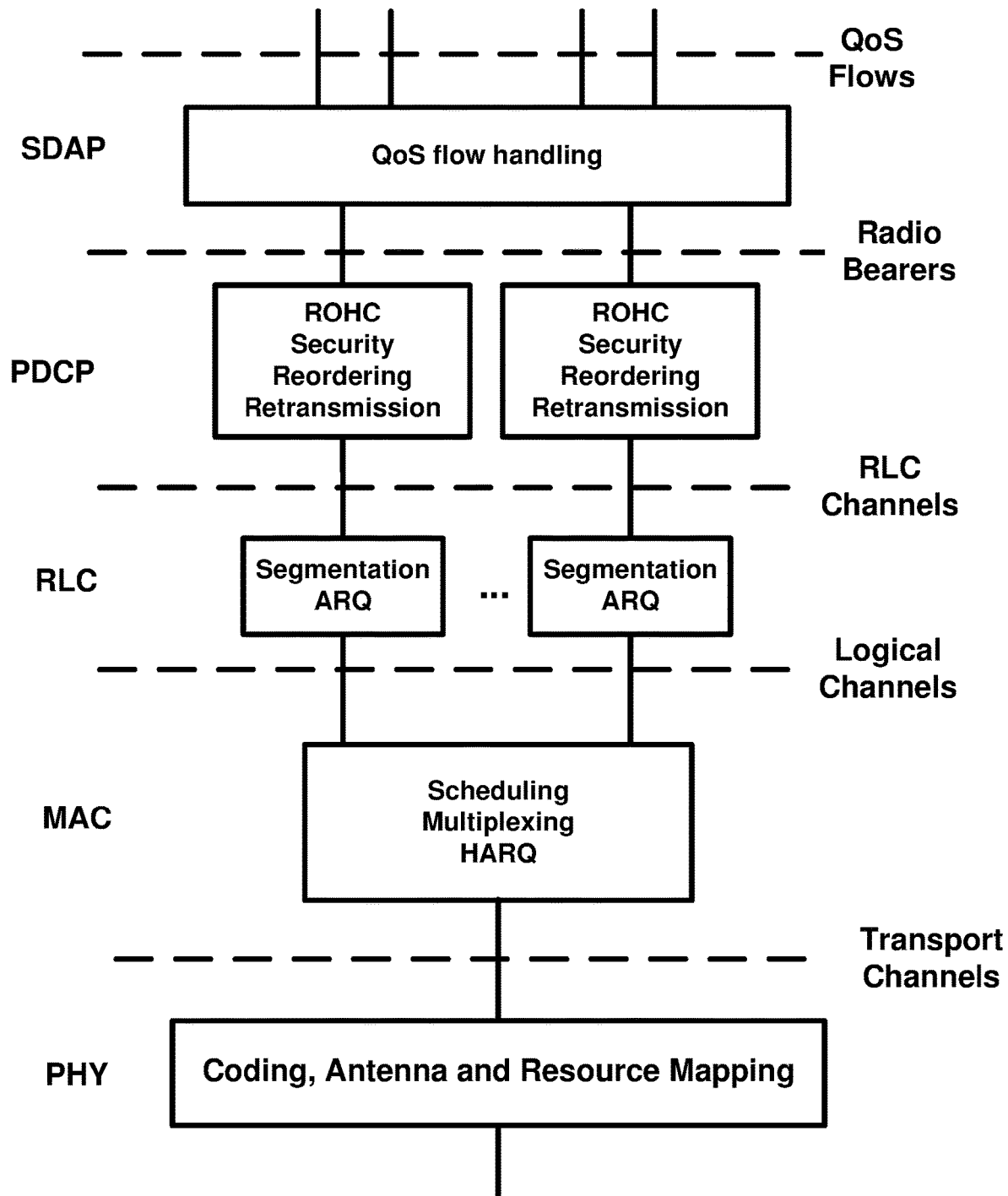
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
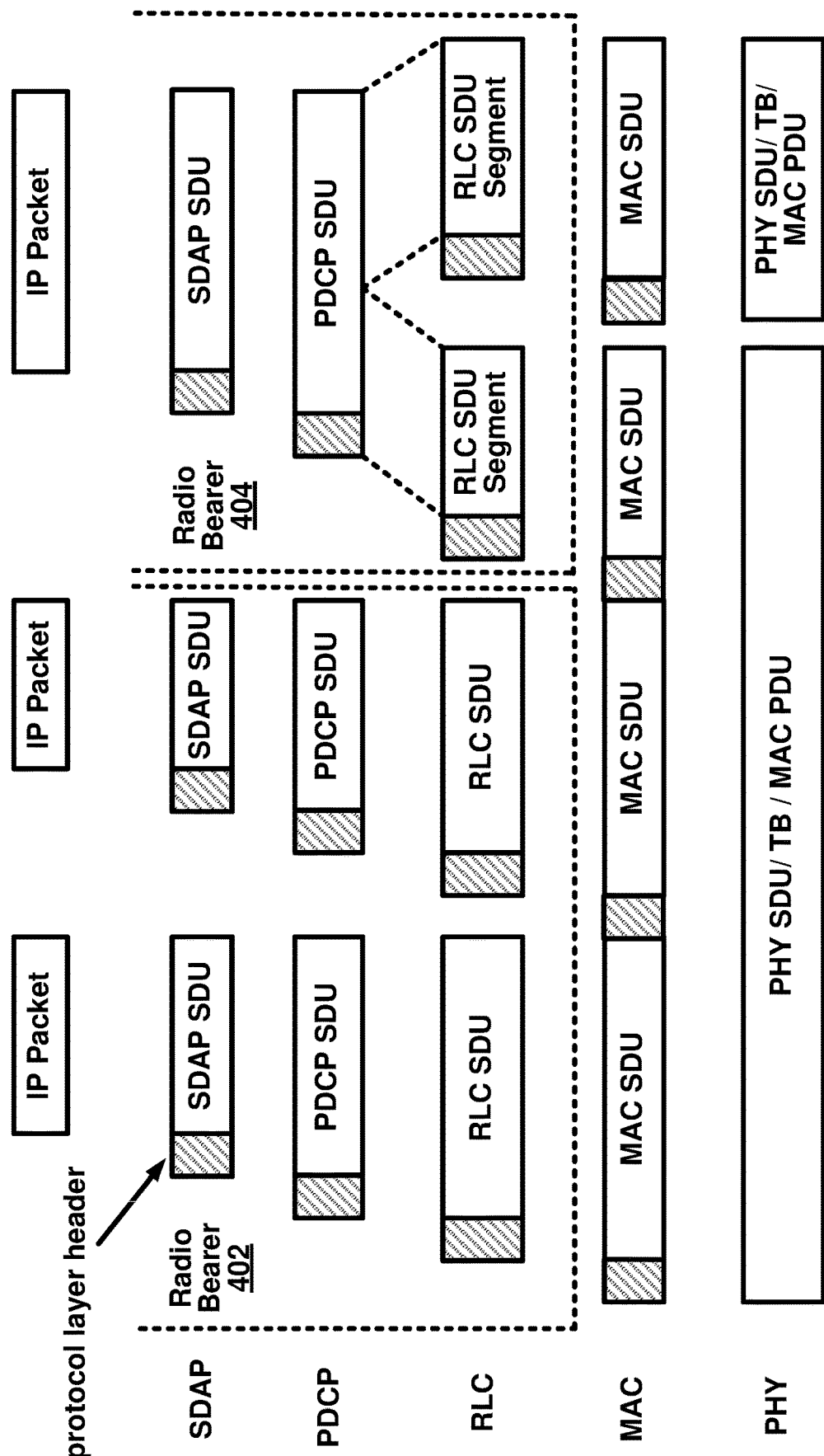
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
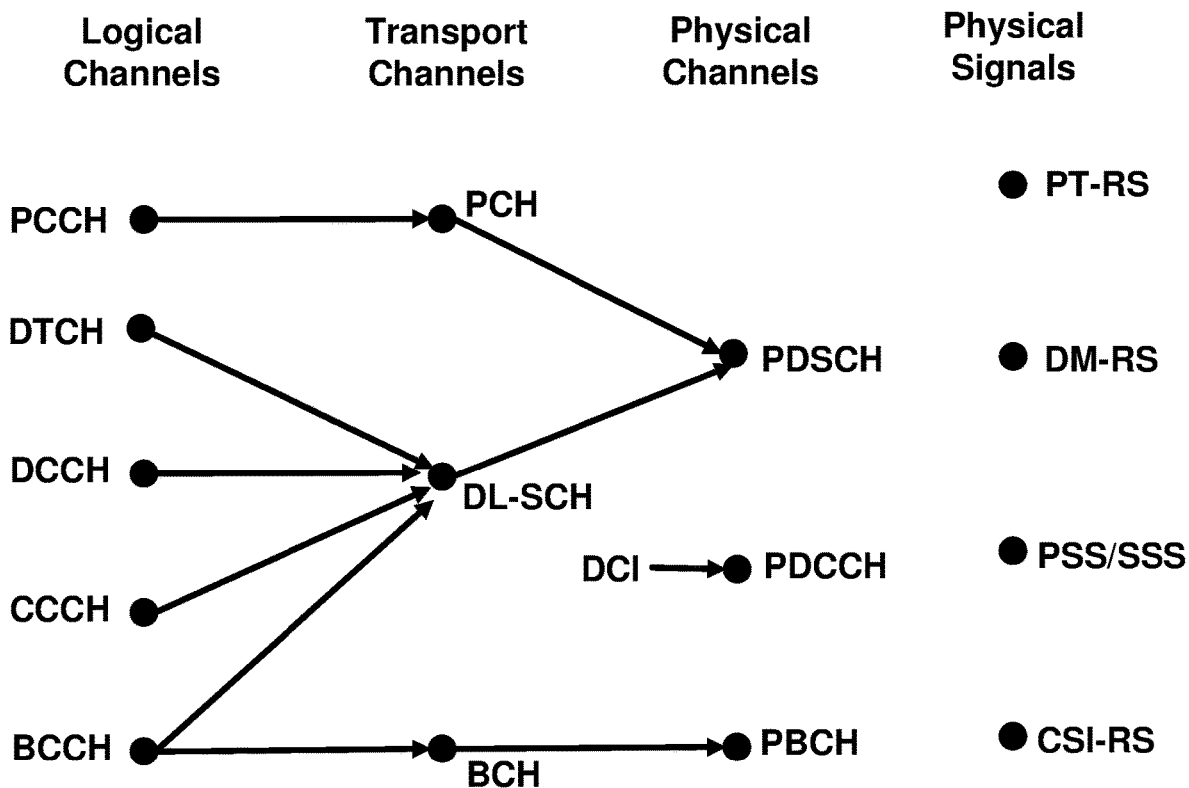
FIG. 5A shows example mapping of channels between layers of the protocol stack and different physical signals in downlink in accordance with several of various embodiments of the present disclosure.
Figure 5B:
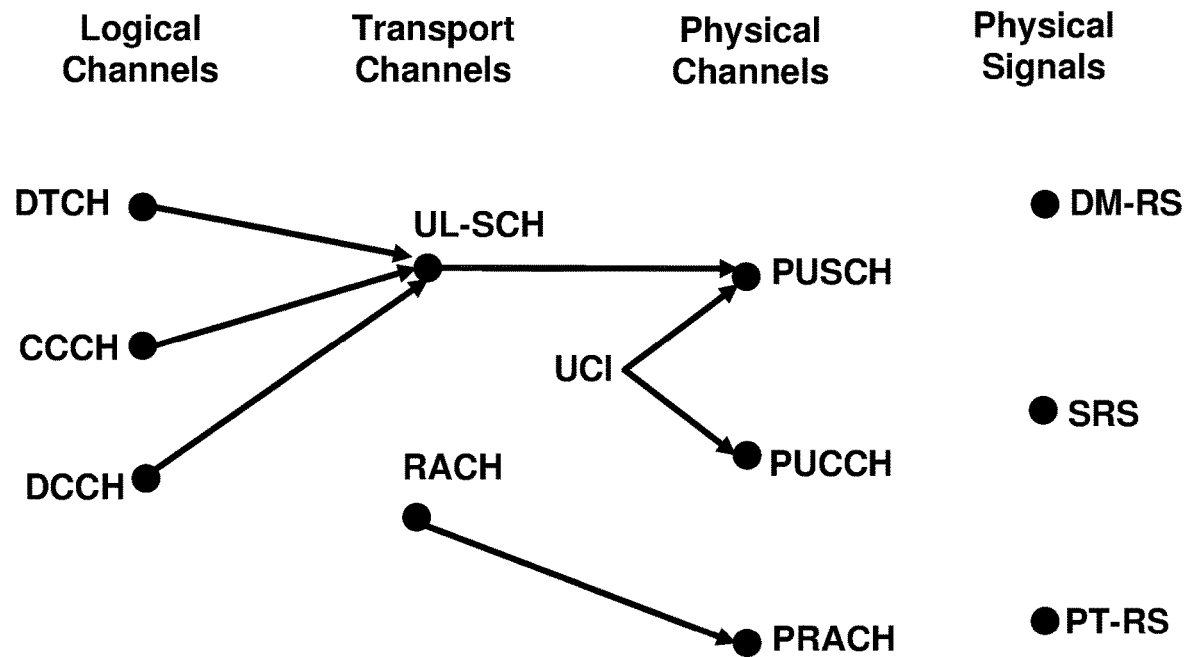
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
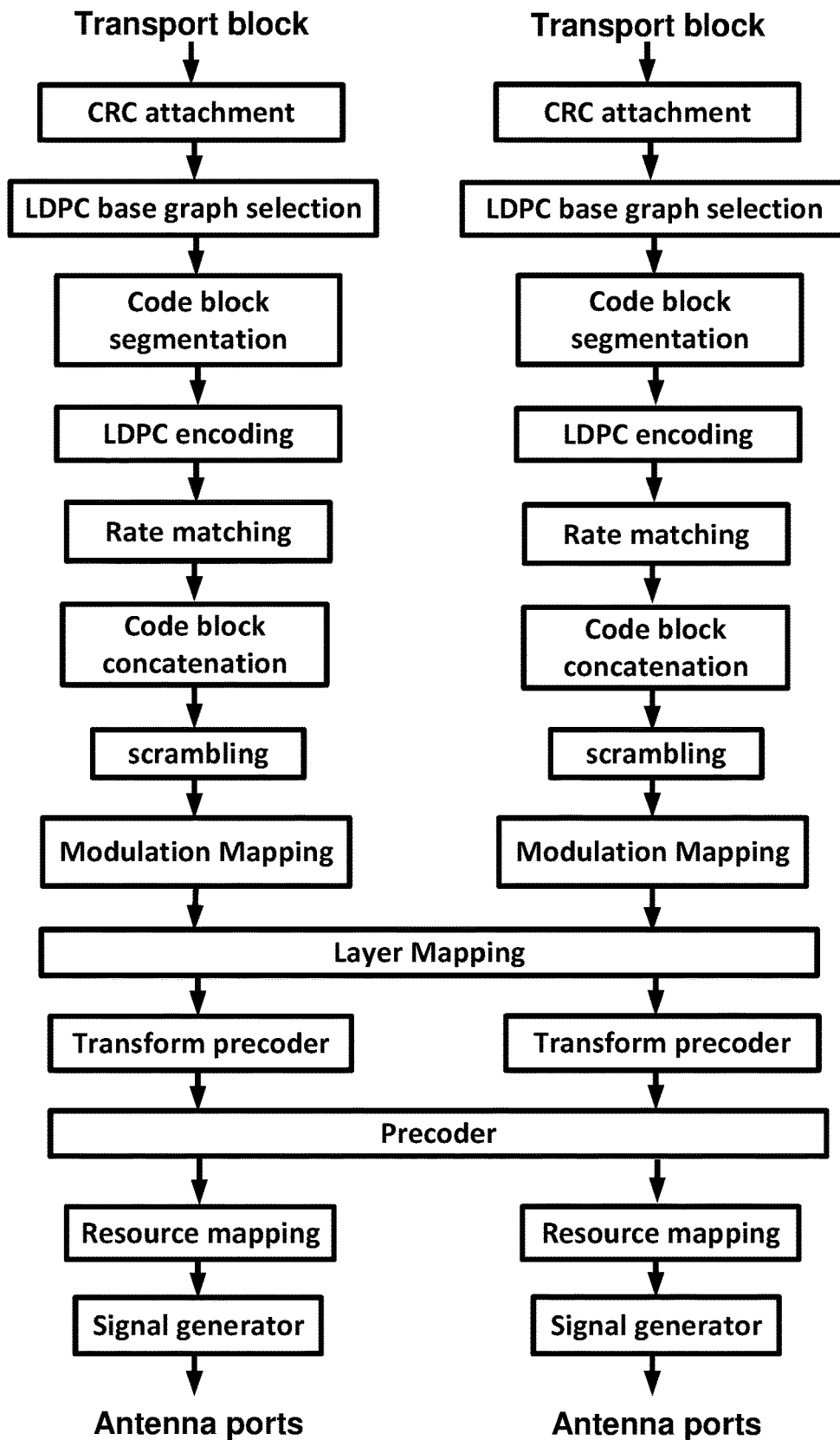
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
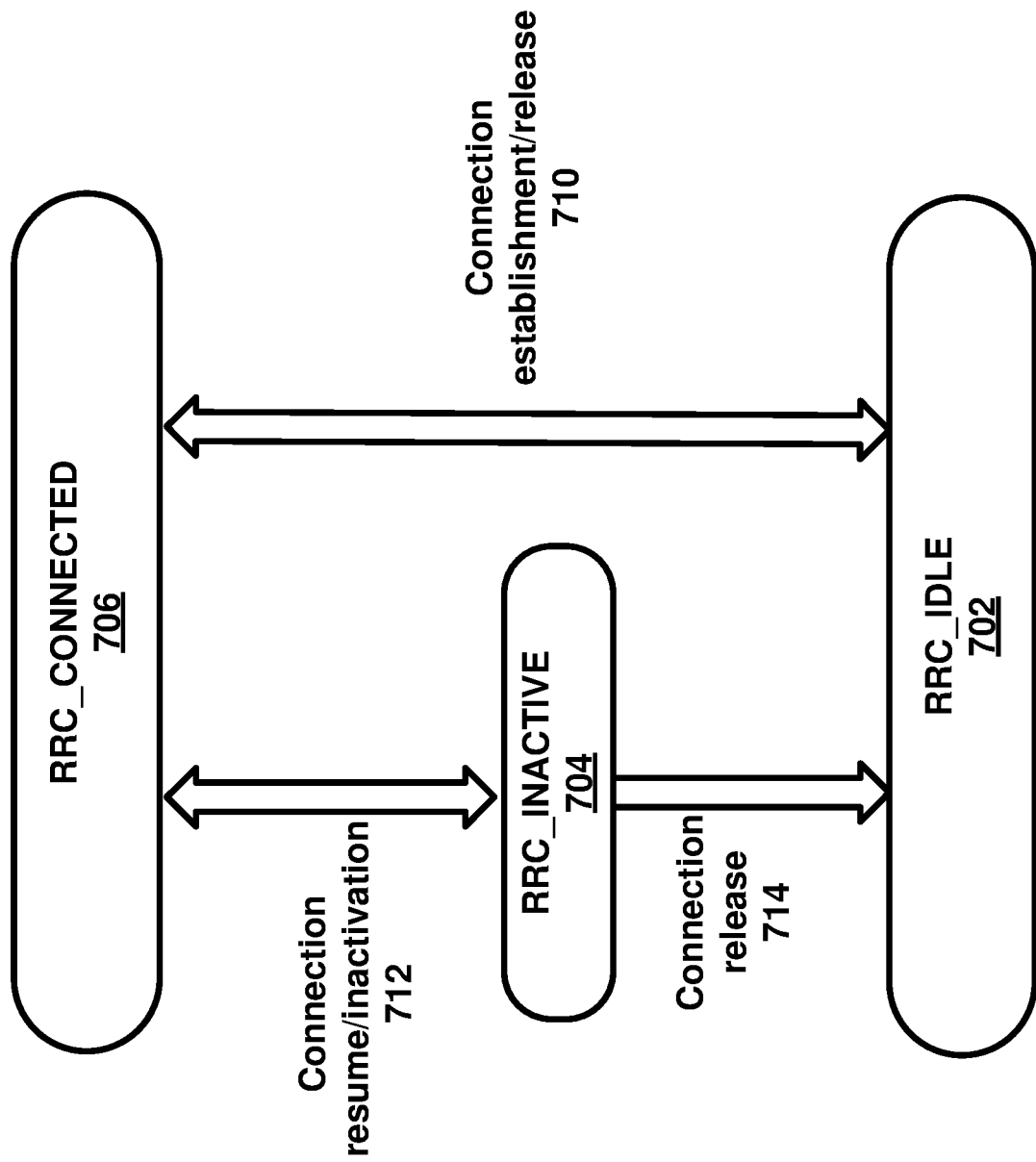
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), n/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu = 0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g., the μ value).

Figure 8:
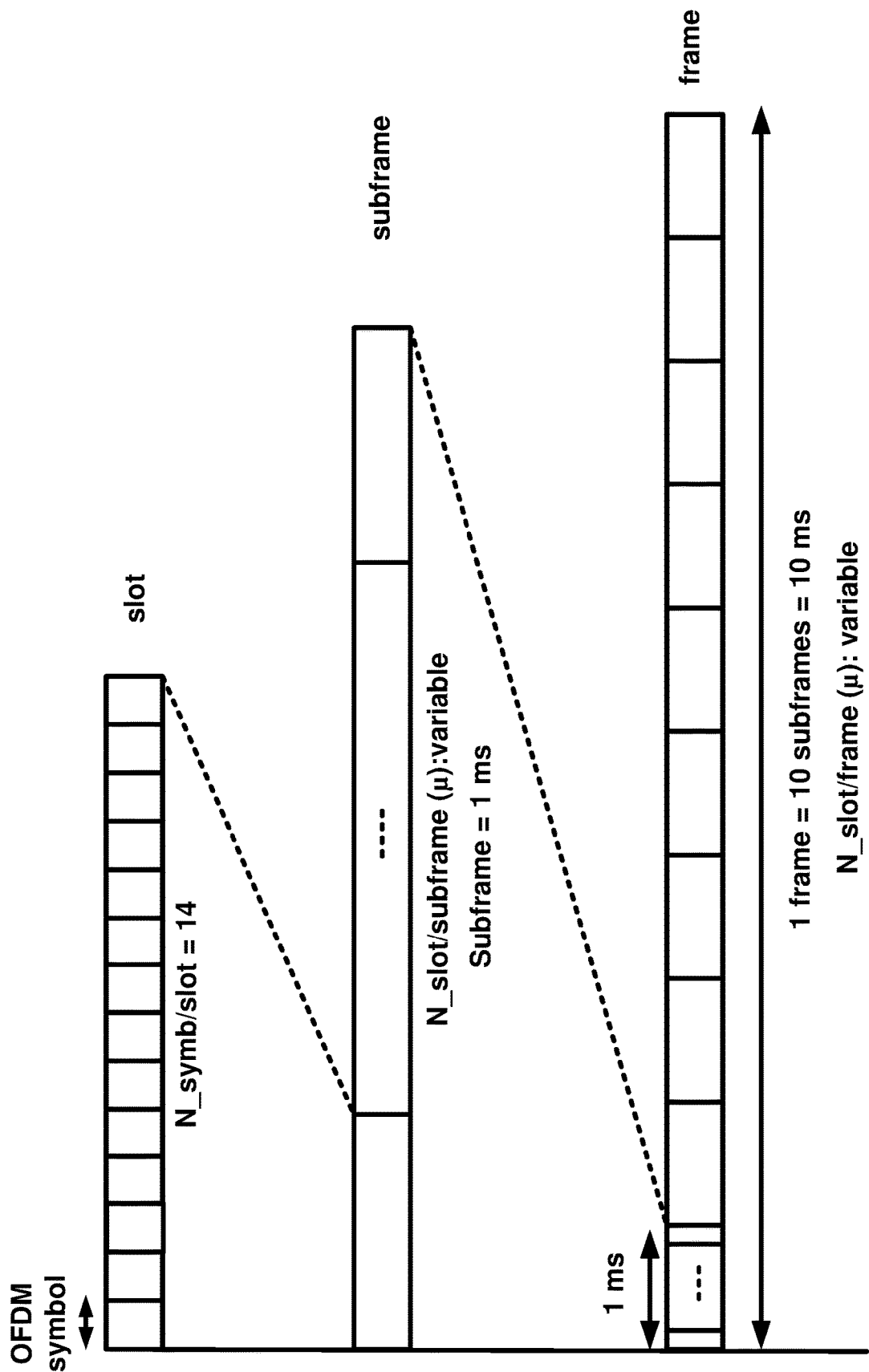
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{smyb}^{slot}$ OFDM symbols, wherein the $N_{smyb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of μ and may generally expressed as $N_{slot}^{subframe,\mu}$ and the number of symbols per subframe may be expressed as $N_{symb}^{subframe,\mu} = N_{smyb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{subframe,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RSsymbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RSsymbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RSsymbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
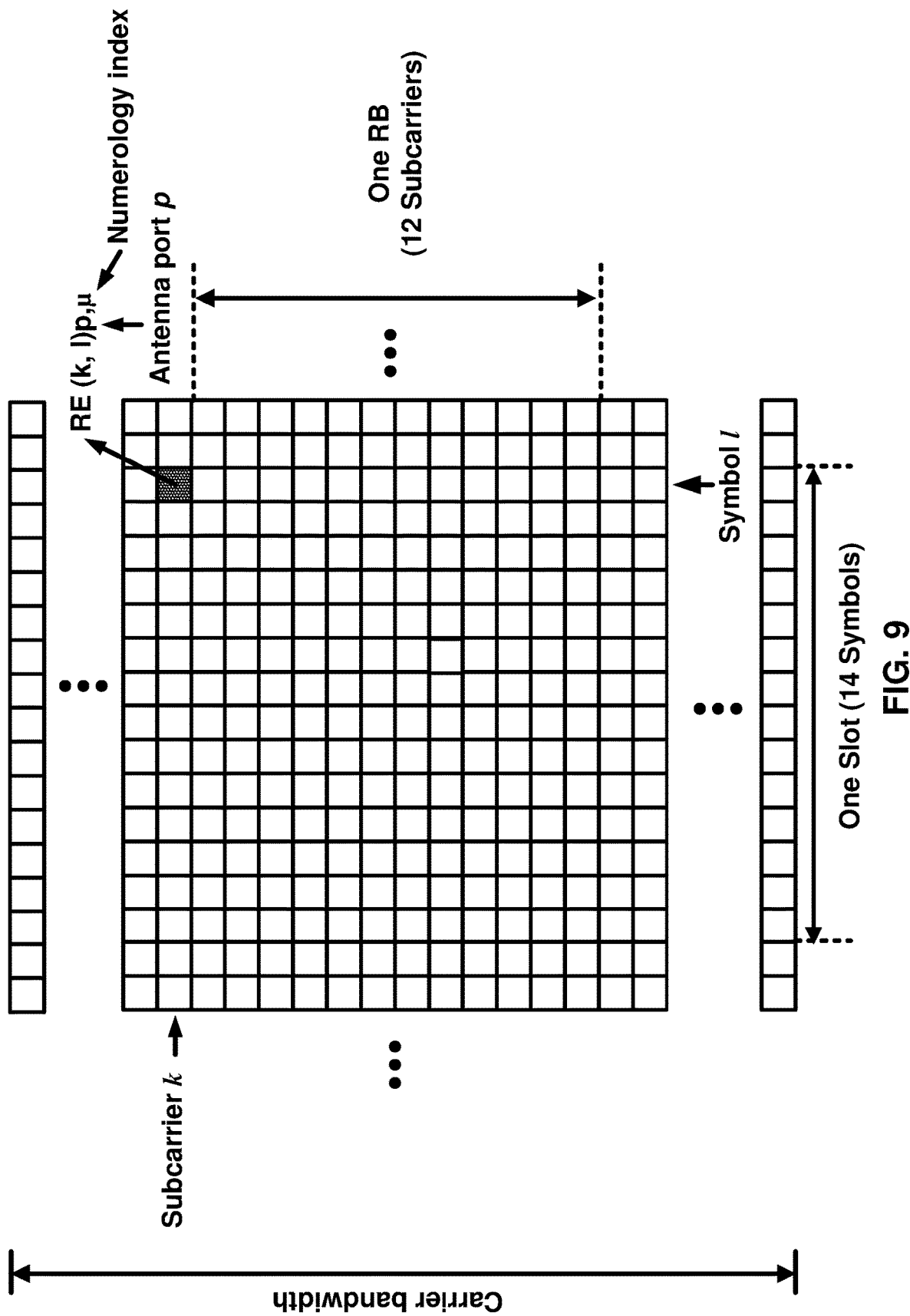
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k,l)_{p,\mu}$ where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., μ=0), a resource block may be 180 KHz and for a subcarrier spacing of 30 KHz (e.g., μ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
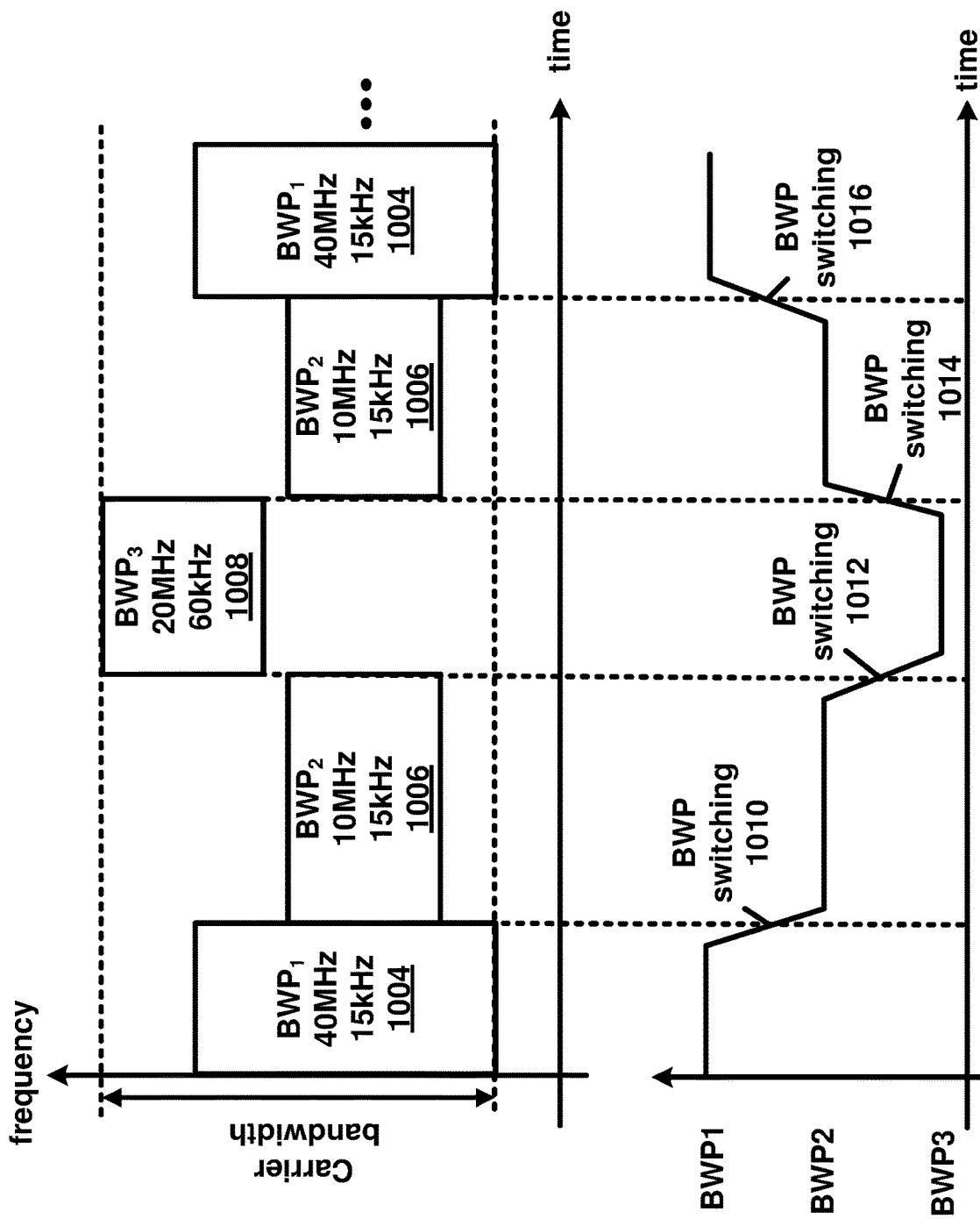
FIG. 10 shows example adaptation and switching of bandwidth parts in accordance with several of various embodiments of the present disclosure.

FIG. 10 shows an example of bandwidth part adaptation and switching. In this example, three BWPs (BWP₁ 1004, BWP₂ 1006 and BWP₃ 1008) are configured for a UE on a carrier bandwidth. The BWP₁ is configured with a bandwidth of 40 MHz and a numerology with subcarrier spacing of 15 KHz, the BWP₂ is configured with a bandwidth of 10 MHz and a numerology with subcarrier spacing of 15 KHz and the BWP₃ is configured with a bandwidth of 20 MHz and a subcarrier spacing of 60 KHz. The wireless device may switch from a first BWP (e.g., BWP₁) to a second BWP (e.g., BWP₂). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
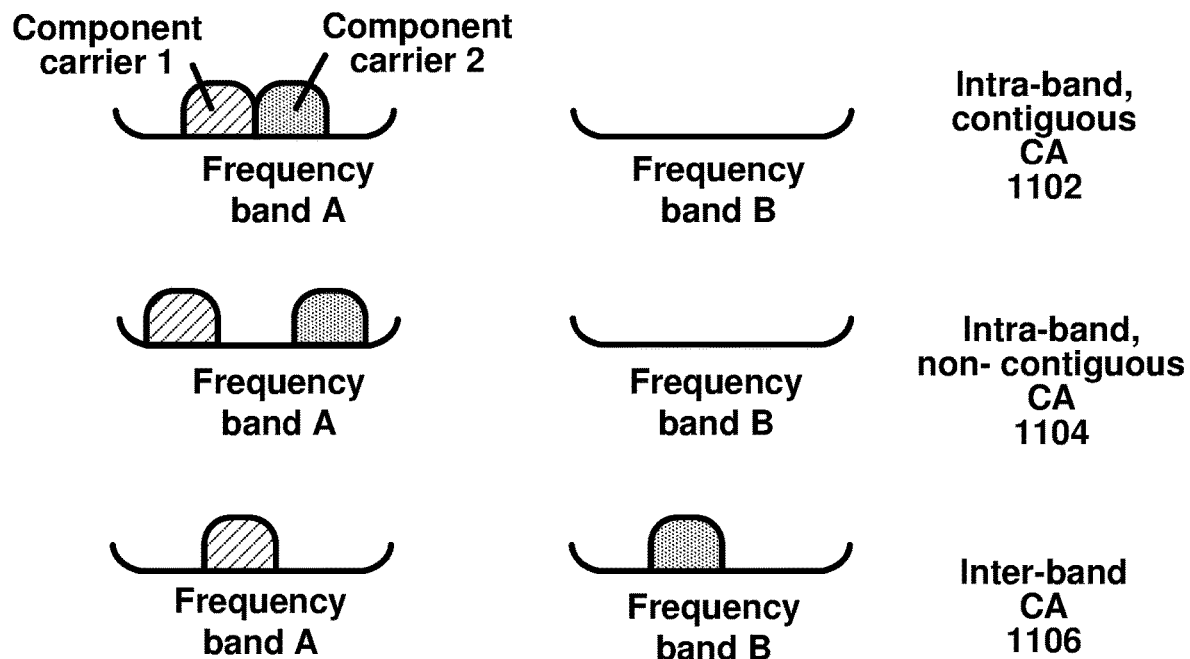
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
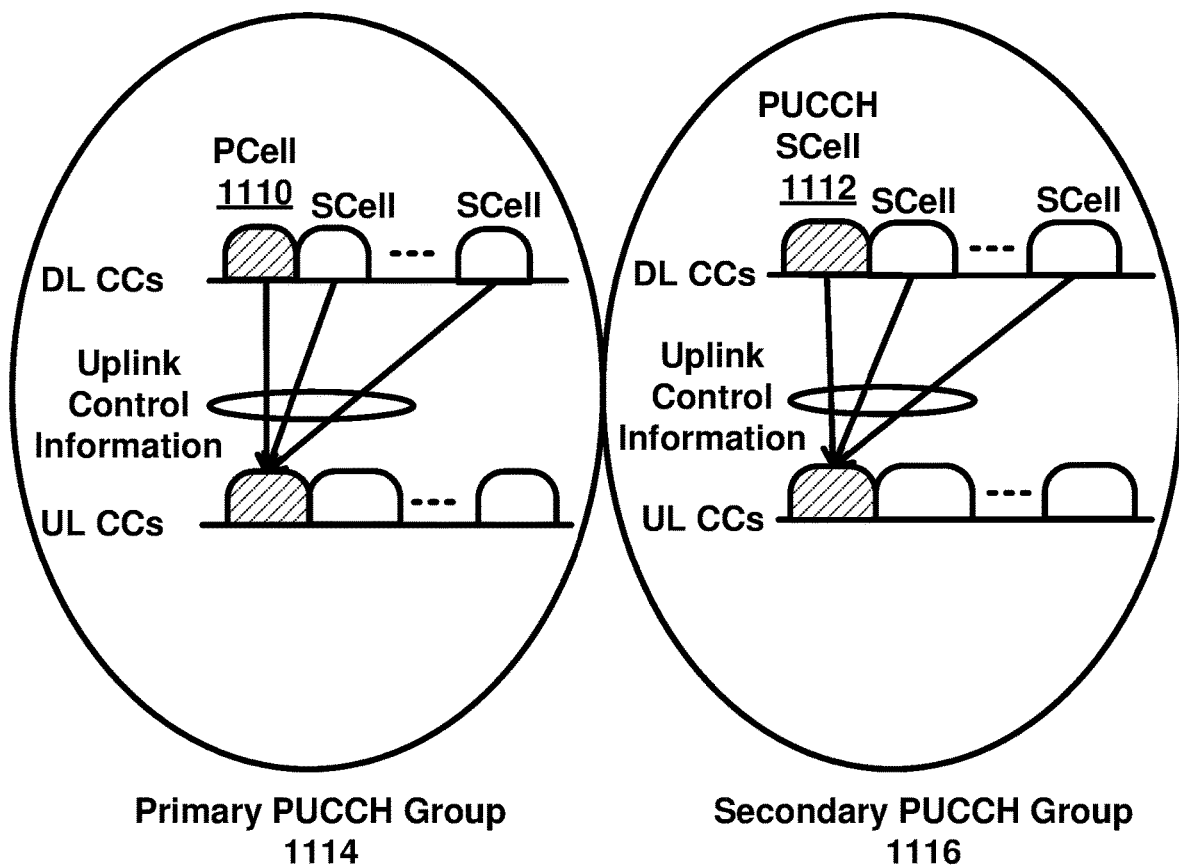
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
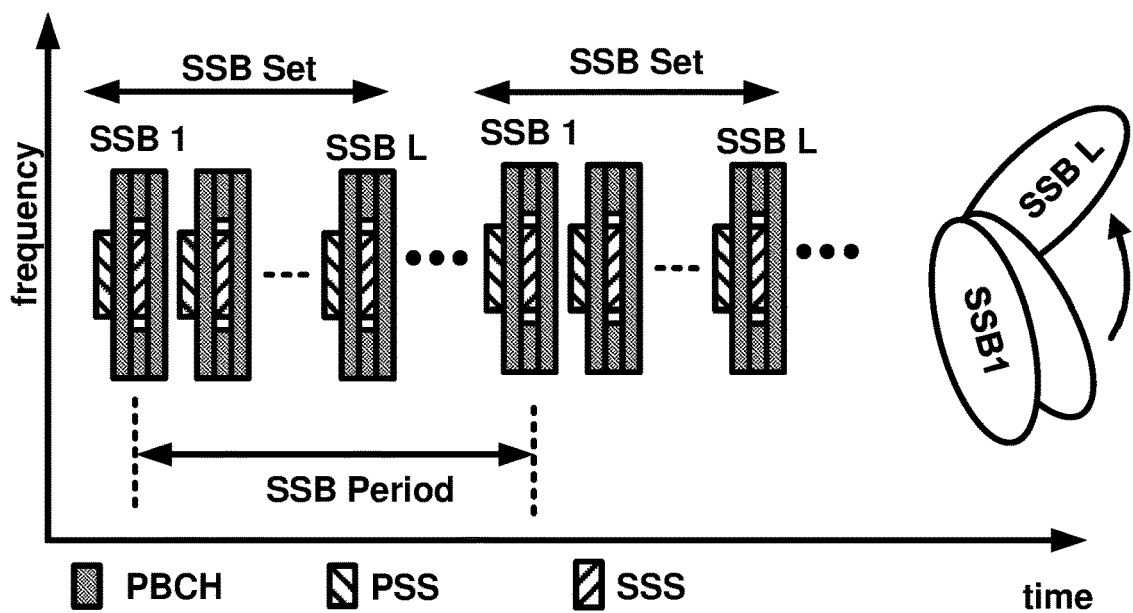
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
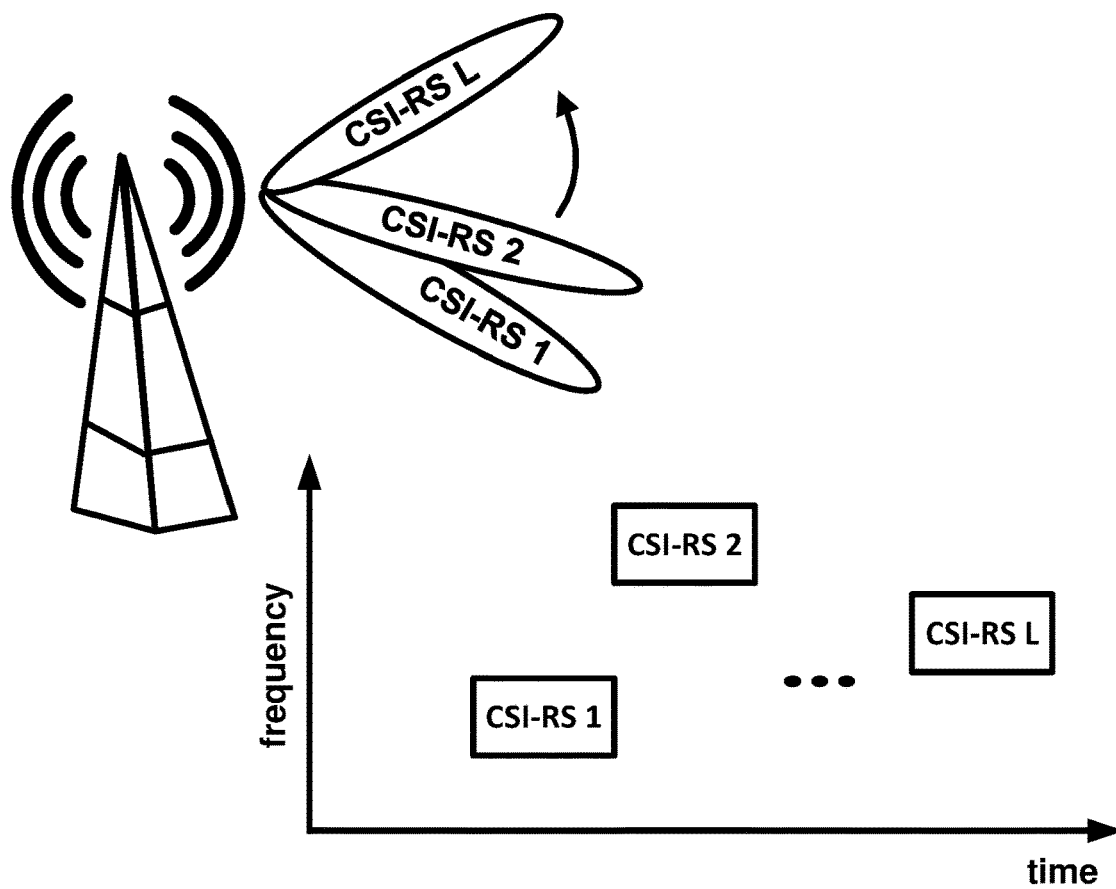
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
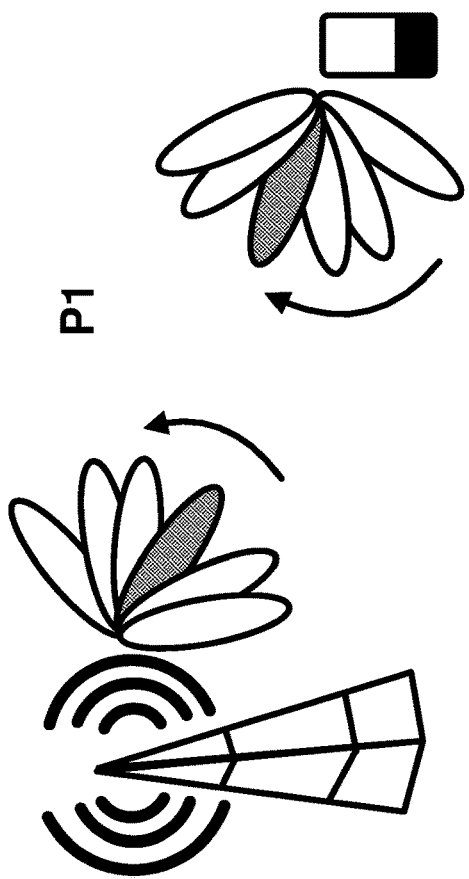
FIG. 14A, FIG. 14B and FIG. 14C show example beam management processes in accordance with several of various embodiments of the present disclosure.
Figure 14C:
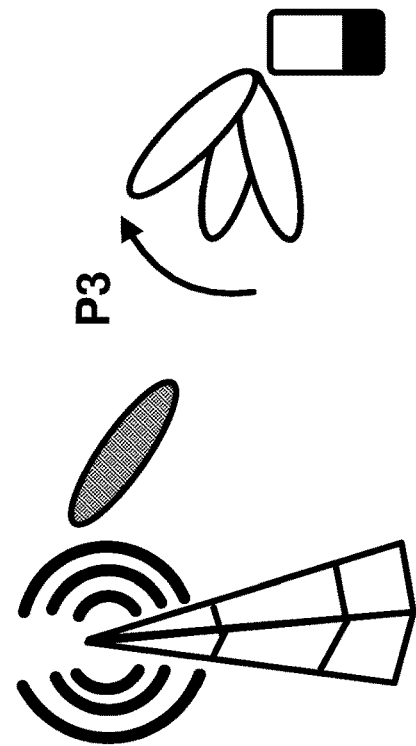
Figure 14B:
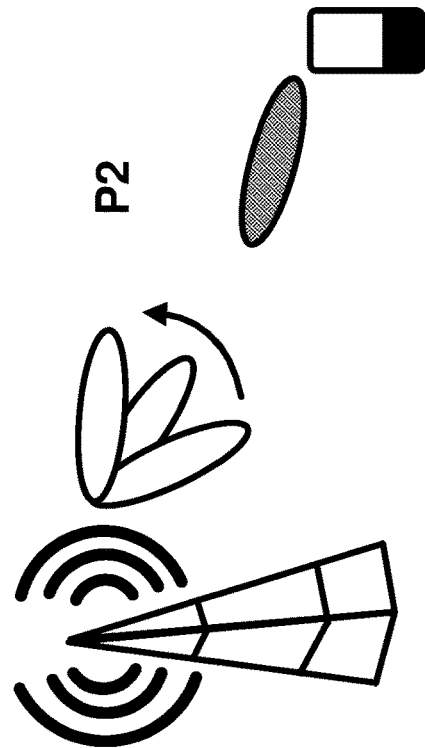

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configuring different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
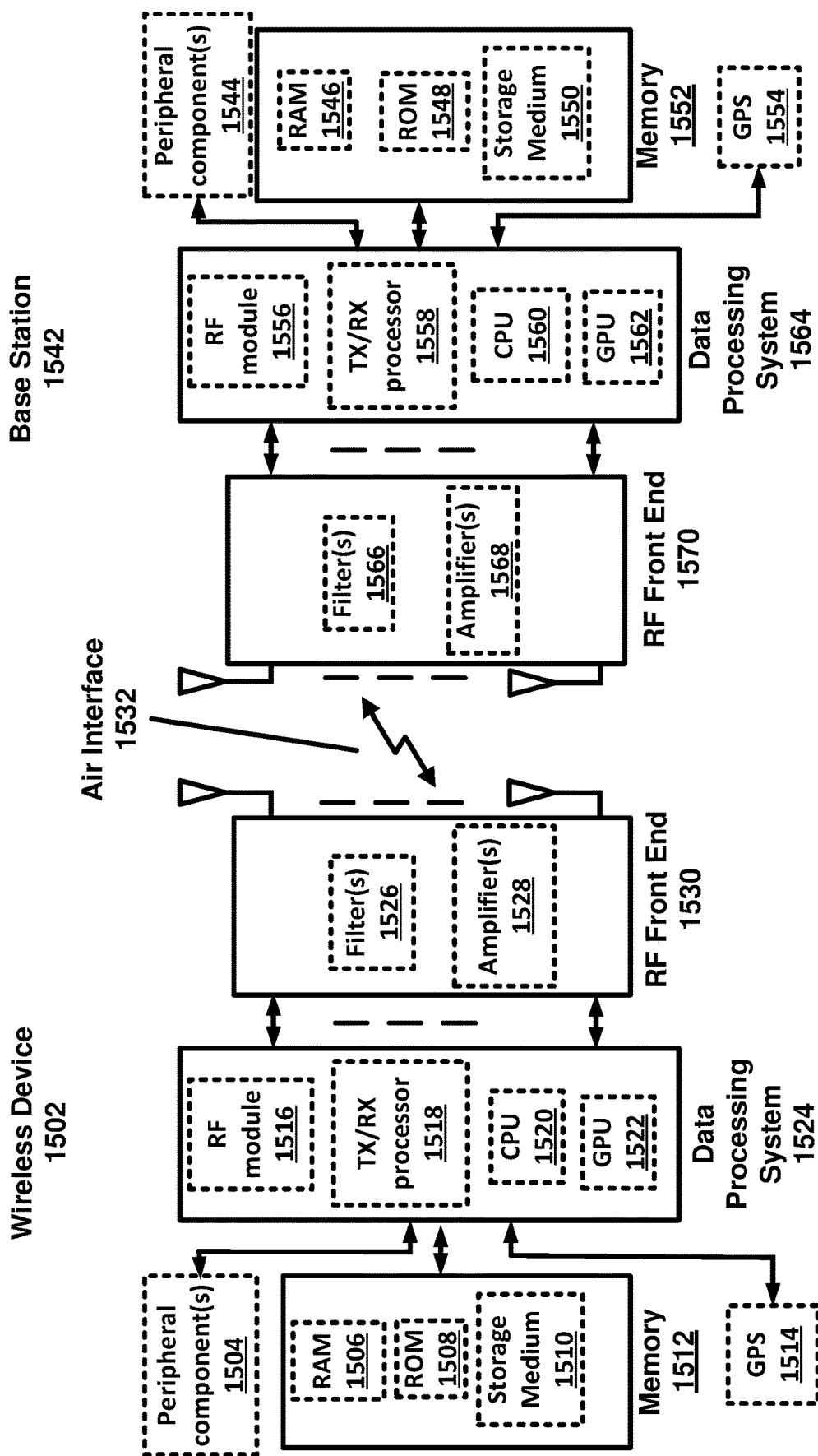
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, a MAC entity is configured with one or more SCells. The network/base station may activate and/or deactivate the configured SCells. In an example, upon configuration of an SCell, the SCell may be deactivated unless the parameter sCellState is set to activated for the SCell by upper layers.

In an example, a configured SCell may be activated or deactivated by: receiving a SCell Activation/Deactivation MAC CE; configuring sCellDeactivationTimer timer for a configured SCell (except, for example, a SCell configured with PUCCH, if any) and deactivating the associated SCell upon the expiry of timer; and configuring sCellState for a configured SCell and activating the associated SCell upon SCell configuration.

In an example, an SCell may be configured with sCellState set to 'activated' upon SCell configuration, or an SCell Activation/Deactivation MAC CE may be received activating the SCell. The SCell may be deactivated prior to receiving this SCell Activation/Deactivation MAC CE; or the SCell may be configured with sCellState set to activated upon SCell configuration.

In an example, if firstActiveDownlinkBWP-Id is not set to dormant BWP, the wireless device may activate the SCell according to a timing and may apply normal SCell operation including: SRS transmissions on the SCell; CSI reporting for the SCell; PDCCH monitoring on the SCell; PDCCH monitoring for the SCell; and PUCCH transmissions on the SCell, if configured.

In an example, if firstActiveDownlinkBWP-Id is set to dormant BWP, the wireless device may stop the bwp-InactivityTimer of this Serving Cell, if running.

In an example, the wireless device may activate the DL BWP and UL BWP indicated by firstActiveDownlinkBWP-Id and firstActiveUplinkBWP-Id respectively.

In an example, an SCell may be configured with sCellState set to activated upon SCell configuration, or an SCell Activation/Deactivation MAC CE may be received activating the SCell. The wireless device may start or restart the sCellDeactivationTimer associated with the SCell according to a timing.

In an example, an SCell may be configured with sCellState set to 'activated' upon SCell configuration, or an SCell Activation/Deactivation MAC CE may be received activating the SCell. If the active DL BWP is not the dormant BWP, the wireless device may (re-)initialize any suspended configured uplink grants of configured grant Type 1 associated with this SCell according to the stored configuration, if any, and to start in the symbol according to one or more rules; and the wireless device may trigger PHR.

In an example, if an SCell Activation/Deactivation MAC CE is received deactivating the SCell; or if the sCellDeactivationTimer associated with the activated SCell expires: the wireless device may deactivate the SCell according to a timing; stop the sCellDeactivationTimer associated with the SCell; stop the bwp-InactivityTimer associated with the SCell; deactivate active BWP associated with the SCell; clear configured downlink assignment and configured uplink grant Type 2 associated with the SCell respectively; clear PUSCH resource for semi-persistent CSI reporting associated with the SCell; suspend configured uplink grant Type 1 associated with the SCell; flush HARQ buffers associated with the SCell; and cancel, if any, triggered consistent LBT failure for the SCell.

In an example, if PDCCH on the activated SCell indicates an uplink grant or downlink assignment; or if PDCCH on the Serving Cell scheduling the activated SCell indicates an uplink grant or a downlink assignment for the activated SCell; or if a MAC PDU is transmitted in a configured uplink grant and LBT failure indication is not received from lower layers; or if a MAC PDU is received in a configured downlink assignment: the wireless device may restart the sCellDeactivationTimer associated with the SCell.

In an example, if the SCell is deactivated: the wireless device may not transmit SRS on the SCell; may not report CSI for the SCell; may not transmit on UL-SCH on the SCell; may not transmit on RACH on the SCell; may not monitor the PDCCH on the SCell; may not monitor the PDCCH for the SCell; and may not transmit PUCCH on the SCell.

In an example, HARQ feedback for the MAC PDU containing SCell Activation/Deactivation MAC CE may not be impacted by PCell, PSCell and PUCCH SCell interruptions due to SCell activation/deactivation.

In an example, when SCell is deactivated, the ongoing Random Access procedure on the SCell, if any, may be aborted.

In an example, a wireless device may receive a sCellDeactivationTimer configuration parameter/IE, in an RRC message, indicating a value of SCell deactivation timer for a SCell. If the field is absent, the UE may apply the value infinity.

In an example, an IE SearchSpace may define/indicate how/where to search for PDCCH candidates. A search space may be associated with a ControlResourceSet (e.g., a CORESET). A field/parameter 'common' may configure this search space as common search space (CSS) and DCI formats to monitor. A field/parameter 'controlResourceSead' may indicate the CORESET applicable for this SearchSpace. A field/parameter 'duration' may indicate a number of consecutive slots that a SearchSpace may last in every occasion, i.e., upon every period as given in the 'periodicityAndOffset' field/parameter. A field/parameter 'freqMonitorLocations' may define/indicate an association of the search space to multiple monitoring locations in the frequency domain and may indicates whether the pattern configured in the associated CORESET is replicated to a specific RB set. A bit in the bitmap may correspond to an RB set, and the rightmost (least significant) bit may correspond to RB set 0 in the BWP. A bit set to 1 may indicate that a frequency domain resource allocation replicated from the pattern configured in the associated CORESET is mapped to the RB set. A field/parameter 'monitoringSlotPeriodicityAndOffset' may indicate slots for PDCCH Monitoring configured as periodicity and offset. A field/parameter 'monitoringSymbolsWithinSlot' may indicate the first symbol(s) for PDCCH monitoring in the slots configured for PDCCH monitoring. The most significant (left) bit may represent the first OFDM in a slot, and the second most significant (left) bit may represent the second OFDM symbol in a slot and so on. The bit(s) set to one may identify/indicate the first OFDM symbol(s) of the control resource set within a slot. A parameter/field 'searchSpaceGroupIdList' may indicate a list of search space group IDs which the search space is associated with. In an example, the network may configure at most N (e.g., N=2) search space groups per BWP where the group ID may be 0, 1, ... N−1 (e.g., either 0 or 1 for N=2). A field/parameter 'searchSpaceId' may indicate identity of the search space. A field/parameter 'searchSpaceType' may indicate whether this is a common search space or a UE specific search space as well as DCI formats to monitor for. A field/parameter 'ue-Specific' may configure the search space as UE specific search space (USS).

In an example, an IE SearchSpaceId may be used to identify Search Spaces. The ID space may be used across the BWPs of a Serving Cell.

In an example, an IE ControlResourceSet may be used to configure a time/frequency control resource set (CORESET) in which to search for downlink control information. In an example, a field/parameter 'controlResourceSead' may identify the instance of the ControlResourceSet IE. In an example, a field/parameter 'duration' may indicate contiguous time duration of the CORESET in number of symbols. A field/parameter 'requencyDomainResources' may indicate frequency domain resources for the CORESET.

In an example, a ControlResourceSetId IE may indicate a short identity, used to identify a control resource set within a serving cell.

In an example, a UE may monitor a set of PDCCH candidates in one or more CORESETs on the active DL BWP on an activated serving cell configured with PDCCH monitoring according to corresponding search space sets. The monitoring may imply decoding a PDCCH candidate according to the monitored DCI formats.

In an example, a UE may be provided a group index for a respective Type3-PDCCH CSS set or USS set by searchSpaceGroupIdList for PDCCH monitoring on a serving cell.

In an example, when a UE is provided searchSpaceGroupIdList, the UE may reset PDCCH monitoring according to search space sets with group index 0, if provided by searchSpaceGroupIdList.

In an example, a UE may be provided by searchSpaceSwitchDelay a number of symbols $P_{switch}$.

In an example, a UE may be provided, by searchSpaceSwitchTimer, a timer value for a serving cell that the UE is provided searchSpaceGroupIdList or, if provided, for a set of serving cells provided by cellGroupsForSwitchList. The UE may decrement the timer value by one after each slot based on a reference SCS configuration that is the smallest SCS configuration µ among all configured DL BWPs in the serving cell, or in the set of serving cells. The UE may maintain the reference SCS configuration during the timer decrement procedure.

In an example, a Serving Cell may be configured with one or multiple BWPs. The BWP switching for a Serving Cell may be used to activate an inactive BWP and deactivate an active BWP at a time. The BWP switching may be controlled by the PDCCH indicating a downlink assignment or an uplink grant, by the bwp-InactivityTimer, by RRC signaling, or by the MAC entity itself upon initiation of Random Access procedure or upon detection of consistent LBT failure on SpCell. Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively may be active without receiving PDCCH indicating a downlink assignment or an uplink grant. In an example, the active BWP for a Serving Cell may be indicated by either RRC or PDCCH. For unpaired spectrum, a DL BWP may be paired with a UL BWP, and BWP switching may be common for both UL and DL.

In an example, an IE PDSCH-ServingCellConfig may be used to configure UE specific PDSCH parameters that are common across the UE's BWPs of one serving cell. A field/parameter pucch-Cell may indicate the ID of the serving cell (of the same cell group) to use for PUCCH. If the field is absent, the UE may send the HARQ feedback on the PUCCH of the SpCell of this cell group, or on this serving cell if it is a PUCCH SCell.

In an example, Semi-Persistent Scheduling (SPS) may be configured by RRC for a Serving Cell per BWP. Multiple assignments may be active simultaneously in the same BWP. Activation and deactivation of the DL SPS may be independent among the Serving Cells.

In an example, for the DL SPS, a DL assignment may be provided by PDCCH, and stored or cleared based on L1 signaling indicating SPS activation or deactivation.

In an example, RRC may configure the following parameters when the SPS is configured: cs-RNTI: CS-RNTI for activation, deactivation, and retransmission; nrofHARQ-Processes: the number of configured HARQ processes for SPS; harq-ProcID-Offset: Offset of HARQ process for SPS; periodicity: periodicity of configured downlink assignment for SPS.

In an example, when the SPS is released by upper layers, all the corresponding configurations may be released.

In an example, after a downlink assignment is configured for SPS, the MAC entity may consider sequentially that the Nth downlink assignment occurs in the slot for which:

(numberOfSlotsPerFrame×SFN+slot number in the frame)=[(numberOfSlotsPerFrame×SFNstart time+slotstart time)+*N*×periodicity×numberOfSlotsPerFrame/10]modulo(1024×numberOfSlotsPerFrame)

where SFNstart time and slotstart time may be the system frame number (SFN) and slot, respectively, of the first transmission of PDSCH where the configured downlink assignment was (re-)initialized.

In an example, two types of transmission without dynamic grant may exist: configured grant Type 1 where an uplink grant is provided by RRC and may be stored as configured uplink grant; and configured grant Type 2 where an uplink grant is provided by PDCCH, and stored or cleared as configured uplink grant based on L1 signaling indicating configured uplink grant activation or deactivation.

In an example, Type 1 and Type 2 may be configured by RRC for a Serving Cell per BWP. Multiple configurations may be active simultaneously in the same BWP. For Type 2, activation and deactivation may be independent among the Serving Cells. For the same BWP, the MAC entity may be configured with both Type 1 and Type 2.

In an example, RRC may configure the following parameters when the configured grant Type 1 is configured: cs-RNTI: CS-RNTI for retransmission; periodicity: periodicity of the configured grant Type 1; timeDomainOffset: Offset of a resource with respect to SFN=timeReferenceSFN in time domain; timeDomainAllocation: Allocation of configured uplink grant in time domain which contains startSymbolAndLength or startSymbol; nrofHARQ-Processes: the number of HARQ processes for configured grant; harq-ProcID-Offset: offset of HARQ process for configured grant for operation with shared spectrum channel access; harq-ProcID-Offset2: offset of HARQ process for configured grant; and timeReferenceSFN: SFN used for determination of the offset of a resource in time domain. The UE may use the closest SFN with the indicated number preceding the reception of the configured grant configuration.

In an example, RRC may configure the following parameters when the configured grant Type 2 is configured: cs-RNTI: CS-RNTI for activation, deactivation, and retransmission; periodicity: periodicity of the configured grant Type 2; nrofHARQ-Processes: the number of HARQ processes for configured grant; harq-ProcID-Offset: offset of HARQ process for configured grant for operation with shared spectrum channel access; harq-ProcID-Offset2: offset of HARQ process for configured grant.

In an example, RRC may configure the following parameters when retransmissions on configured uplink grant is configured: cg-RetransmissionTimer: the duration after a configured grant (re)transmission of a HARQ process when the UE may not autonomously retransmit that HARQ process.

In an example, upon configuration of a configured grant Type 1 for a BWP of a Serving Cell by upper layers, the MAC entity may: store the uplink grant provided by upper layers as a configured uplink grant for the indicated BWP of the Serving Cell; and initialize or re-initialize the configured uplink grant to start in the symbol according to timeDomainOffset, timeReferenceSFN, and S (derived from SLIV or provided by startSymbol), and to reoccur with periodicity.

After an uplink grant is configured for a configured grant Type 1, the MAC entity may consider sequentially that the Nth (N>=0) uplink grant occurs in the symbol for which:

[(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+N×periodicity)modulo(1024×numberOfSlotsPerFrame×numberOfSymbolsPerSlot).

After an uplink grant is configured for a configured grant Type 2, the MAC entity may consider sequentially that the Nth (N>=0) uplink grant occurs in the symbol for which:

[(SFN×numberOfSlotsPerFrame×numberOfSymbolsPerSlot)+(slot number in the frame×numberOfSymbolsPerSlot)+symbol number in the slot]=[(SFNstart time×numberOfSlotsPerFrame×numberOfSymbolsPerSlot+slotstart time×numberOfSymbolsPerSlot+symbolstart time)+N×periodicity]modulo(1024×numberOfSlotsPerFrame×numberOfSymbolsPerSlot).

where SFNstart time, slotstart time, and symbolstart time may be the SFN, slot, and symbol, respectively, of the first transmission opportunity of PUSCH where the configured uplink grant was (re-)initialized.

In an example, if cg-nrofPUSCH-InSlot or cg-nrofSlots is configured for a configured grant Type 1 or Type 2, the MAC entity may consider the uplink grants occur in those additional PUSCH allocations.

In an example, when the configured uplink grant is released by upper layers, all the corresponding configurations may be released and all corresponding uplink grants may be cleared.

In an example, at least one configured uplink grant confirmation may be triggered and not cancelled; and the MAC entity may have UL resources allocated for new transmission. If, in this MAC entity, at least one configured uplink grant is configured by configuredGrantConfigToAddModList: the MAC entity may instruct the Multiplexing and Assembly procedure to generate a Multiple Entry Configured Grant Confirmation MAC CE. Otherwise, the MAC entity may instruct the Multiplexing and Assembly procedure to generate a Configured Grant Confirmation MAC CE. The MAC entity may cancel all triggered configured uplink grant confirmation(s).

In an example, for a configured grant Type 2, the MAC entity may clear the configured uplink grant(s) immediately after first transmission of Configured Grant Confirmation MAC CE or Multiple Entry Configured Grant Confirmation MAC CE which confirms the configured uplink grant deactivation.

In an example, retransmissions may use: repetition of configured uplink grants; or received uplink grants addressed to CS-RNTI; or configured uplink grants with cg-RetransmissionTimer configured.

In an example, dynamic spectrum sharing (DSS) may enable multiple radio access technologies (e.g., LTE and NR) to share the same carrier. Sufficient scheduling capacity may be important for wireless device on the shared carriers.

In an example, PDCCH of a scheduling SCell (sSCell) may schedule PDSCH or PUSCH on P(S)Cell.

In an example, PDCCH of P(S)Cell/SCell may schedule PDSCH on multiple cells.

In an example, cross-carrier scheduling (CCS) from scheduling secondary cell (sSCell) to PCell/PSCell may be configured. In an example, out of order scheduling may not be allowed between PDSCH on PCell/PSCell scheduled by PDCCH on PCell/PSCell and PDSCH on PCell/PSCell scheduled by PDCCH on sSCell. In an example, out of order scheduling may not be allowed between PUSCH on PCell/PSCell scheduled by PDCCH on PCell/PSCell and PUSCH on PCell/PSCell scheduled by PDCCH on sSCell.

In an example, cross-carrier scheduling (CCS) from sSCell to PCell/PSCell may be configured. In an example, simultaneous reception of unicast PDSCH on PCell/PSCell scheduled from PCell/PSCell and unicast PDSCH on PCell/PSCell scheduled from sSCell may not be allowed. In an example, simultaneous transmission of PUSCH on PCell/PSCell scheduled from PCell/PSCell and PUSCH on PCell/PSCell scheduled from sSCell may not be allowed. In an example, simultaneous may imply full/partial time overlapping.

In an example, when cross-carrier scheduling (CCS) from sSCell to PCell/PSCell is configured, carrier aggregation activation/deactivation operation for the sSCell may be supported.

In an example, when cross-carrier scheduling (CCS) from sSCell to PCell/PSCell is configured, UE may be configured to monitor DCI formats 0_1/1_1/0_2/1_2, that schedule PDSCH/PUSCH on PCell/PSCell, on PCell/PSCell USS set(s) and/or on sSCell USS set(s). In an example, the UE may monitor PDCCH from both cells in the same slot.

In an example, when CCS from sSCell to PCell/PSCell is configured, the UE may monitor DCI formats 0_0 and 1_0 in CSS that schedule PDSCH/PUSCH on PCell/PSCell on the PCell/PSCell and not on the sSCell.

In an example, when cross-carrier scheduling from an SCell to PCell/PSCell may be configured: self-scheduling on PCell/PSCell may be allowed; cross-carrier scheduling from PCell/PSCell to another SCell may not be allowed; self-scheduling on the 'SCell used for scheduling PCell/PSCell' may be allowed; cross-carrier scheduling from the 'SCell used for scheduling PCell/PSCell' to another serving cell may be allowed; cross-carrier scheduling from another serving cell to the 'SCell used for scheduling PCell/PSCell' may not be allowed.

In an example, configuring two or more Scells to schedule the PCell/PSCell may not be allowed.

In an example, when CCS from an SCell (sSCell) to PCell/PSCell is configured, the UE may monitor Type 0/0A/1/2 common search space (CSS) sets (for the DCI formats associated with those SS sets) on the PCell/PSCell and not on the sSCell.

In an example, a UE may not be configured to monitor DCI formats 0_1,1_1,0_2,1_2 on PCell/PSCell USS set(s) and may be configured to monitor them on the sSCell USS set(s).

In an example, a UE may be configured to monitor DCI formats 0_1/1_1/0_2/1_2 on PCell/PSCell UE specific search space (USS) set(s), and/or on sSCell USS set(s). In an example, the UE may monitor DCI formats 0_1, 1_1, 0_2, 1_2 on both PCell USS set(s) and sSCell USS sets simultaneously.

In an example, dynamic switching of PDCCH monitoring of DCI formats 0_1,1_1,0_2,1_2 between monitoring on PCell/PSCell USS sets and monitoring on sSCell USS sets may be supported. The UE may not monitor DCI formats 0_1,1_1,0_2,1_2 on both PCell USS set(s) and sSCell USS sets simultaneously.

In an example, the UE may not monitor the same DCI format on both PCell USS set(s) and sSCell USS sets simultaneously. The UE may monitor some DCI formats on sSCell USS sets and other DCI formats on PCell/PSCell USS sets simultaneously.

In an example, the USS set(s) on PSCell/PCell and the USS set(s) on sSCell may be configured such that UE does not monitor DCI formats 0_1,1_1,0_2,1_2 on both PCell USS set(s) and sSCell USS set(s) simultaneously.

In an example embodiment, for a SCell scheduling a primary cell, the primary cell may be configured as the scheduling cell and the scheduled cell simultaneously by an RRC parameter CrossCarrierSchedulingConfig.

In an example embodiment, for a SCell scheduling primary cell and for UE specific search space (USS) configuration, search space ID may be used to associate the search space configuration for primary cell and search space configuration for SCell.

In an example, a USS set configured on primary cell may only be used for either self-scheduling or cross carrier scheduling (CCS) from SCell.

In an example, if the USS #n on primary cell is used for cross-carrier scheduling from SCell, the UE may acquire the monitoring occasion (MO) configuration from USS #n on SCell and may acquire the candidate number from USS #n on primary cell.

In an example, for secondary scheduling cell (sSCell) scheduling primary cell, dynamic activation/deactivation of scheduling from sSCell to PCell/PSCell may be supported to avoid frequent RRC reconfiguration.

In an example, for scheduling secondary cell (sSCell) scheduling primary cell and for UE specific search space (USS), fallback DCI (e.g., DCI format 0_0 for scheduling PUSCH or DCI format 1_0 for scheduling PDSCH) scheduling primary cell's PDSCH/PUSCH may be restricted on PCell/PSCell only.

In an example, PDCCH monitoring blind detection (BD)/CCE budget may be determined independently between primary cell and scheduling secondary cell (sSCell).

In an example, a DCI format 0_0/1_0 may not be used for scheduling the primary cell from an SCell.

In an example, when PDSCH or PUSCH on a primary cell can be scheduled by PDCCH of SCell and the primary cell, a UE capability may be defined about whether a UE supports PDCCHs of initial and retransmission scheduling from different cells for the same TB.

In an example, a UE may be indicated by an RRC IE CrossCarrierSchedulingConfig that the data on a cell may be scheduled by PDCCH in its own cell (e.g., 'own' in schedulingCellInfo) or another cell (i.e., 'other' in schedulingCellInfo).

In an example, search space linkage between a scheduling cell and a scheduled cell may be defined, e.g., search spaces with the same searchSpaceId in a scheduled cell and a scheduling cell may be linked to each other. In an example, a UE may apply the search space for the scheduled cell if the DL BWPs in which the linked search spaces are configured in the scheduling cell and the scheduled cell are both active.

In an example, scheduling the primary cell from a scheduling secondary cell (sSCell) may be dynamically activated/deactivated, e.g., using a DCI or a MAC CE.

In an example, whether to enable SCell scheduling PCell transmission may be configured per search space set.

In an example, a wireless device may monitor USS sets on PCell and the scheduling SCell simultaneously, e.g., in the same timing.

In an example, a wireless device may dynamically switch between UE specific search space (USS) sets configuration on primary cell and the scheduling SCell.

In an example, a wireless device may monitor different DCI formats in USS sets on primary cell and the scheduling SCell simultaneously.

In an example, an IE CrossCarrierSchedulingConfig may be used to specify the configuration when the cross-carrier scheduling is used in a cell. In an example, the IE CrossCarrierSchedulingConfig may be used to support of SCell scheduling PCell transmissions.

In an example, out of order transmission may not be expected for SCell scheduling primary cell, when the primary cell and the scheduling SCell have different subcarrier spacing (SCS).

In an example, scheduling SCell (sSCell) activation/deactivation and sSCell dormancy may be supported.

In an example, a SCell may be configured as a fall-back sSCell that becomes the sSCell if the "primary" sSCell is deactivated/made dormant.

In an example, if all sSCells are deactivated/made dormant, and if simultaneous USS set monitoring on both sSCell and primary cell is not adopted, the sSCell deactivation/dormancy may trigger the UE monitoring of USS set in the primary cell.

In an example, the set of search spaces used for cross-carrier scheduling may be separately configured from the search spaces used for self-scheduling.

In an example, when cross-carrier scheduling from sSCell to PCell/PSCell is configured, a UE may monitor Type0/0A/1/2 CSS on the PCell regardless of whether or not the sSCell is activated.

In an example, a wireless device may dynamically switch monitoring DCI formats 0_1, 1_1, 0_2, 1_2 between PCell/PSCell USS sets and sSCell USS.

In an example, to support dynamic switching of PDCCH monitoring of DCI formats (e.g., DCI formats 0_1, 1_1, 0_2, 1_2) between monitoring on PCell USS and sSCell USS, a search space sets group may be used. The RRC configuration may associate a search space set to a search space sets group in a plurality of search space sets groups. A search space sets group may comprise search space sets from different cells (e.g., a primary cell and a scheduling secondary cell (sSCell)). The wireless device may monitor one search space sets group. In an example, to switch the monitoring between the search space sets groups, a DCI (e.g., DCI format 2_0) may be transmitted in common search space to indicate which group to monitor by carrying an explicit bit. In an example, to switch the monitoring between the groups, the wireless device may switch to a group if it detects a scheduling activity.

In an example, when the wireless device changes from a first group of search spaces sets to a second group of search space sets, it may start a timer. When the timer expires, the wireless device may switch back to the first group. In an example, a first group of search space sets may be in the PCell/PSCell and a second group of search space sets may be in a scheduling SCell (sSCell). The switching between the two groups may be carried by explicit indication in a DCI (e.g., the DCI format 2_0) or based on the scheduling activity.

In an example, a search space sets group may comprise search space sets from different cells. For example, a search space sets group may comprise some search space sets in PCell/PSCell and some search space sets in the scheduling SCell (sSCell).

In an example, search space sets groups may be used to support the dynamic switching of monitoring DCI (e.g., DCI formats 0_1, 1_1, 0_2, 1_2) between PCell/PSCell USS sets and sSCell USS.

In an example, the configuration parameters for PDCCH monitoring occasions (monitoringSlotPeriodicityAndOffset, monitoringSymbolsWithinSlot, and duration in the RRC IE SearchSpace) may be independently/separately configured for different scheduled cells from the same scheduling cell.

A wireless device may be configured with a plurality of cells comprising a primary cell and one or more secondary cells. The one or more secondary cells may comprise a first secondary cell that may be configured as a scheduling secondary cell (sSCell) for the primary cell (e.g., PCell or PSCell). The configuration and/or reconfiguration of the first secondary cell as the scheduling secondary cell for the primary cell (e.g., PCell or PSCell) may result in inefficiencies of the existing wireless device processes leading to degraded wireless device and wireless network performance. There is a need to enhance existing wireless devices processes when the wireless device is configured with a scheduling secondary cell for the primary cell (e.g., PCell or PSCell). Example embodiments enhance the existing processes when the wireless device is configured with a scheduling secondary cell for a primary cell (e.g., PCell or PSCell).

In example embodiments, a wireless device may receive one or more messages (e.g., one or more RRC messages) comprising configuration parameters. The one or more messages (e.g., the one or more RRC messages) may comprise configuration parameters of a plurality of cells. The plurality of cells may comprise a primary cell and one or more secondary cells. In an example, a first secondary cell in the one or more secondary cells may be a scheduling secondary cell (sSCell), wherein the wireless device is configured to monitor one or more CORESETs/search spaces of the sSCell and receive scheduling information (e.g., downlink assignment or uplink grant) for the primary cell (e.g., PCell or PSCell) via the sSCell. A sSCell may be configured with one or more CORESETs/search spaces for receiving scheduling/control information (e.g., DCI indicating downlink assignment or uplink) associated with scheduling downlink TB(s) (e.g., via PDSCH) or uplink TB(s) (e.g., via PUSCH) of the primary cell (e.g., PCell or PSCell). The plurality of cells may be provided by one base station (e.g., in case of single connectivity) or multiple base stations (e.g., in case of multi-connectivity, e.g., dual connectivity). For example, in case of multi-connectivity (e.g., dual connectivity), the plurality of cells may comprise a plurality of cell groups comprising a first cell group (e.g., a master cell group (MCG)) provided by a first base station (e.g., a master base station) and a second cell group (e.g., a secondary cell group (SCG)) provided by a second base station (e.g., a secondary base station). An SCell of the SCG may be a primary SCell for the SCG (e.g., a primary secondary cell (PSCell)).

In example embodiments, a wireless device may receive one or more RRC messages comprising configuration parameters and/or indicating reconfiguration of one or more parameters. The one or more RRC messages may comprise first configuration parameters associated with scheduling of a primary cell via a first secondary cell. The first secondary cell may be a scheduling secondary cell (sSCell) and may be configured to receive scheduling/control information associated with scheduling (e.g., scheduling downlink/uplink TB(s) via PDSCH/PUSCH) of the primary cell (e.g., PCell/PSCell). In an example, the first configuration parameters may indicate reconfiguration of parameters associated with scheduling of the primary cell (e.g., PCell/PSCell) from a scheduling secondary cell. The parameters, associated with scheduling of the primary cell (e.g., PCell/PSCell) from a scheduling secondary cell, may comprise a serving cell index of the sSCell (e.g., the identity of the sSCell), the CORESET/search space(s) parameters (e.g., CORESET/search space ID(s), time/frequency resources of the CORESET/search space(s), etc.) of one or more CORESETs/search spaces used for receiving scheduling information for the primary cell, etc.

In an example, the first configuration parameters may be part of a first secondary cell configuration parameters (e.g., may be included in the ServingCellConfig of the first secondary cell). The wireless device may receive configuration parameters of the first secondary cell (e.g., via ServingCellConfig) comprising the first configuration parameters associated with scheduling (e.g., scheduling PDSCH and/or PUSCH) of the primary cell (e.g., PCell or PSCell) via the first secondary cell. For example, the first configuration parameters may comprise CORESET/search space configuration parameters of one or more CORESETs/search spaces (e.g., UE-specific search spaces (USSs)) used in monitoring for and/or receiving scheduling/control information for scheduling (e.g., scheduling PDSCH and/or PUSCH) of the primary cell (e.g., PCell or PSCell) via the first secondary cell. For example, the first configuration parameters may indicate identifiers of the CORESETs/search spaces of the first secondary cell used for monitoring and/or receiving scheduling/control information associated with scheduling (e.g., scheduling PDSCH and/or PUSCH) of the primary cell (e.g., PCell or PSCell) via the first secondary cell. For example, the wireless device may receive CORESET/search space configuration parameters, of one or more CORESETs/search spaces, comprising one or more parameters indicating whether the one or more CORESETs/search spaces are configured for monitoring and/or receiving scheduling/control information associated with scheduling (e.g., scheduling PDSCH and/or PUSCH) of the primary cell via the first secondary cell. For example, one or more first values of the one or more parameters may indicate that the one or more CORESETs/search spaces are configured for monitoring and/or receiving scheduling/control information associated with scheduling of the primary cell (e.g., PCell or PSCell) via the first secondary cell. For example, one or more second values of the one or more parameters may indicate that the one or more CORESETs/search spaces are not configured for monitoring and/or receiving scheduling/control information associated with scheduling of the primary cell (e.g., PCell or PSCell) via the first secondary cell.

In an example, the first configuration parameters may be part of a primary cell (e.g., PCell or PSCell) configuration parameters (e.g., may be included in the ServingCellConfig of the primary cell). The wireless device may receive configuration parameters of the primary secondary cell comprising the first configuration parameters associated with scheduling (e.g., scheduling PDSCH and/or PUSCH) of the primary cell via the first secondary cell. For example, the first configuration parameters may comprise a parameter indicating an identifier (e.g., serving cell index) of the first secondary cell as a scheduling SCell (sSCell) for the primary cell (e.g., PCell or PSCell). For example, the first configuration parameters may comprise identifiers of one or more CORESETs and/or search spaces (e.g., UE-specific search spaces) of the first secondary cell, wherein the one or more CORESETs/search spaces may be used for monitoring and/or receiving scheduling/control information associated with scheduling (e.g., scheduling PDSCH and/or PUSCH) of the primary cell via the first secondary cell.

In example embodiments, the one or more messages may comprise one or more RRC reconfiguration messages. In an example, the one or more RRC reconfiguration messages may indicate a changing of a scheduling secondary cell (sSCell) of the primary cell (e.g., PCell or PSCell) from a second secondary cell to the first secondary cell. For example, the one or more RRC reconfiguration messages may indicate that one or more second CORESETs/search spaces of the second secondary cell are reconfigured and/or are not used for monitoring and/or reception of the scheduling/control information associated with scheduling (e.g., scheduling PDSCH and/or PUSCH) of the primary cell and that one or more first CORESETs/search spaces of the first secondary cell are used for monitoring and/or reception of the scheduling/control information associated with scheduling (e.g., scheduling PDSCH and/or PUSCH) of the primary cell. In an example, the one or more RRC reconfiguration messages may indicate that the scheduling secondary cell (sSCell) of the primary cell is not changed (e.g., is the first secondary cell, e.g., the identity of sSCell is not changed) and that one or more search spaces/CORESETs used for monitoring/reception of control/scheduling information associated with scheduling of the primary cell are changed/reconfigured (e.g., changed from one or more second CORESETs/search spaces of the first secondary cell to one or more first CORESETs/search spaces of the first secondary cell or that parameters of the one or more search spaces/CORERSETs are changed/reconfigured).

In example embodiments, in response to receiving the one or more messages and based on the one or more messages comprising the first configuration parameters associated with scheduling of the primary cell (e.g., PCell or PSCell) via the first secondary cell (e.g., reconfiguration of parameters associated with scheduling of the primary cell via the sSCell), the wireless device may start a timer.

Figure 16:
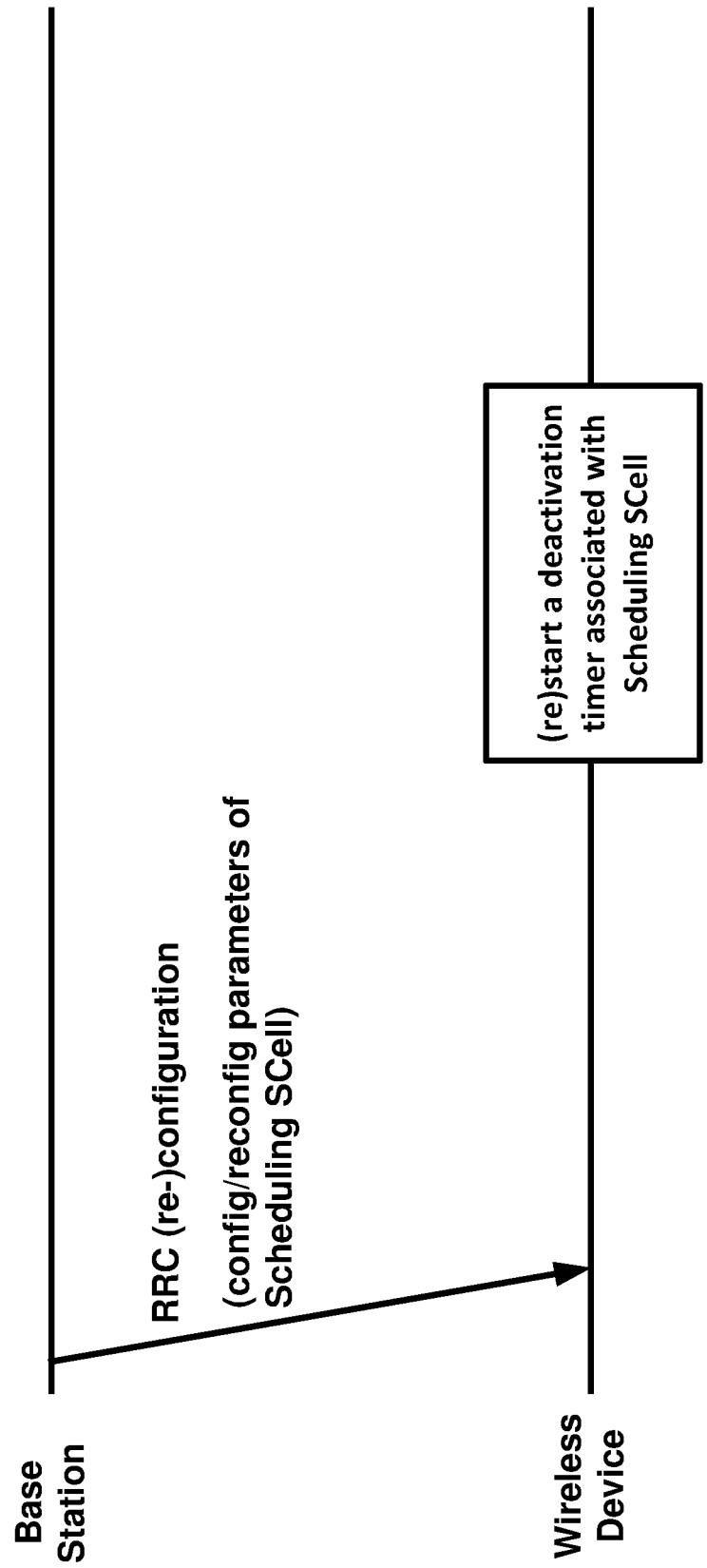
FIG. 16 shows an example process in accordance with several of various embodiments of the present disclosure.

In an example embodiment as shown in FIG. 16, the timer may be a deactivation timer of the first secondary cell. The one or more messages may further comprise a parameter indicating a deactivation timer value of the deactivation timer. The wireless device may start the deactivation timer with the deactivation timer value in response to receiving the one or more messages.

In an example, the timer may be a bandwidth part (BWP) inactivity timer of a first BWP of the first secondary cell. The first BWP may be an initial active BWP of the first secondary cell or may be a current active BWP of the first secondary cell. The one or more messages may comprise a parameter indicating an inactivity timer value of the BWP inactivity timer of the first BWP. The wireless device may start the inactivity timer with the inactivity timer value in response to receiving the one or more messages.

Figure 17:
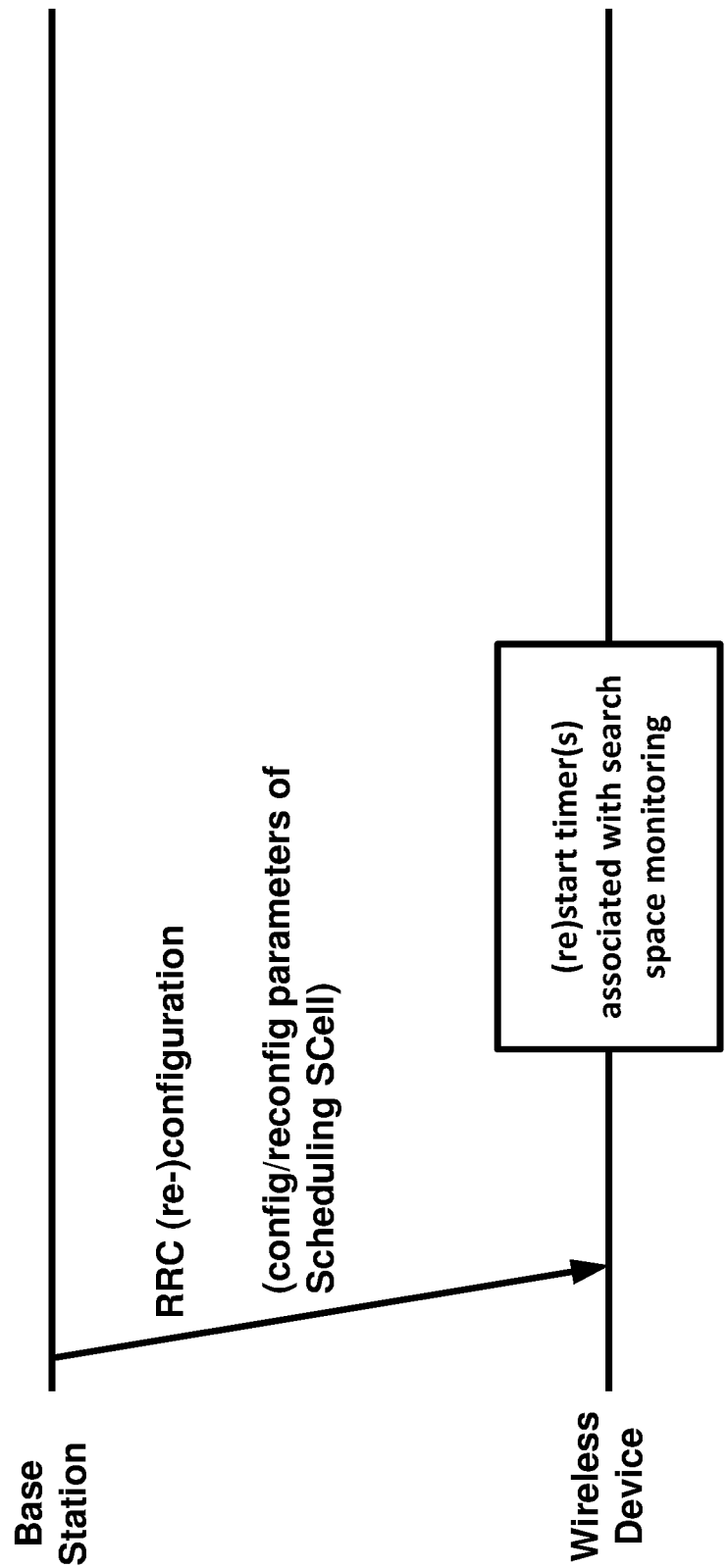
FIG. 17 shows an example process in accordance with several of various embodiments of the present disclosure.

In an example embodiment as shown in FIG. 17, the timer may be associated with one or more CORESETs and/or one or more search spaces for monitoring and/or reception of scheduling/control information associated with scheduling (e.g., scheduling PDSCH and/or PUSCH) of the primary cell (e.g., PCell or PSCell). For example, the timer may be associated with one or more CORESETs/search spaces, of the first secondary cell, that are associated with scheduling (e.g., scheduling PDSCH and/or PUSCH) of the primary cell. The one or more messages may comprise a configuration parameter indicating the value of the timer and starting the timer may be with the value of the timer indicated by the configuration parameter. For example, the wireless device may monitor or may not monitor the one or more CORESETs/search spaces, associated with scheduling of the primary cell, based on whether the timer is running or not. For example, the wireless device may monitor the one or more CORESETs/search spaces, associated with scheduling of the primary cell, based on the timer running. In an example, expiry of the timer may indicate stopping monitoring the one or more CORESETs/search spaces for receiving scheduling/control information associated with scheduling of the primary cell. In an example, expiry of the timer may indicate switching one or more CORESETs/search spaces for monitoring or receiving scheduling/control information associated with scheduling of the primary cell. In an example, expiry of the timer may indicate excluding one or more CORESETs/search spaces, from a plurality of CORESETs/search spaces, for monitoring or receiving scheduling/control information associated with scheduling of the primary cell.

In an example, the wireless device may start the timer in response to receiving the one or more messages and in a first timing (e.g., in a first timing after reception of the one or more messages). In an example, the first timing may be based on a reference timing. For example, the reference timing may be based on a system frame number (e.g., SFN=0). For example, the first timing may be based on a first subframe (e.g., subframe 0) of a reference system frame number (e.g., SFN=0). For example, the first timing may be based on an offset parameter. For example, the first timing may be an offset to a subframe of the reference system frame number. The one or more messages may comprise an offset parameter indicating the offset. The offset may be in a first number of symbols/slots.

Figure 18:
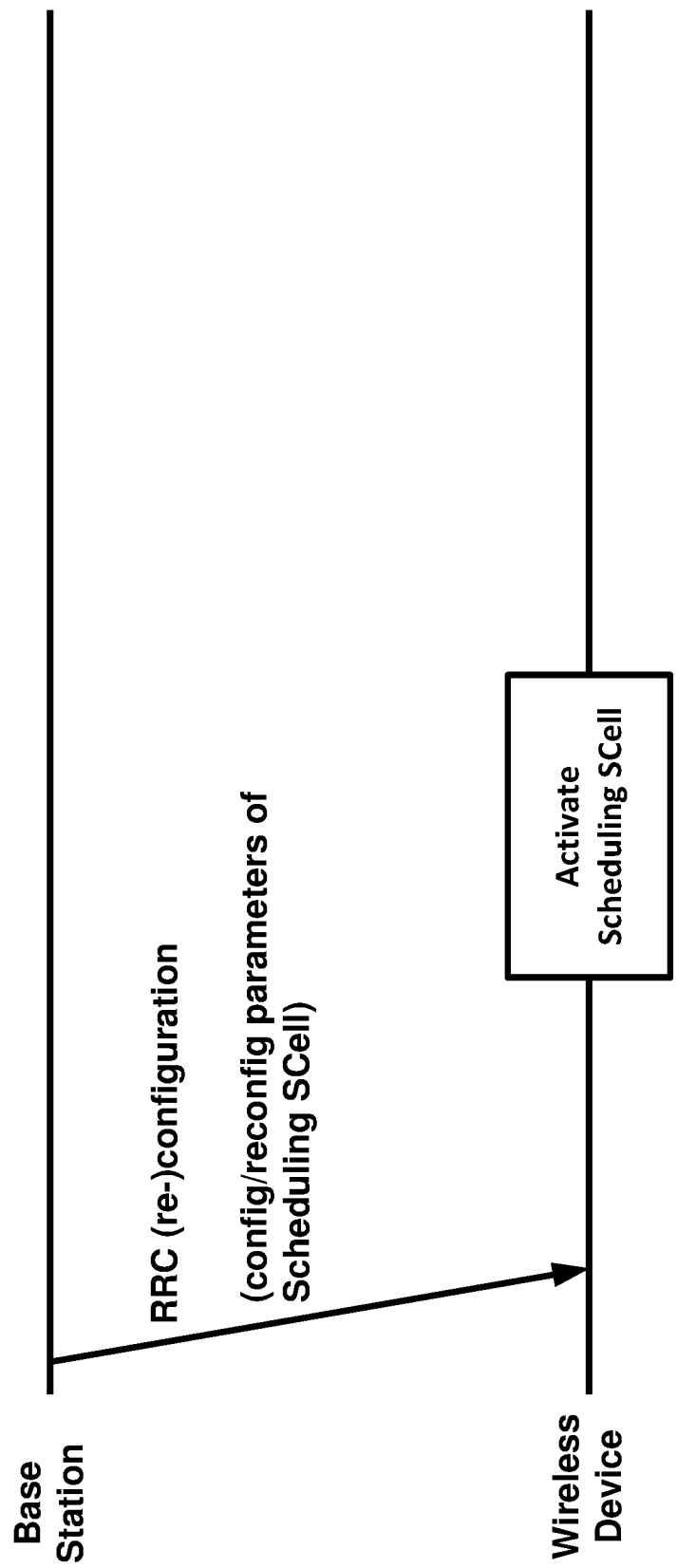
FIG. 18 shows an example process in accordance with several of various embodiments of the present disclosure.

In an example embodiment as shown in FIG. 18, in response to receiving the one or more messages and based on the one or more messages comprising the first configuration parameters associated with scheduling of the primary cell (e.g., PCell or PSCell) via the first secondary cell, the wireless device may activate the first secondary cell. For example, the one or more messages may indicate reconfiguration of a scheduling secondary cell from a second secondary cell to the first secondary cell. The wireless device may activate the first secondary cell and may start monitoring one or more CORESETs/search spaces of the first secondary cell in response to receiving the one or more messages. In an example, the wireless device may activate the first secondary cell and may start monitoring one or more CORESETs/search spaces of the first secondary cell in response to receiving the one or more messages and without receiving an activation command (e.g., without receiving an activation MAC CE). In an example, activating the first secondary cell may comprise at least one of: sounding reference signal (SRS) transmission on the first secondary cell, channel state information (CSI) reporting for the first secondary cell, physical downlink control channel (PDCCH) monitoring on the first secondary cell, PDCCH monitoring for the first secondary cell, and physical uplink control channel (PUCCH) transmission on the first secondary cell.

In an example, the wireless device may activate the first secondary cell in response to receiving the one or more messages and in a first timing (e.g., in a first timing after reception of the one or more messages). In an example, the wireless device may start monitoring one or more CORESETs/search spaces of the first secondary cell in response to receiving the one or more messages and in a first timing (e.g., in a first timing after reception of the one or more messages). In an example, the first timing may be based on a reference timing. For example, the reference timing may be based on a system frame number (e.g., SFN=0). For example, the first timing may be based on a first subframe (e.g., subframe 0) of a reference system frame number (e.g., SFN=0). For example, the first timing may be based on an offset parameter. For example, the first timing may be an offset to a subframe of the reference system frame number. The one or more messages may comprise an offset parameter indicating the offset. The offset may be in a first number of symbols/slots.

Figure 19:
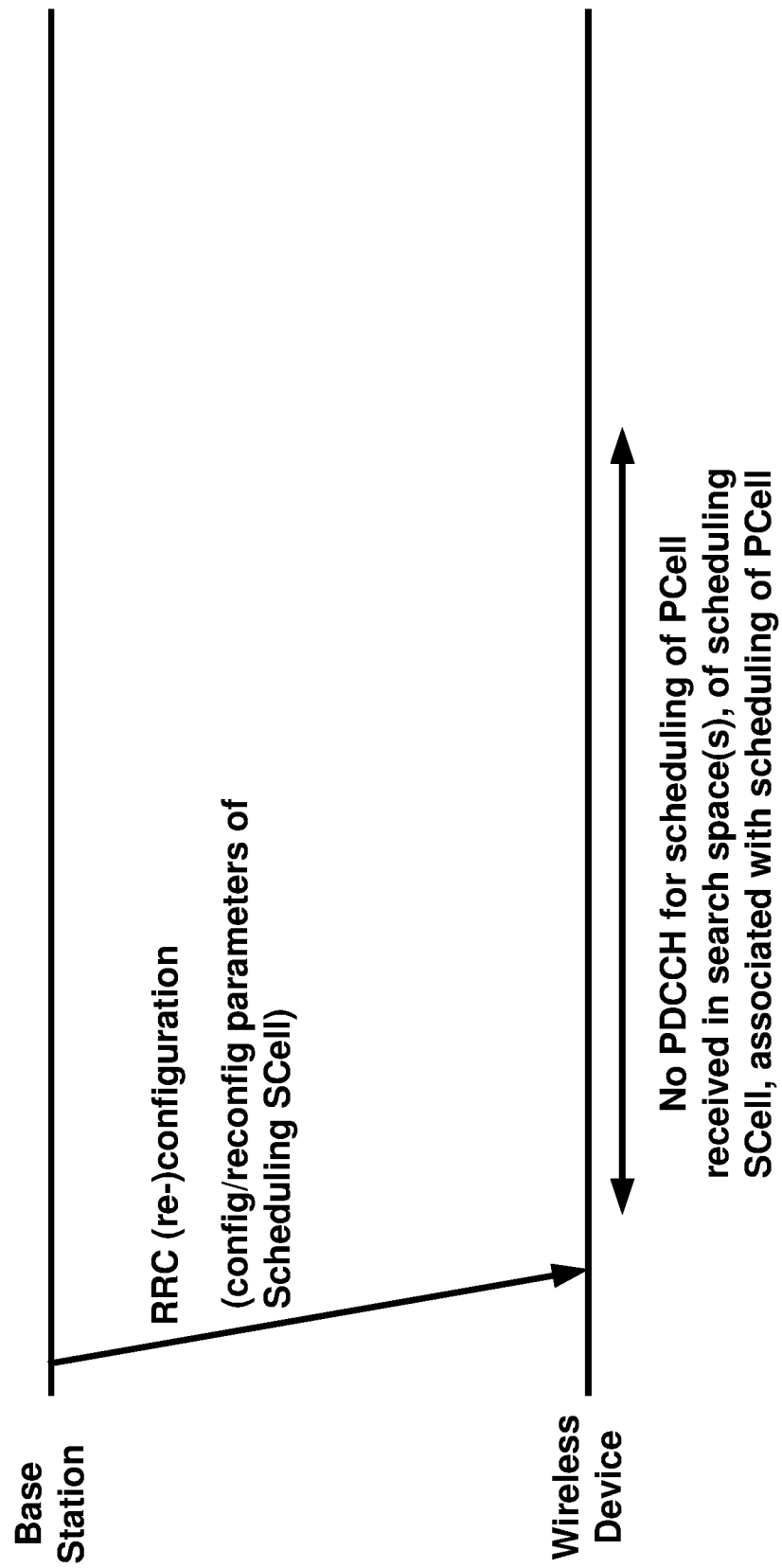
FIG. 19 shows an example process in accordance with several of various embodiments of the present disclosure.
Figure 20:
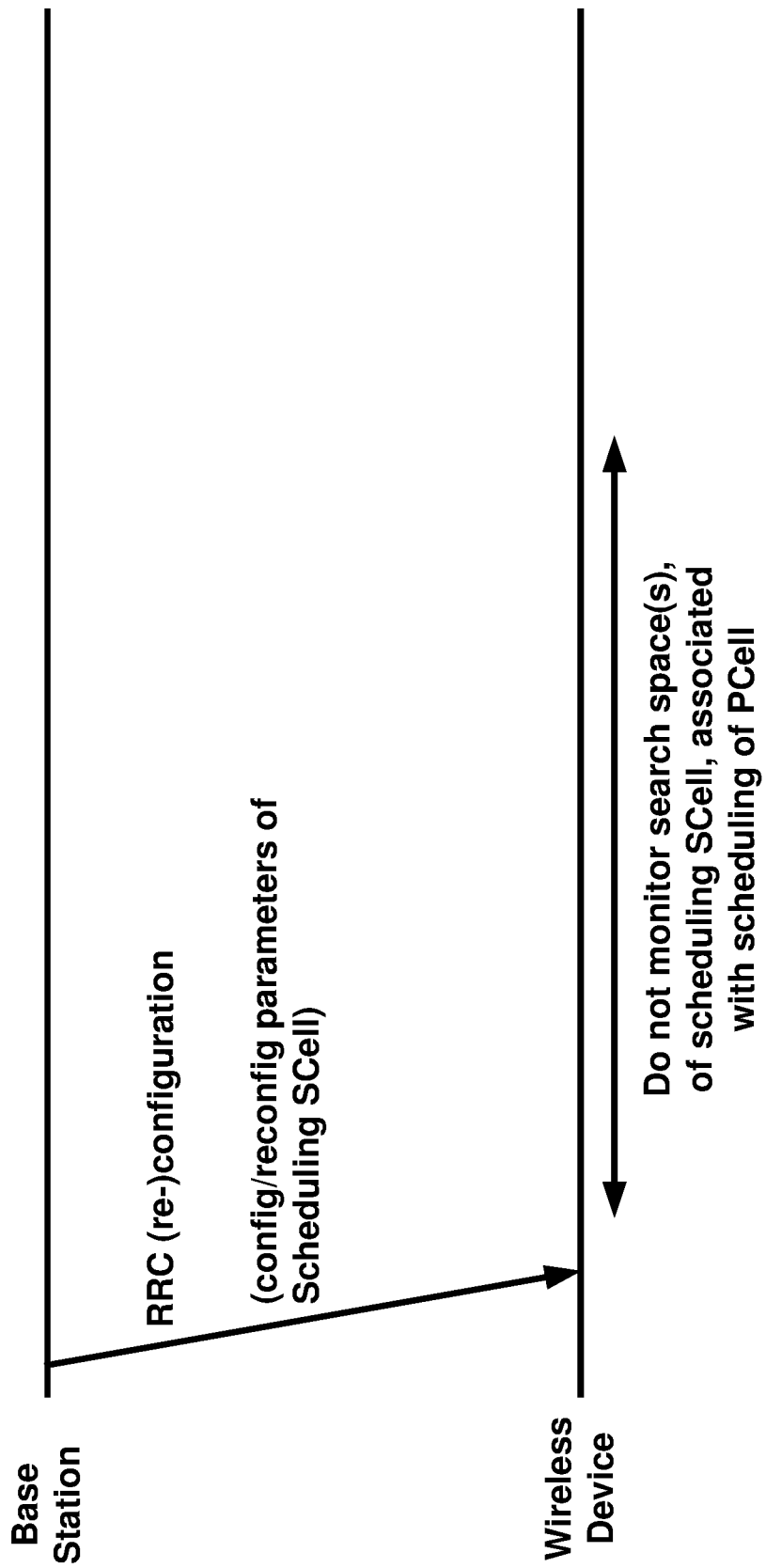
FIG. 20 shows an example process in accordance with several of various embodiments of the present disclosure.
Figure 21:
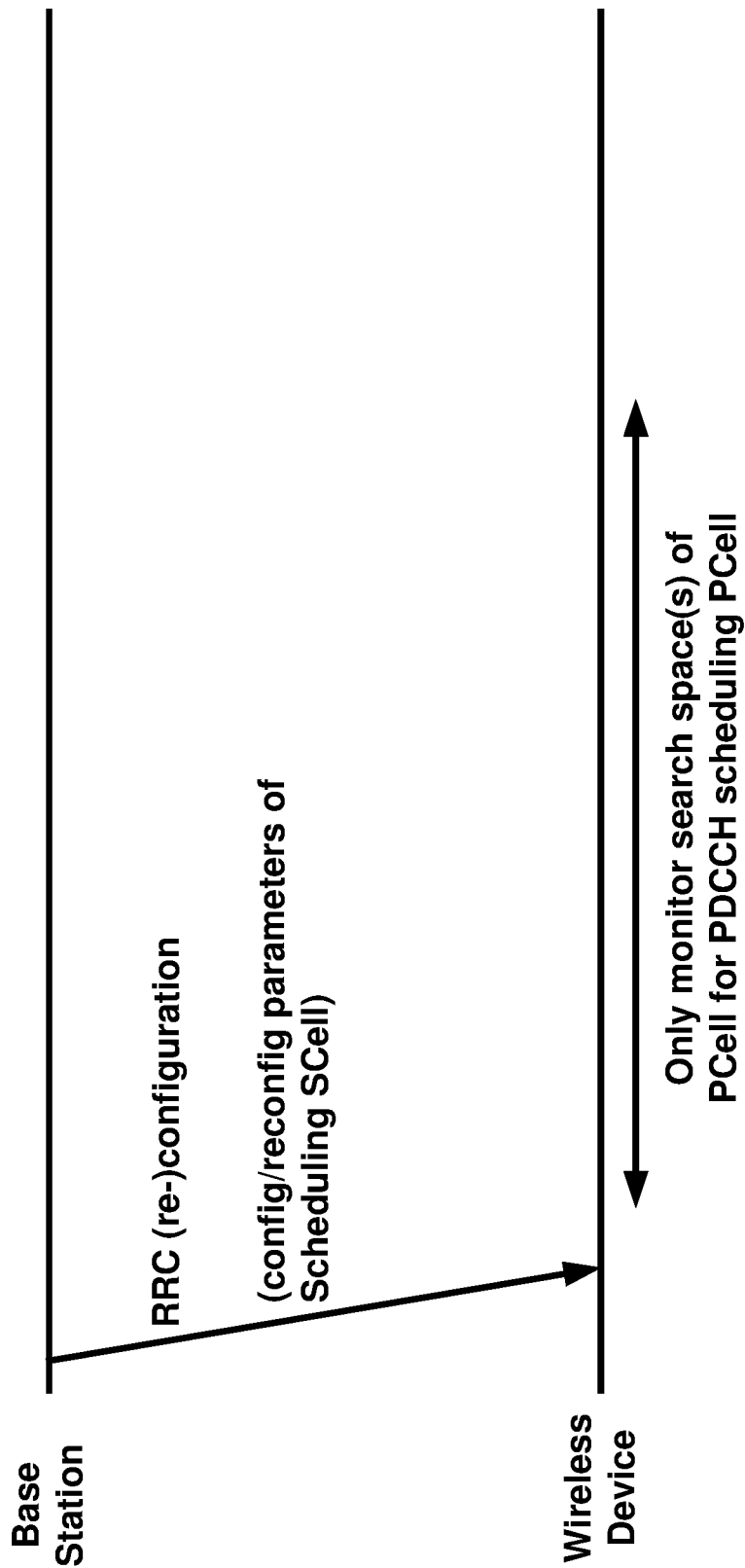
FIG. 21 shows an example process in accordance with several of various embodiments of the present disclosure.

In example embodiments as shown in FIG. 19, FIG. 20, and FIG. 21, in response to receiving the one or more messages and based on the one or more messages comprising the first configuration parameters associated with scheduling of the primary cell (e.g., PCell or PSCell) via the first secondary cell, the wireless device may stop monitoring and/or may not monitor one or more CORESETs/search spaces, of the first secondary cell, associated with scheduling of the primary cell. In an example, the wireless device may stop monitoring and/or may not monitor the one or more CORESETs/search spaces, of the first secondary cell, associated with scheduling of the primary cell during a time window after receiving the one or more messages. The wireless device may monitor (e.g., may only monitor) one or more second search spaces of the primary cell for receiving scheduling/control information associated with scheduling (e.g., scheduling PDSCH or PUSCH) of the primary cell while stopping monitoring or not monitoring (e.g., during the time window) the one or more search spaces of the first secondary cell. The wireless device may not receive (e.g., may not receive during the time window) a downlink control channel, associated with scheduling of the primary cell, on the first secondary cell. In an example, the wireless device may not receive a downlink control channel, associated with scheduling of the primary cell, on the first secondary cell during the time window. In an example, the time window (e.g., a duration of the time window) may be based on a processing time of the one or more messages. In an example, the starting time of the time window may be based on a reference timing. For example, the reference timing may be based on a system frame number (e.g., SFN=0). For example, the starting time may be based on a first subframe (e.g., subframe 0) of a reference system frame number (e.g., SFN=0). For example, the starting time may be based on an offset parameter. For example, the starting time may be an offset to a subframe of the reference system frame number. The one or more messages may comprise an offset parameter indicating the offset. The offset may be in a first number of symbols/slots.

In an example embodiment, a wireless device may receive one or more messages comprising one or more RRC messages. The one or more RRC messages may comprise at least one first configuration parameter indicating a bandwidth part (BWP) identifier of a first active downlink BWP (e.g., firstActiveDownlinkBWP-Id) of a first secondary cell and/or at least one second configuration parameter indicating a BWP identifier of a first active uplink BWP of the first secondary cell (e.g., firstActiveUplinkBWP-Id). The first secondary cell may be a scheduling secondary cell (sSCell) for a primary cell. For example, the one or more RRC messages may comprise configuration parameters indicating that the first secondary cell is a scheduling secondary cell (sSCell) for the primary cell. In response to receiving the at least one first configuration parameter, the first active downlink BWP may be the active downlink BWP (e.g., without receiving a downlink assignment/DCI indicating the first active downlink BWP as the active BWP). In response to receiving the at least one second configuration parameter, the first active uplink BWP may be the active uplink BWP of the first secondary cell (e.g., without receiving an uplink grant/DCI indicating the first active uplink BWP as the active BWP). In an example, the wireless device may switch from a second downlink BWP to the first active downlink BWP in response to receiving the at least one first configuration parameter. In an example, the wireless device may switch from a second uplink BWP to the first active uplink BWP in response to receiving the at least one second configuration parameter.

In an example embodiment, upon RRC (re-)configuration of firstActiveDownlinkBWP-Id and/or firstActiveUplinkBWP-Id for a scheduling SCell (sSCell) for a primary cell (e.g., PCell or PSCell), the DL BWP and/or UL BWP indicated by firstActiveDownlinkBWP-Id and/or firstActiveUplinkBWP-Id respectively may be active without receiving PDCCH indicating a downlink assignment or an uplink grant.

Figure 22:
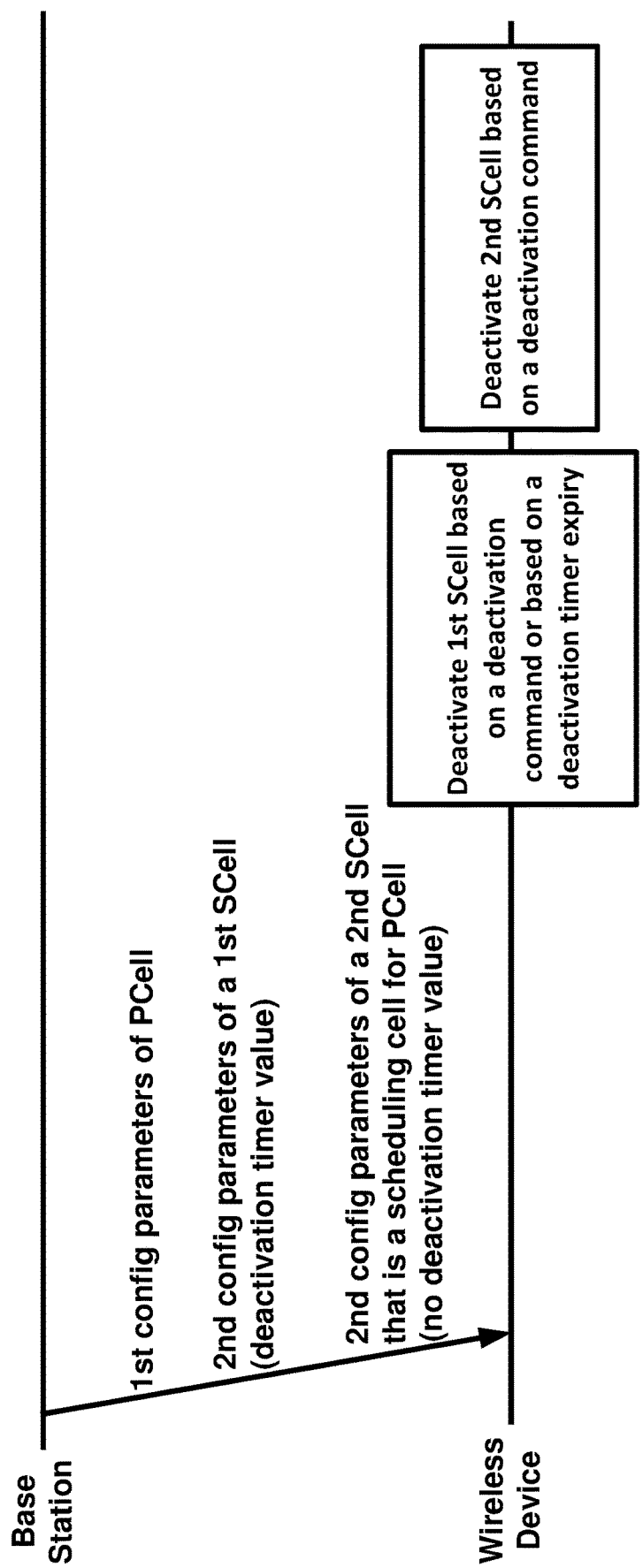
FIG. 22 shows an example process in accordance with several of various embodiments of the present disclosure.

In an example embodiment as shown in FIG. 22, a wireless device may receive one or more messages (e.g., one or more RRC messages) comprising configuration parameters of a plurality of cells comprising a primary cell and a plurality of secondary cells. The configuration parameters may comprise first configuration parameters of a primary cell, second configuration parameters of a first secondary cell and third configuration parameters of a second secondary cell. The second secondary cell may be a scheduling secondary cell (sSCell) for the primary cell (e.g., PCell or PSCell). For example, the first configuration parameters of the primary cell may comprise a parameter indicating an identifier of the second secondary cell as a scheduling secondary cell for the primary cell. For example, the third configuration parameters of the second secondary cell may comprise one or more parameters indicating that the second secondary cell is a scheduling cell for the primary cell. For example, the third configuration parameters may comprise parameters of one or more CORESETs/search spaces of the second secondary used in monitoring for or receiving control/scheduling information associated with scheduling (e.g., scheduling PDSCH or PUSCH) of the primary cell. The third configuration parameters of the second secondary cell may indicate that the second secondary cell is a scheduling cell for the primary cell.

The wireless device may deactivate the first secondary cell based on an expiry of a timer (e.g., a SCell deactivation timer) associated with the first secondary cell or the wireless device may deactivate the first secondary cell based on receiving a command (e.g., a SCell deactivation MAC CE) indicating deactivation of the first secondary cell. In an example, based on the first secondary cell not being a scheduling cell for the primary cell, the wireless device may deactivate the first secondary cell either based on a deactivation timer associated with first secondary cell expiring or based on receiving a deactivation command from the base station. The one or more messages may comprise a deactivation timer parameter indicating a deactivation timer value for the first secondary cell. The wireless device may start the deactivation timer of the first secondary cell with the deactivation timer value based on one or more conditions, for example, based on reception of grant on and/or for the first secondary cell, etc. The wireless device may deactivate the second secondary cell based on receiving a command (e.g., a SCell deactivation MAC CE) indicating deactivation of the second secondary cell. In an example, based on the second secondary cell being a scheduling SCell (sSCell) for the primary cell, deactivation of the second secondary cell may only be based on reception of a deactivation command (e.g., a SCell deactivation MAC CE) from the base station and may not be based on expiry of a deactivation timer for the second secondary cell. Based on the second secondary cell being the scheduling cell for the primary cell, the wireless device may not receive a configuration parameter for a deactivation timer value for the second secondary cell or a configuration parameter for the deactivation timer value for the second secondary cell may indicate a value of infinity.

In an example embodiment, if a SCell is not a scheduling SCell for the primary cell (e.g., PCell or PSCell), the SCell may be deactivated either based on a deactivation command (e.g., a SCell deactivation MAC CE) or based on expiry of a deactivation timer associated with the SCell. If a SCell is a scheduling SCell for the primary cell, SCell may be deactivated by a deactivation command (e.g., SCell deactivation MAC CE) only. In an example, if a SCell is a scheduling SCell for the primary cell, the SCell may not be configured with a deactivation timer value or may be configured with a deactivation timer value of infinity.

Figure 23:
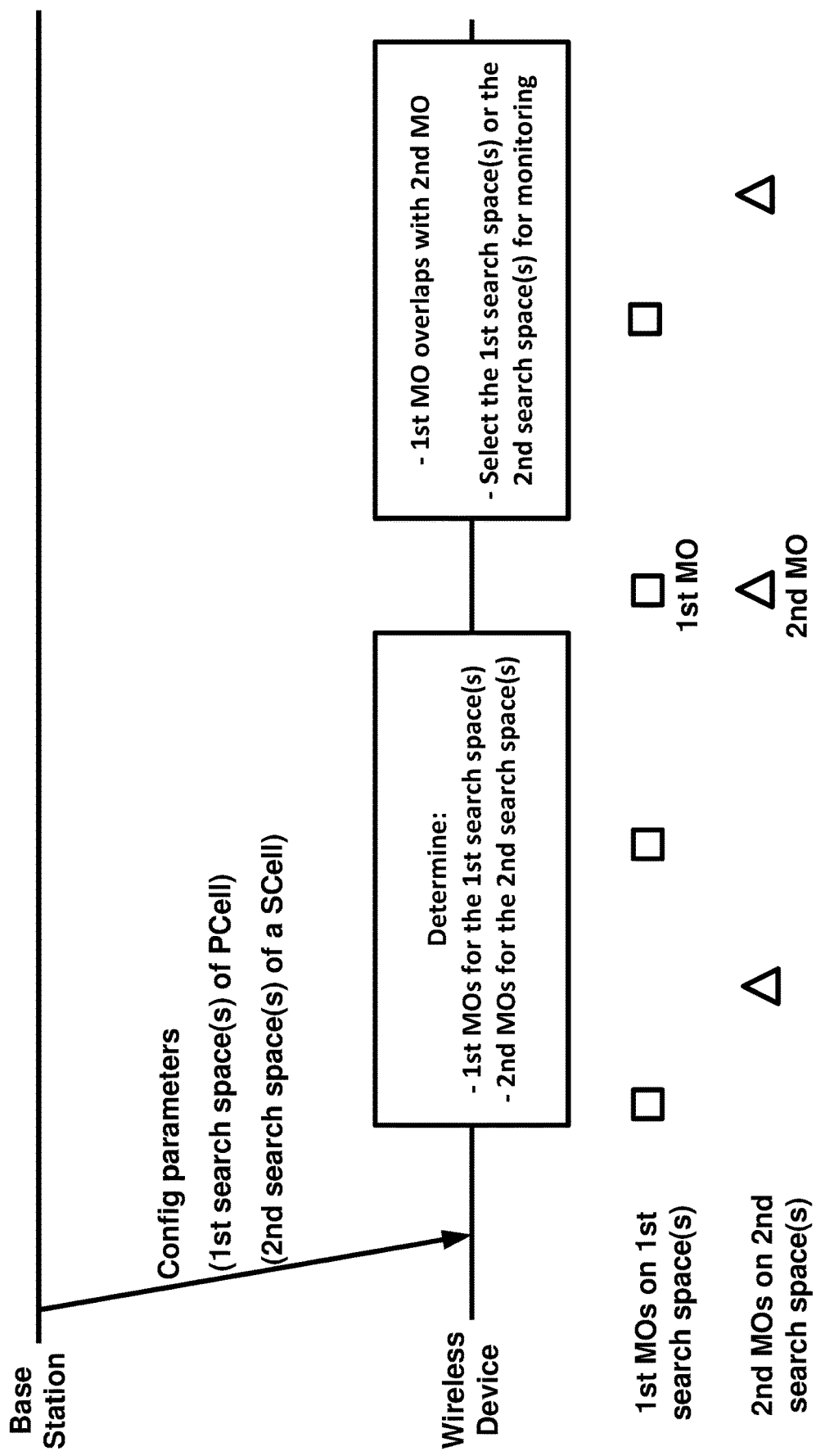
FIG. 23 shows an example process in accordance with several of various embodiments of the present disclosure.

In an example embodiment as shown in FIG. 23, a wireless device may receive one or more messages (e.g., one or more RRC messages) comprising configuration parameters of a plurality of cells comprising a primary cell (e.g., a PCell or a PSCell) and a secondary cell. The secondary cell may be a scheduling secondary cell (sSCell) for the primary cell. For example, the configuration parameters, of the primary cell, may comprise a parameter indicating an identifier of the secondary cell as a scheduling secondary cell for the primary cell. For example, the configuration parameters of the secondary cell may comprise one or more parameters indicating that the secondary cell is a scheduling cell for the primary cell. For example, the configuration parameters of the secondary cell may comprise parameters of one or more first CORESETs/search spaces of the secondary used in monitoring for or receiving control/scheduling information associated with scheduling (e.g., scheduling PDSCH or PUSCH) of the primary cell. The configuration parameters of the secondary cell may indicate that the secondary cell is a scheduling cell for the primary cell.

The one or more messages may comprise configuration parameters of one or more first CORESETs/search spaces of a primary cell (e.g., a PCell or a PSCell) and one or more second CORESETs/search spaces of a secondary cell. The one or more first CORESETs/search spaces of the primary cell and the one or more second CORESETs/search spaces of the secondary cell may be used in monitoring for or receiving control/scheduling information associated with scheduling (e.g., scheduling PDSCH or PUSCH) of the primary cell. The configuration parameters of the one or more first CORESETs/search spaces may comprise first parameters (e.g., first monitoring slot periodicity and offset, a first duration parameter, a first monitoring symbol within slot parameter, etc.) for determining first monitoring occasions (MOs) for monitoring the one or more first CORESETs/search spaces of the primary cell. The configuration parameters of the one or more second CORESETs/search spaces may comprise second parameters (e.g., second monitoring slot periodicity and offset, a second duration parameter, a second monitoring symbol within slot parameter, etc.) for determining second monitoring occasions (MOs) for monitoring the one or more second CORESETs/search spaces of the secondary cell. A first MO, of the first MOs, may overlap with a second MO of the second MOs. The first MO and the second MO may overlap in one or more symbols.

In an example embodiment, in response to the first MO, associated with the one or more first CORESETs/search spaces of the primary cell, and the second MO, associated with the one or more second CORESETs/search spaces of the secondary cell, overlapping in one or more symbols, the wireless device may select one of the one or more first CORESETs/search spaces and the one or more second CORESETs/search spaces to monitor (e.g., monitor during a timing associated with the overlapping first MO and second MO).

In an example embodiment, in response to the first MO, associated with the one or more first CORESETs/search spaces of the primary cell, and the second MO, associated with the one or more second CORESETs/search spaces of the secondary cell, overlapping in one or more symbols, the wireless device may select the one or more first CORESETs/search spaces to monitor (e.g., monitor during a timing associated with the overlapping first MO and second MO) for reception of scheduling/control information associated with scheduling (e.g., scheduling PDSCH or PUSCH) of the primary cell.

In an example embodiment, in response to the first MO, associated with the one or more first CORESETs/search spaces of the primary cell, and the second MO, associated with the one or more second CORESETs/search spaces of the secondary cell, overlapping in one or more symbols, the wireless device may select the one or more second CORE- SETs/search spaces to monitor (e.g., monitor during a timing associated with the overlapping first MO and second MO) for reception of scheduling/control information associated with scheduling (e.g., scheduling PDSCH or PUSCH) of the primary cell.

In an example embodiment, in response to the first MO, associated with the one or more first CORESETs/search spaces of the primary cell, and the second MO, associated with the one or more second CORESETs/search spaces of the secondary cell, overlapping in one or more symbols, the wireless device may monitor (e.g., monitor during a timing associated with the overlapping first MO and second MO) both of the one or first CORESETs/search spaces and the one or more second CORESETs/search spaces for reception of scheduling/control information associated with scheduling (e.g., scheduling PDSCH or PUSCH) of the primary cell.

In an example embodiment, the wireless device may transmit a capability message to the base station. The capability message may comprise one or more capability information elements indicating that the wireless device is capable of monitoring multiple CORESETs/search spaces on multiple cells (e.g., a primary cell and a scheduling secondary cell) for reception of scheduling/control information associated with scheduling (e.g., scheduling PDSCH or PUSCH) of the primary cell. In an example, the one or more capability information elements may indicate that the wireless device is capable of monitoring the multiple CORESETs/search spaces on the multiple cells simultaneously (e.g., during overlapping MOs). In an example, in response to the wireless device being capable of monitoring multiple CORESETs/search spaces on multiple cells, the base station may configure the first parameters of the one or more first CORESETs/search spaces and the second parameters of the one or more second CORESETs/search spaces resulting in overlapping MOs. In response to the wireless device being capable of monitoring multiple CORESETs/search spaces on multiple cells and in response to the first MO, associated with the one or more first CORESETs/search spaces of the primary cell, and the second MO, associated with the one or more second CORESETs/search spaces of the secondary cell, overlapping in one or more symbols, the wireless device may monitor (e.g., monitor during a timing associated with the overlapping first MO and second MO) both of the one or first CORESETs/search spaces and the one or more second CORESETs/search spaces for reception of scheduling/control information associated with scheduling (e.g., scheduling PDSCH or PUSCH) of the primary cell.

Figure 24:
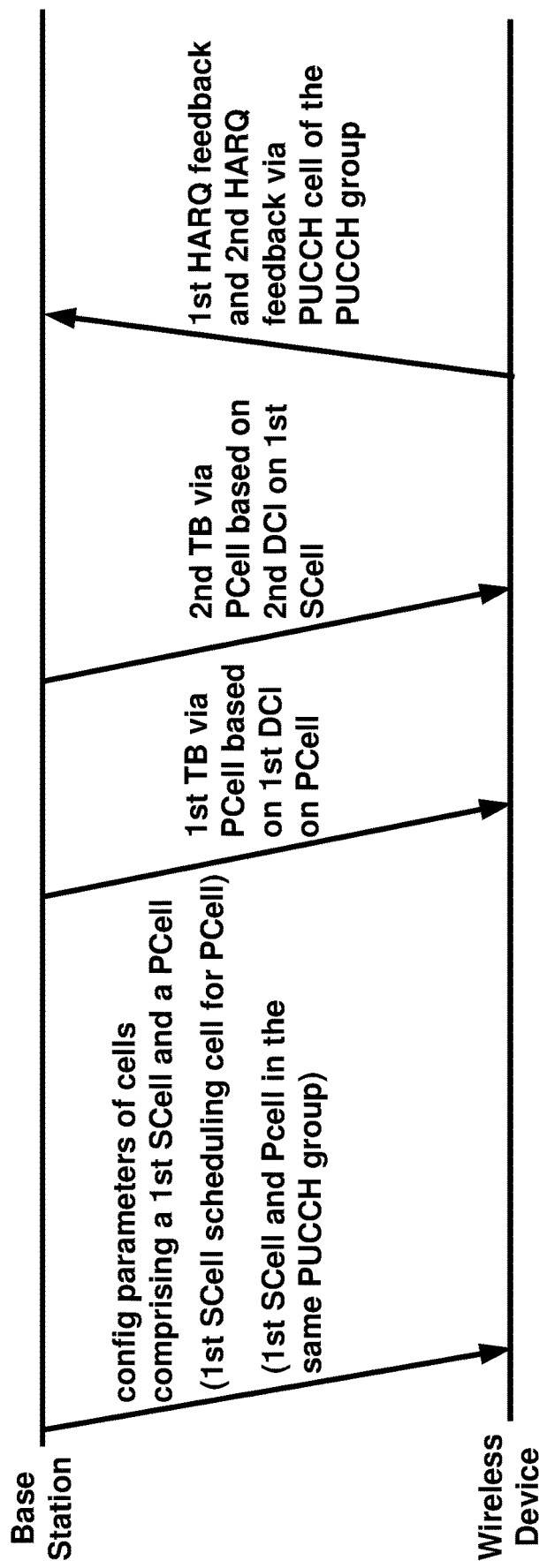
FIG. 24 shows an example process in accordance with several of various embodiments of the present disclosure.

In an example embodiment as shown in FIG. 24, a wireless device may receive one or more messages (e.g., one or more RRC messages) comprising configuration parameters of a plurality of cells comprising a primary cell and a secondary cell. The secondary cell may be a scheduling secondary cell (sSCell) for the primary cell (e.g., PCell or PSCell). For example, the configuration parameters, of the primary cell, may comprise a parameter indicating an identifier of the secondary cell as a scheduling secondary cell for the primary cell. For example, the configuration parameters of the secondary cell may comprise one or more parameters indicating that the secondary cell is a scheduling cell for the primary cell. For example, the configuration parameters of the secondary cell may comprise parameters of one or more CORESETs/search spaces of the secondary used in monitoring for or receiving control/scheduling information associated with scheduling (e.g., scheduling PDSCH or PUSCH) of the primary cell. The configuration parameters of the secondary cell may indicate that the secondary cell is a scheduling cell for the primary cell.

The secondary cell and the primary cell may be in the same cell group (e.g., PUCCH group). In an example, a scheduling secondary cell and a primary cell may be in the same PUCCH group or may be in different PUCCH groups based on a capability parameter indicating that the wireless device is capable of the primary cell and the scheduling secondary cell being configured in different PUCCH groups. For example, the configuration parameters of the secondary cell may comprise a parameter indicating that the primary cell is used for PUCCH transmission (e.g., HARQ feedback associated with PDSCH received via the secondary cell). The secondary cell and the primary cell may be in the same PUCCH group (e.g., the primary PUCCH group). In an example, based on the secondary cell being a scheduling cell for the primary cell, both the secondary cell and the primary cell may be in the same PUCCH group. In an example, the wireless device may transmit to the base station one or more capability messages comprising one or more capability IEs indicating whether the wireless device is capable of the primary cell and the scheduling cell being configured in different PUUCH groups. In an example, the one or more capability IEs may indicate that the wireless device is not capable of the primary cell and the scheduling cell being configured in different PUUCH groups.

The wireless device may receive a first DCI via the primary cell, the first DCI indicating scheduling information for reception of a first downlink TB via the primary cell. The wireless device may receive the first DCI based on monitoring one or more first CORESETs/search spaces of the primary cell that may be associate with scheduling (e.g., scheduling PDSCH or PUSCH) of the primary cell. The wireless device may receive the first downlink TB via the primary cell based on the first DCI received on the primary cell. The wireless device may receive a second DCI via the secondary cell, the second DCI indicating scheduling information for reception of a second downlink TB via the primary cell. The wireless device may receive the second DCI based on monitoring one or more second CORESETs/search spaces of the secondary cell that may be associate with scheduling (e.g., scheduling PDSCH or PUSCH) of the primary cell. The wireless device may receive the second downlink TB via the primary cell based on the second DCI received on the secondary cell. The wireless device may transmit a first HARQ feedback associated with the first downlink TB and a second HARQ feedback associate with the second downlink TB via a PUCCH of the same cell (e.g., PUCCH of the primary cell).

In example embodiments as shown in FIG. 25, FIG. 26, FIG. 27 and FIG. 28, a wireless device may receive one or more messages (e.g., one or more RRC messages) comprising configuration parameters of a plurality of cells comprising a primary cell (e.g., PCell or PSCell) and a secondary cell. The secondary cell may be a scheduling secondary cell (sSCell) for the primary cell. For example, the configuration parameters, of the primary cell, may comprise a parameter indicating an identifier of the secondary cell as a scheduling secondary cell for the primary cell. For example, the configuration parameters of the secondary cell may comprise one or more parameters indicating that the secondary cell is a scheduling cell for the primary cell. For example, the configuration parameters of the secondary cell may comprise parameters of one or more CORESETs/search spaces of the secondary used in monitoring for or receiving control/scheduling information associated with scheduling (e.g., scheduling PDSCH or PUSCH) of the primary cell. The configuration parameters of the secondary cell may indicate that the secondary cell is a scheduling cell for the primary cell.

Figure 25:
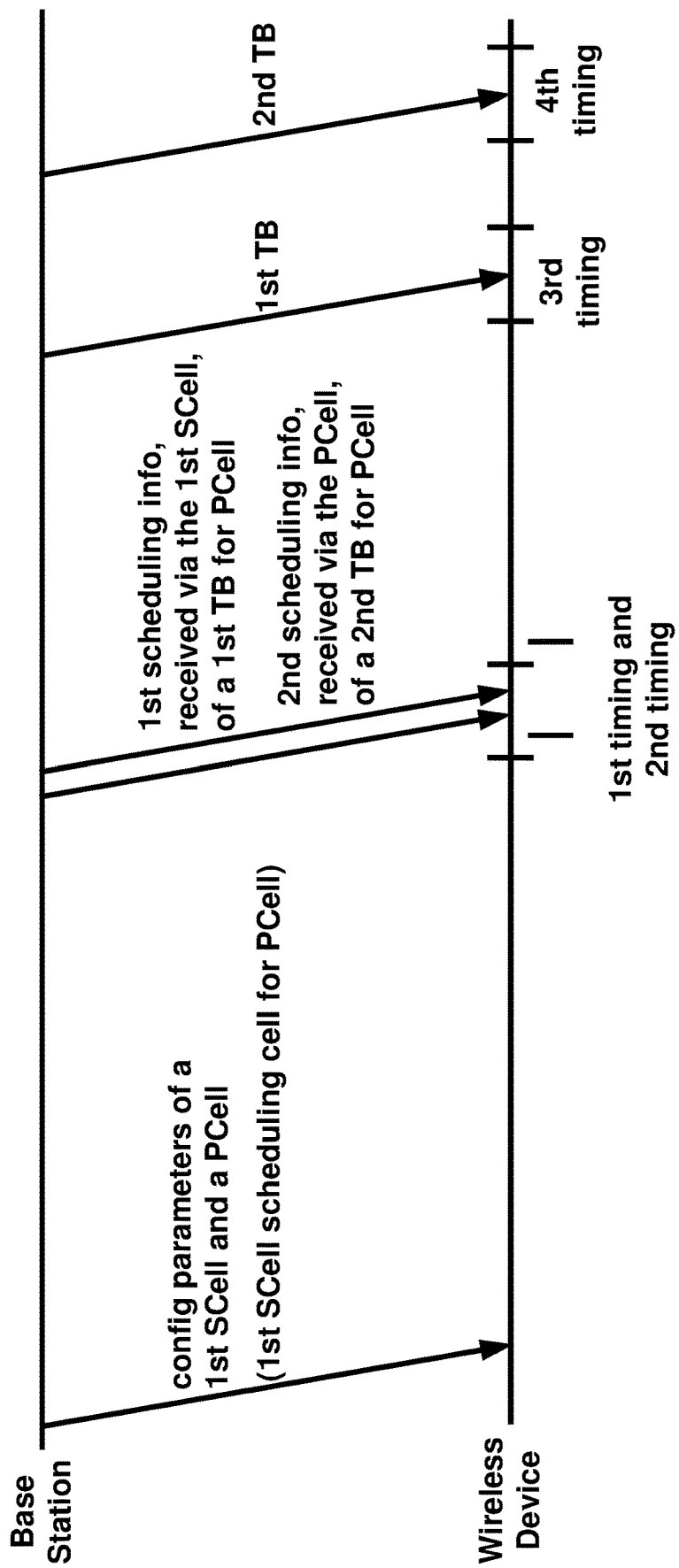
FIG. 25 shows an example process in accordance with several of various embodiments of the present disclosure.
Figure 26:
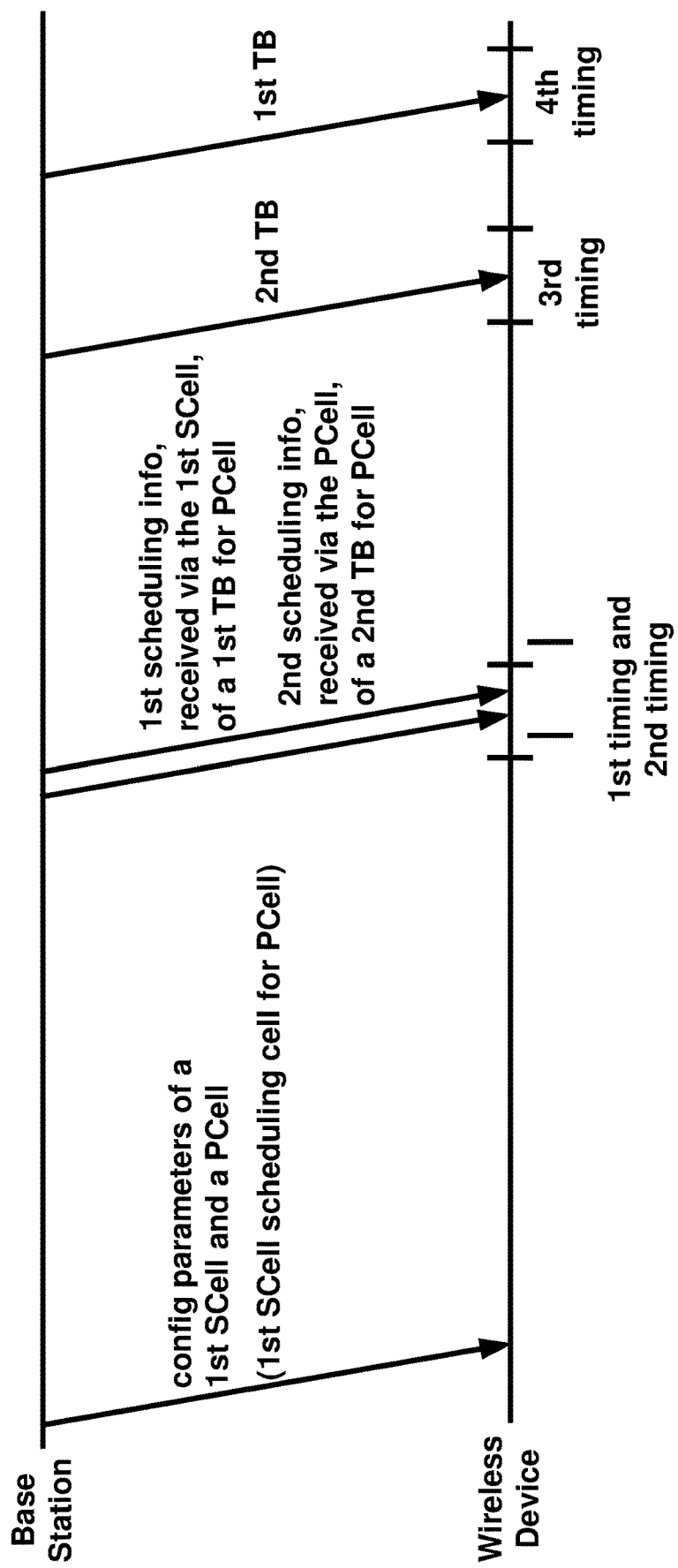
FIG. 26 shows an example process in accordance with several of various embodiments of the present disclosure.

In example embodiments as shown in FIG. 25 and FIG. 26, the wireless device may receive, in a first timing and via the secondary cell, first scheduling information/control for reception of a first transport block via the primary cell. The wireless device may receive a first DCI in the first timing and via the secondary cell indicating the first scheduling/control information. The wireless device may receive, in a second timing and via the primary cell, second scheduling information for reception of a second transport block via the primary cell. The wireless device may receive a second DCI in the second timing and via the secondary cell indicating the first scheduling/control information. The first timing and the second timing may overlap, for example in one or more symbols.

Figure 27:
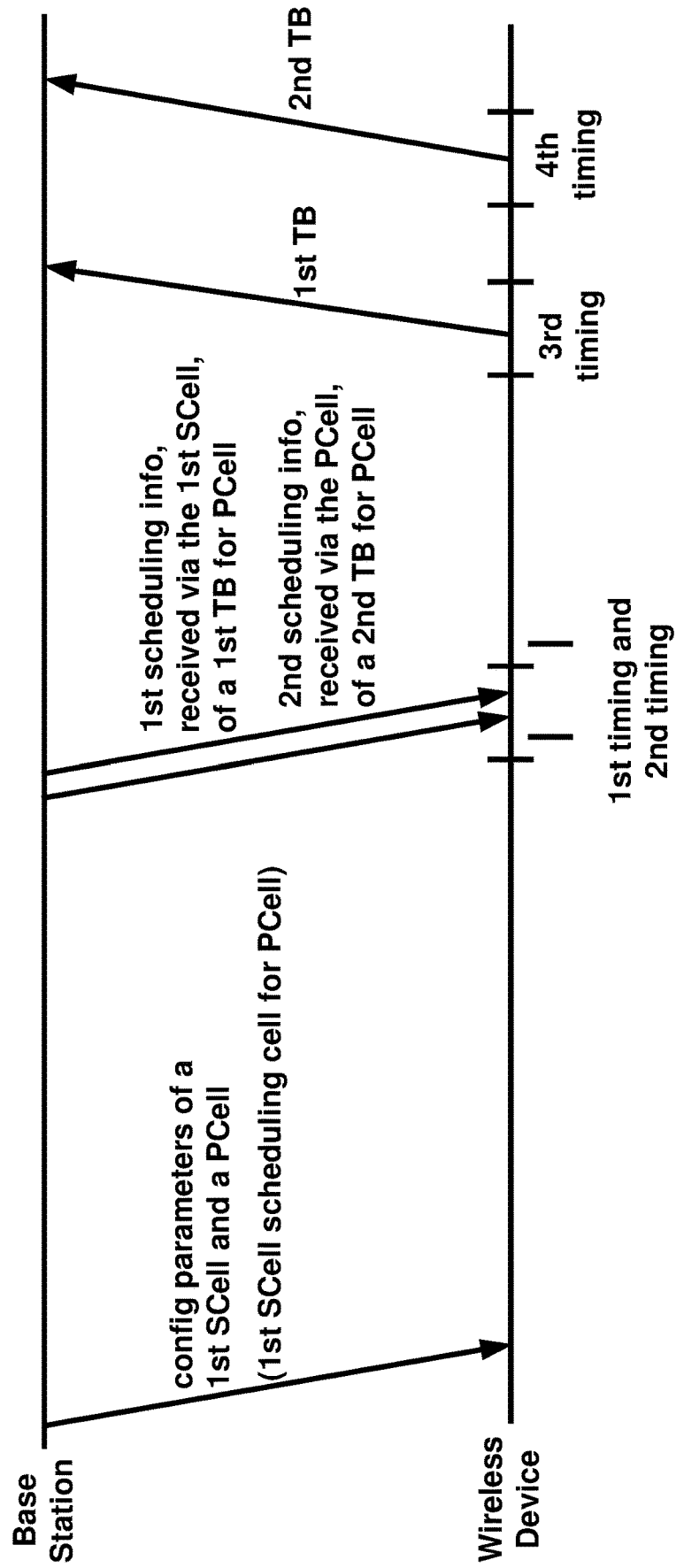
FIG. 27 shows an example process in accordance with several of various embodiments of the present disclosure.
Figure 28:
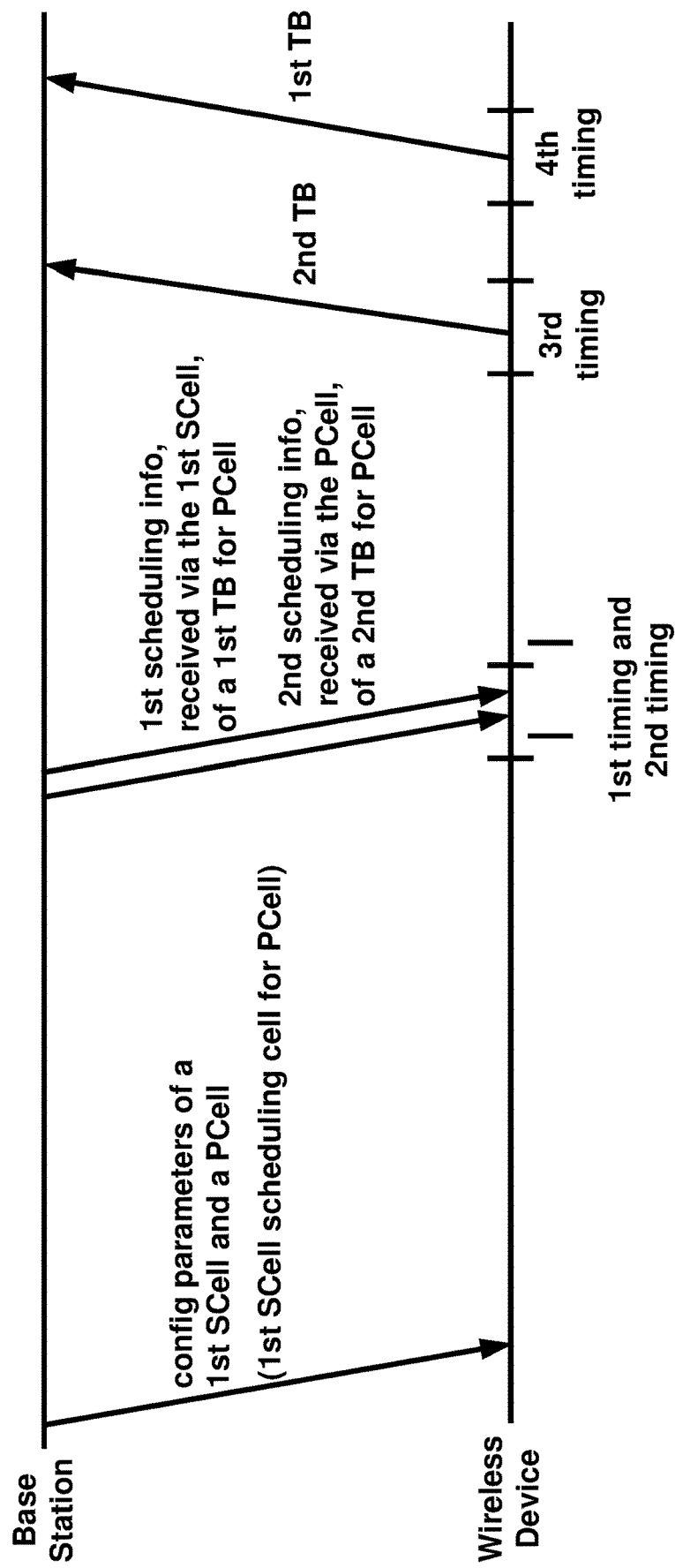
FIG. 28 shows an example process in accordance with several of various embodiments of the present disclosure.

In example embodiments as shown in FIG. 27 and FIG. 28, the wireless device may receive, in a first timing and via the secondary cell, first scheduling information/control for transmission of a first transport block via the primary cell. The wireless device may receive a first DCI in the first timing and via the secondary cell indicating the first scheduling/control information. The wireless device may receive, in a second timing and via the primary cell, second scheduling information for transmission of a second transport block via the primary cell. The wireless device may receive a second DCI in the second timing and via the secondary cell indicating the first scheduling/control information. The first timing and the second timing may overlap, for example in one or more symbols.

In example embodiments, the relative timing of the first transport block and the second transport block may be based on (e.g., may be constrained based on) the first timing and the second timing overlapping in one or more symbols.

In an example embodiment, as shown in FIG. 25 and FIG. 27, a third timing of the first transport block may be earlier than a fourth timing of the second transport block based on the first timing and the second timing overlapping.

In an example embodiment, as shown in FIG. 26 and FIG. 28, a third timing of the second transport block may be earlier than the fourth timing of the second transport block based on the first timing and the second timing overlapping.

In an example, a wireless device may be capable of monitoring PDCCH on the primary cell and the sSCell in the same timing/slot and may indicate this capability to the base station by transmitting a capability message comprising one or more capability IEs. The wireless device may monitor PDCCH on a primary cell and a sSCell in the same timing/slot. The wireless device may receive a first PDCCH in the primary cell and may receive a second PDCCH in a scheduling secondary cell. In an example embodiment, the second PDCCH received in sSCell may not schedule a second PDSCH/PUSCH on the primary cell that is earlier than a first PDSCH/PUSCH scheduled by the first PDCCH received in the primary cell. In an example embodiment, the second PDCCH received in sSCell may not schedule a second PDSCH/PUSCH on the primary cell that is later than a first PDSCH/PUSCH scheduled by the first PDCCH received in the primary cell.

Figure 29:
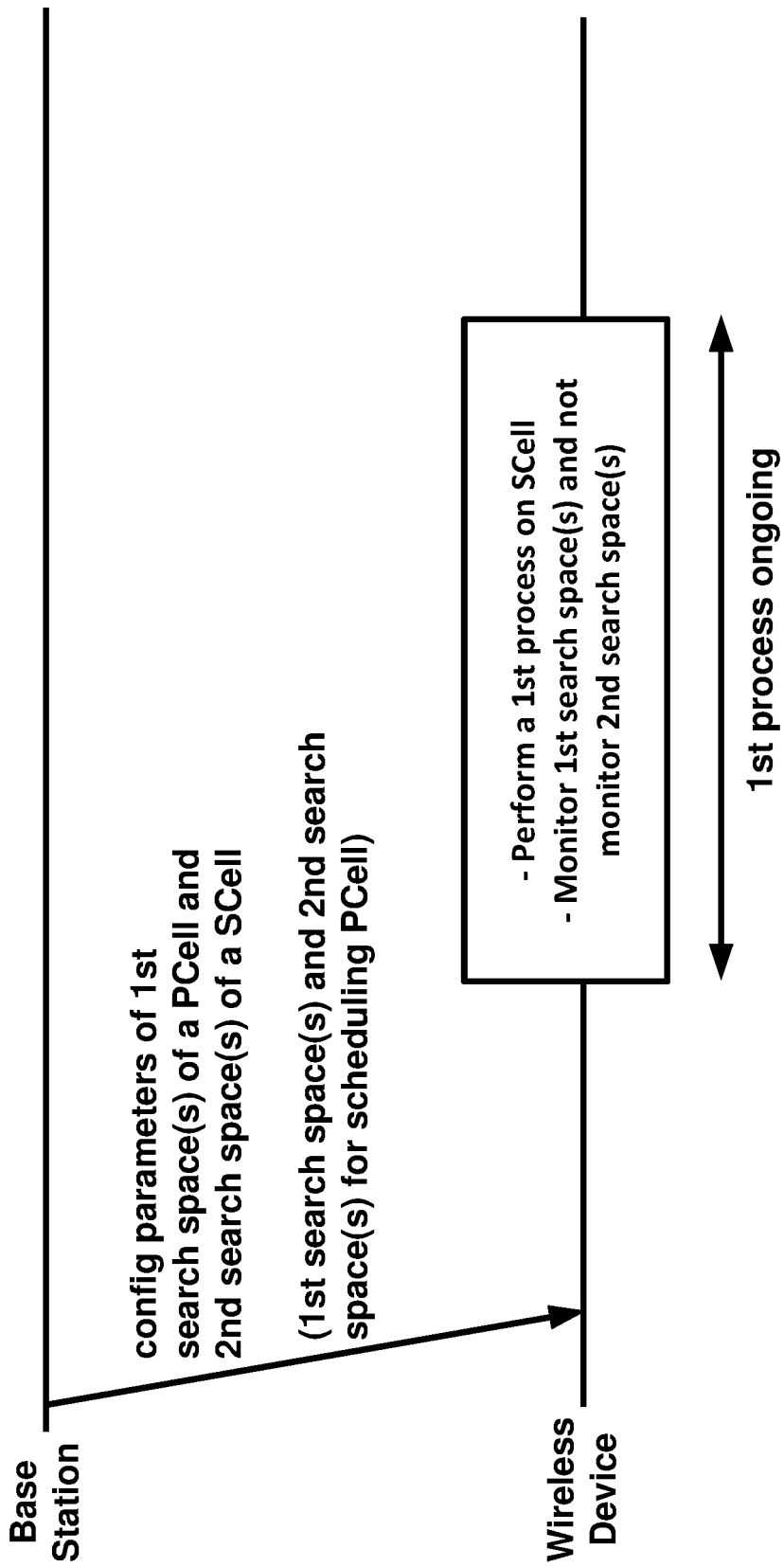
FIG. 29 shows an example process in accordance with several of various embodiments of the present disclosure.
Figure 30:
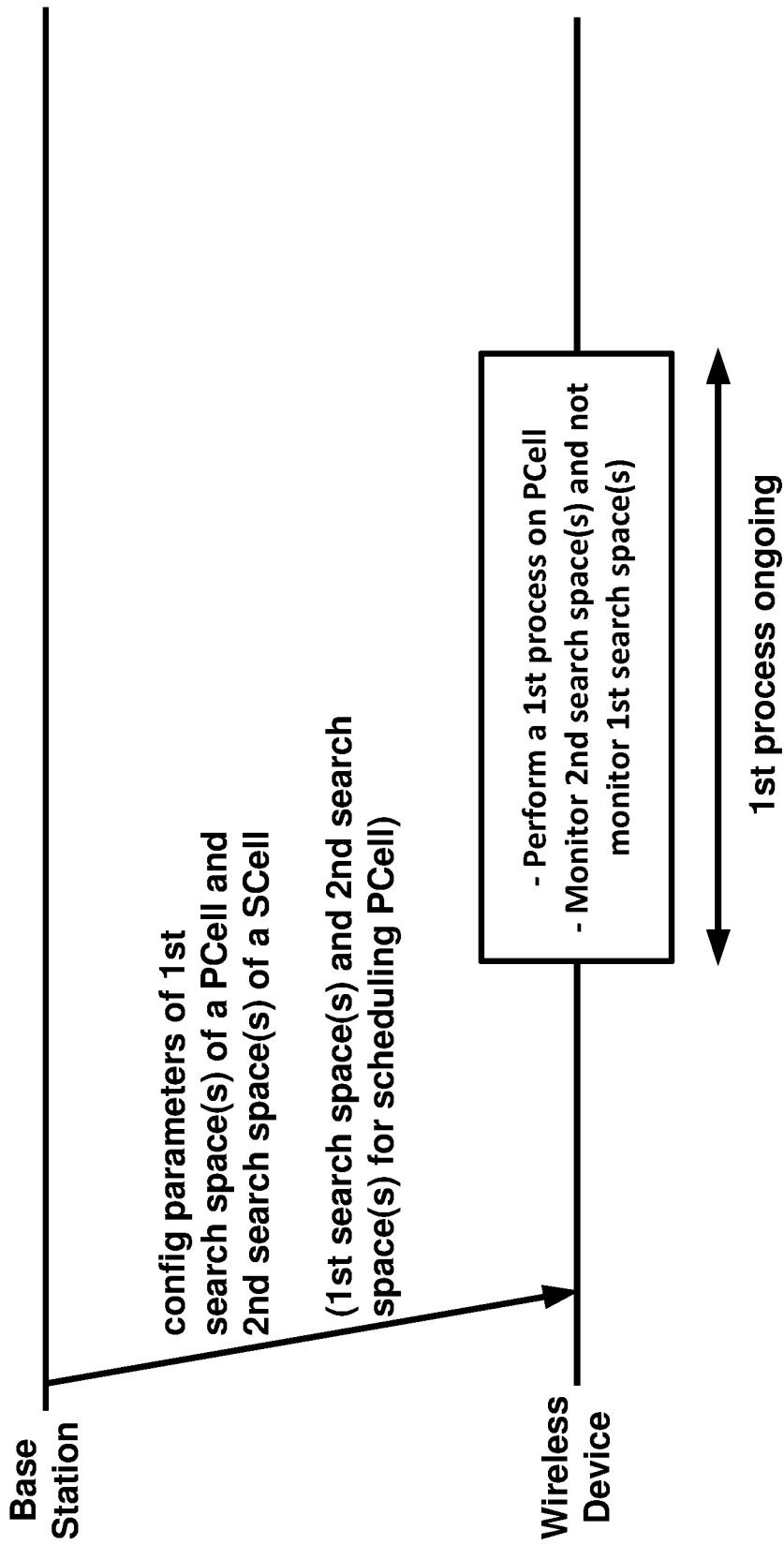
FIG. 30 shows an example process in accordance with several of various embodiments of the present disclosure.

In example embodiments as shown in FIG. 29 and FIG. 30, a wireless device may receive one or more messages (e.g., one or more RRC messages) comprising configuration parameters of a plurality of cells comprising a primary cell (e.g., a PCell or a PSCell) and a secondary cell. The secondary cell may be a scheduling secondary cell (sSCell) for the primary cell. For example, the configuration parameters, of the primary cell, may comprise a parameter indicating an identifier of the secondary cell as a scheduling secondary cell for the primary cell. For example, the configuration parameters of the secondary cell may comprise one or more parameters indicating that the secondary cell is a scheduling cell for the primary cell. For example, the configuration parameters of the secondary cell may comprise parameters of one or more CORESETs/search spaces of the secondary used in monitoring for or receiving control/scheduling information associated with scheduling (e.g., scheduling PDSCH or PUSCH) of the primary cell. The configuration parameters of the secondary cell may indicate that the secondary cell is a scheduling cell for the primary cell.

The one or more messages may comprise configuration parameters of one or more first CORESETs/search spaces of the primary cell and one or more second CORESETs/search spaces of the secondary cell. The one or more first CORESETs/search spaces and the one or more second CORESETs/search spaces may be associated with scheduling (e.g., scheduling PDSCH or PUSCH) on the primary cell. The wireless device may monitor the one or more first CORESETs/search spaces and the one or more second CORESETs/search spaces for receiving scheduling information associated with scheduling (e.g., scheduling PDSCH or PUSCH) of the primary cell.

In an example embodiment as shown in FIG. 30, the wireless device may perform a process (e.g., a random access process, a BWP switching process, etc.) on the primary cell. Based on performing the process on the primary cell and during a time window (e.g., a time window that is associated with timing/duration of performing the process), the wireless device may monitor the one or more second CORESETs/search spaces of the scheduling secondary cell and may not monitor the one or more first CORESETs/search spaces of the primary cell for example, for receiving scheduling/control information associated with scheduling (e.g., scheduling PDSCH or PUSCH) of the primary cell. Based on performing the process on the primary cell and during a time window (e.g., a time window that is associated with timing/duration of performing the process), the wireless device may only monitor the one or more second CORESETs/search spaces of the scheduling secondary cell for receiving scheduling/control information associated with scheduling (e.g., scheduling PDSCH or PUSCH) of the primary cell.

In an example embodiment as shown in FIG. 29, the wireless device may perform a process (e.g., a random access process, a BWP switching process, etc.) on the secondary cell (the sSCell). Based on performing the process on the secondary cell and during a time window (e.g., a time window that is associated with timing/duration of performing the process), the wireless device may monitor the one or more first CORESETs/search spaces of the primary cell and may not monitor the one or more second CORESETs/search spaces of the secondary cell for example, for receiving scheduling/control information associated with scheduling (e.g., scheduling PDSCH or PUSCH) of the primary cell. Based on performing the process on the secondary cell and during a time window (e.g., a time window that is associated with timing/duration of performing the process), the wireless device may only monitor the one or more first CORESETs/search spaces of the primary cell for receiving scheduling/control information associated with scheduling (e.g., scheduling PDSCH or PUSCH) of the primary cell.

The wireless device may receive a DCI (e.g., based on monitoring the one or more first CORESETs/search spaces or the one or more second CORESETs/search spaces) indicating scheduling information for reception or transmission of one or more transport block via the primary cell (e.g., via PDSCH or PUSCH of the primary cell). The wireless device may receive or transmit the one or more transport blocks based on the scheduling information indicated by the DCI.

Figure 31:
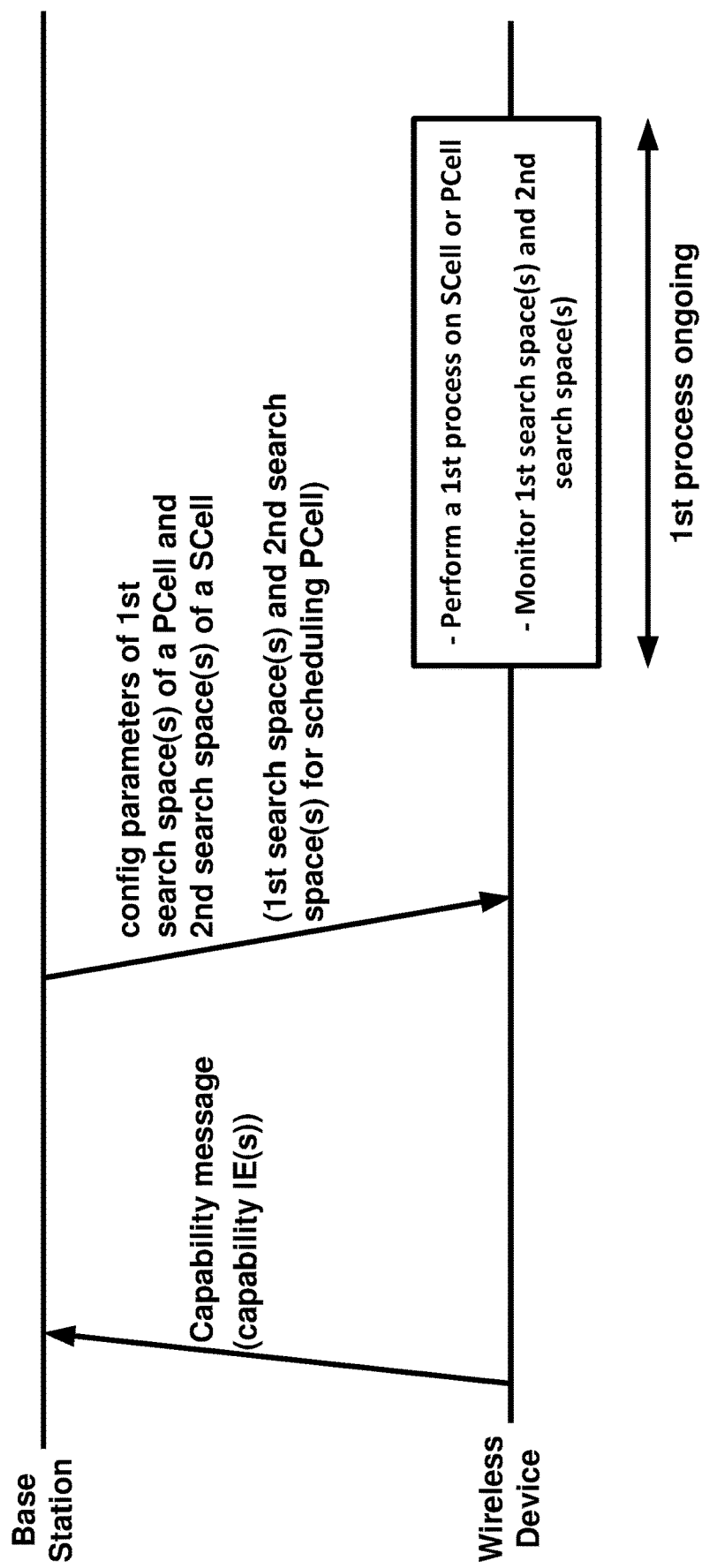
FIG. 31 shows an example process in accordance with several of various embodiments of the present disclosure.

In an example embodiment as shown in FIG. 31, the wireless device may transmit a capability message comprising one or more capability IEs indicating that the wireless device is capable of monitoring PDCCH, scheduling PDSCH or PUSCH for a primary cell, on both a primary cell and a scheduling secondary cell during (e.g., in a time window associated with) a process (e.g., a random access process, a BWP switching process, etc.) on the primary cell or a scheduling secondary cell. The wireless device may perform a process (e.g., a random access process, a BWP switching process, etc.) on the primary cell or the scheduling secondary cell. Based on the wireless device being capable of monitoring PDCCH on both the primary cell and the scheduling secondary cell while the process is ongoing or during a time window associated with the process, the wireless device may monitor the one or more second CORESETs/search spaces of the scheduling secondary cell and the one or more first CORESETs/search spaces of the primary cell for example, while the process is ongoing or during a time window associated with the process. The wireless device may monitor the one or more second CORESETs/search spaces and the one or more first CORESETs/search spaces, for example for receiving scheduling/control information associated with scheduling (e.g., scheduling PDSCH or PUSCH) of the primary cell.

In an example embodiment, a wireless device may receive a radio resource control (RRC) message comprising first configuration parameters associated with scheduling of a primary cell via a first secondary cell. The wireless device may start a timer in response to receiving the RRC message.

In an example, the first configuration may be for the first secondary cell.

In an example, the first configuration parameters may be for the primary cell. In an example, the first configuration parameters may comprise a first parameter indicating an identifier of the first secondary cell that is the scheduling cell for the primary cell.

In an example, the first configuration parameters may comprise search space configuration parameters of one or more search spaces of the first secondary cell for receiving control/scheduling information associated with scheduling of the primary cell (e.g., scheduling downlink/uplink TB s via PDSCH/PUSCH). In an example, the one or more search spaces may comprise one or more wireless device specific search spaces.

In an example, the timer may be a deactivation timer of the first secondary cell.

In an example, the timer may be an inactivity timer of a bandwidth part (e.g., initial/first active bandwidth part, current active bandwidth part, etc.) of the first secondary cell.

In an example, the timer may be associated with search space monitoring for receiving scheduling information associated with scheduling of the primary cell. In an example, the timer may be associated with one or more first search spaces of the first secondary cell that may be configured/used for receiving scheduling information (e.g., scheduling downlink/uplink TBs via PDSCH/PUSCH) of the primary cell. In an example, the monitoring the one or more first search spaces may be based on whether the timer is running or not. In an example, the wireless device may monitor the one or more first search spaces based on the timer running.

In an example, the RRC message may be an RRC reconfiguration message. In an example, the RRC message may indicate changing a scheduling secondary cell (e.g., secondary cell associated with scheduling of the primary cell) from a second secondary cell to the first secondary cell. In an example, the RRC message may indicate that: one or more second search spaces of the second secondary cell are not used for reception of scheduling information (e.g., scheduling information for scheduling downlink/uplink TBs via PDSCH/PUSCH) for the primary cell; and one or more first search spaces of the first secondary cell are used for reception of scheduling information (e.g., scheduling information for scheduling downlink/uplink TBs via PDSCH/PUSCH) for the primary cell.

In an example, starting the timer may be in a first timing. In an example, the first timing may be based on a reference timing. In an example, the reference timing may be based on a system frame number (e.g., SFN=0). In an example, the first timing may be based on an offset parameter. In an example, the wireless device may receive an offset configuration parameter indicating the offset.

In an example embodiment, a wireless device may receive a radio resource control (RRC) message comprising first configuration parameters associated with scheduling of a primary cell via a first secondary cell. The wireless device may activate the first secondary cell in response to receiving the RRC message.

In an example, the first configuration may be for the first secondary cell.

In an example, the first configuration parameters may be for the primary cell. In an example, the first configuration parameters may comprise a first parameter indicating an identifier of the first secondary cell that is the scheduling cell for the primary cell.

In an example, the RRC message may be an RRC reconfiguration message. In an example, the RRC message may indicate changing a scheduling secondary cell (e.g., secondary cell associated with scheduling of the primary cell) from a second secondary cell to the first secondary cell. In an example, the RRC message may indicate that: one or more second search spaces of the second secondary cell are not used for reception of scheduling information (e.g., scheduling information for scheduling downlink/uplink TBs via PDSCH/PUSCH) for the primary cell; and one or more first search spaces of the first secondary cell are used for reception of scheduling information (e.g., scheduling information for scheduling downlink/uplink TBs via PDSCH/PUSCH) for the primary cell. In an example, the RRC message may indicate changing one or more search spaces, of the first secondary cell, that are associated with reception of scheduling information for scheduling downlink/uplink TBs via PDSCH/PUSCH on the primary cell, from one or more second search spaces to one or more first search spaces.

In an example, activating the first secondary cell may be in a first timing. In an example, activating the first secondary cell comprises at least one of: sounding reference signal (SRS) transmission on the first secondary cell, channel state information (CSI) reporting for the first secondary cell, physical downlink control channel (PDCCH) monitoring on the first secondary cell, PDCCH monitoring for the first secondary cell, and physical uplink control channel (PUCCH) transmission on the first secondary cell. In an example, the first timing may be based on a reference timing. In an example, the reference timing may be based on a system frame number (e.g., SFN=0). In an example, the first timing may be based on an offset parameter. In an example, the wireless device may receive an offset configuration parameter indicating the offset.

In an example embodiment, a wireless device may receive a radio resource control (RRC) message comprising first configuration parameters associated with scheduling of a primary cell via a first secondary cell. The wireless device may stop monitoring (e.g., may not monitor) one or more search spaces of the first secondary cell, associated with scheduling of the primary cell, in response to receiving the RRC message.

In an example, the first configuration may be for the first secondary cell.

In an example, the first configuration parameters may be for the primary cell. In an example, the first configuration parameters may comprise a first parameter indicating an identifier of the first secondary cell that is the scheduling cell for the primary cell.

In an example, the RRC message may be an RRC reconfiguration message.

In an example, the stopping monitoring (e.g., not monitoring) the one or more search spaces of the first secondary cell may be in a time window after receiving the one or more messages. In an example, the time window (e.g., a duration of the time window) may be based a processing time of the RRC message. In an example, the starting time of the time window may be based on a reference timing. In an example, the reference timing may be based on a system frame number (e.g., SFN=0). In an example, the starting time may be based on an offset parameter. In an example, the wireless device may receive an offset configuration parameter indicating the offset. In an example, the wireless device may monitor, during the time window, one or more second search spaces of the primary cell for receiving scheduling information of the primary cell. In an example, the wireless device may only monitor, during the time window, the one or more second search spaces of the primary cell for receiving scheduling information of the primary cell.

In an example, the wireless device may not receive a downlink control channel, associated with scheduling of the primary cell, on the first secondary cell. In an example, not receiving the downlink control channel may be in a time window after receiving the first secondary cell. In an example, the starting time of the time window may be based on a reference timing. In an example, the reference timing may be based on a system frame number (e.g., SFN=0). In an example, the starting time may be based on an offset parameter. In an example, the wireless device may receive an offset configuration parameter indicating the offset.

In an example embodiment, a wireless device may receive a radio resource control (RRC) message comprising at least one of a first configuration parameter indicating a bandwidth part (BWP) identifier of a first active downlink BWP of a first secondary cell, associated with scheduling of a primary cell, and a second configuration parameter indicating a BWP identifier of a first active uplink BWP of the first secondary cell. The wireless device may activate the first downlink BWP and/or the first uplink BWP in response to receiving the RRC message.

In an example, the activating the first downlink BWP and/or the first uplink BWP may be without receiving a downlink assignment for the first downlink BWP and/or an uplink grant for the first uplink grant.

In an example, the wireless device may switch from a second downlink BWP to the first downlink BWP or may switch from a second uplink BWP to the first uplink BWP in response to receiving the RRC message.

In an example embodiment, a wireless device may receive: first configuration parameters of a primary cell; second configuration parameters of a first secondary cell; and third configuration parameters of a second secondary cell that is a scheduling cell for the primary cell. The wireless device may deactivate the first secondary cell based on an expiry of a deactivation timer, associated with the first secondary cell, or based on receiving a command indicating deactivation of the first secondary cell. The wireless device may deactivate the second secondary cell based on receiving a command indicating deactivation of the second secondary cell. The second configuration parameters may indicate a value of the deactivation timer. The third configuration parameters may not indicate a deactivation timer value based on the secondary cell being the scheduling cell for the primary cell.

In an example embodiment, a wireless device may receive configuration parameters of one or more first search spaces of a primary cell and one or more second search spaces of a secondary cell, wherein the one or more first search spaces of the primary cell and the one or more second search spaces of the secondary cell are associated with receiving scheduling information for transmitting and/or receiving on the primary cell. Based on the configuration parameters, the wireless device may determine: a first plurality of monitoring occasions for monitoring the one or more first search spaces and a second plurality of monitoring occasions for monitoring the one or more search spaces. A first monitoring occasion of the first plurality of monitoring occasions and a second monitoring occasion of the second plurality of monitoring occasions may overlap in one or more symbols. In response to the first monitoring occasion and the second monitoring occasion overlapping, the wireless device may monitor the one or more first search spaces and may not monitoring the one or more second search spaces.

In an example embodiment, a wireless device may receive configuration parameters of one or more first search spaces of a primary cell and one or more second search spaces of a secondary cell, wherein the one or more first search spaces of the primary cell and the one or more second search spaces of the secondary cell are associated with receiving scheduling information for transmitting and/or receiving on the primary cell. Based on the configuration parameters, the wireless device may determine: a first plurality of monitoring occasions for monitoring the one or more first search spaces and a second plurality of monitoring occasions for monitoring the one or more search spaces. A first monitoring occasion of the first plurality of monitoring occasions and a second monitoring occasion of the second plurality of monitoring occasions may overlap in one or more symbols. In response to the first monitoring occasion and the second monitoring occasion overlapping, the wireless device may monitor the one or more second search spaces and may not monitoring the one or more first search spaces.

In an example embodiment, a wireless device may receive configuration parameters of a plurality of cells comprising a first secondary cell and a primary cell. The first secondary cell may be a scheduling cell of a primary cell. The first secondary cell and the primary cell may be in the same physical uplink control channel group (e.g., may be in a primary physical uplink control channel group). The wireless device may receive a first transport block via the primary cell based on a first DCI received via the primary cell. The wireless device may receive a second transport block via the primary cell based on a second DCI received via the first secondary cell. The wireless device may transmit a first HARQ feedback, associated with the first transport block, and a second HARQ feedback, associated with the second transport block, via an uplink control channel of a cell in the physical uplink control channel group (e.g., via an uplink control channel of the primary cell).

In an example, the secondary cell and the primary cell may be in the same physical uplink control channel group (e.g., in the primary physical uplink control channel group) based on the secondary cell being the scheduling cell for the primary cell.

In an example embodiment, a wireless device may receive configuration parameters indicating that a first secondary cell is a scheduling cell of a primary cell. The wireless device may receive, at a first timing via the first secondary cell, first scheduling information for transmission or reception of a first transport block via the primary cell. The wireless device may receive, at a second timing that overlaps with the first timing and via the primary cell, second scheduling information for transmission or reception of a second transport block via the primary cell. A third timing of the first transport block may be earlier than a fourth timing of the second transport block.

In an example embodiment, a wireless device may receive configuration parameters indicating that a first secondary cell is a scheduling cell of a primary cell. The wireless device may receive, at a first timing via the first secondary cell, first scheduling information for transmission or reception of a first transport block via the primary cell. The wireless device may receive, at a second timing that overlaps with the first timing and via the primary cell, second scheduling information for transmission or reception of a second transport block via the primary cell. A third timing of the second transport block may be earlier than a fourth timing of the first transport block.

In an example embodiment, a wireless device may receive configuration parameters of one or more first search spaces of a primary cell and one or more second search spaces of a secondary cell, wherein the one or more first search spaces and the one or more second search spaces may be associated with scheduling (PUSCH/PDSCH) on the primary cell. The wireless device may monitor the one or more first search spaces and one or more second search spaces for receiving control information associated with scheduling (PUSCH/PDSCH) on the primary cell. The wireless device may perform a process (e.g., a random access process, bandwidth part switching, etc.) on the primary cell. Based on the performing the process (e.g., the random access process, the bandwidth part switching, etc.) on the primary cell and during a time window (e.g., a time window associated with the process), the wireless device may monitor the one or more second search spaces and may not monitor the one or more first search spaces. The wireless device may only monitor one or more second search spaces during the time window. The wireless device may receive a DCI comprising scheduling information for transmission/reception of PUSCH/PDSCH on the primary cell. The wireless device may transmit/receive the PUSCH/PDSCH based on the scheduling information.

In an example embodiment, a wireless device may receive configuration parameters of one or more first search spaces of a primary cell and one or more second search spaces of a secondary cell, wherein the one or more first search spaces and the one or more second search spaces may be associated with scheduling (PUSCH/PDSCH) on the primary cell. The wireless device may monitor the one or more first search spaces and one or more second search spaces for receiving control information associated with scheduling (PUSCH/PDSCH) on the primary cell. The wireless device may perform a process (e.g., a random access process, bandwidth part switching, etc.) on the secondary cell. Based on the performing the process (e.g., the random access process, the bandwidth part switching, etc.) on the secondary cell and during a time window (e.g., a time window associated with the process), the wireless device may monitor the one or more first search spaces and may not monitor the one or more second search spaces. The wireless device may only monitor one or more first search spaces during the time window. The wireless device may receive a DCI comprising scheduling information for transmission/reception of PUSCH/PDSCH on the primary cell. The wireless device may transmit/receive the PUSCH/PDSCH based on the scheduling information.

In an example embodiment, a wireless device may transmit, to a base station, in a capability message, one or more information elements, indicating that the wireless device is capable of monitoring PDCCH scheduling (PDSCH/PUSCH) for a primary cell on both a primary cell and a scheduling secondary cell during a process (e.g., a random access process, a time window associated with BWP switching, etc.) on the primary cell or the scheduling secondary cell. The wireless device may receive configuration parameters of one or more first search spaces of a primary cell and one or more second search spaces of a secondary cell, wherein the one or more first search spaces and the one or more second search spaces may be associated with scheduling (PUSCH/PDSCH) on the primary cell. The wireless device may perform a process (e.g., a random access process, bandwidth part switching, etc.) on the secondary cell or the primary cell. The wireless device may monitor PDCCH scheduling (PDSCH/PUSCH) for the primary cell on both a primary cell and the scheduling secondary cell during the process (e.g., while the random access process is ongoing or during a time window associated with the BWP switching. The wireless device may receive a DCI comprising scheduling information for transmission/reception of PUSCH/PDSCH on the primary cell. The wireless device may transmit/receive the PUSCH/PDSCH based on the scheduling information.

In an example embodiment, a wireless device may transmit to a base station, in a capability message, one or more information elements indicating that the wireless device is capable of supporting activation of semi-persistent scheduling (SPS)/Configured grant (CG) configurations and deactivation of SPS/CG configurations from different cells of a scheduling secondary cell and a primary cell. The wireless device may receive, via a first cell of the scheduling secondary cell and primary cell, a first DCI indicating activation of a SPS/CG configuration. The wireless device may receive, via a second cell of the scheduling secondary cell and the primary cell, a second DCI indicating deactivation/release of the SPS/CG configuration.

Figure 32:
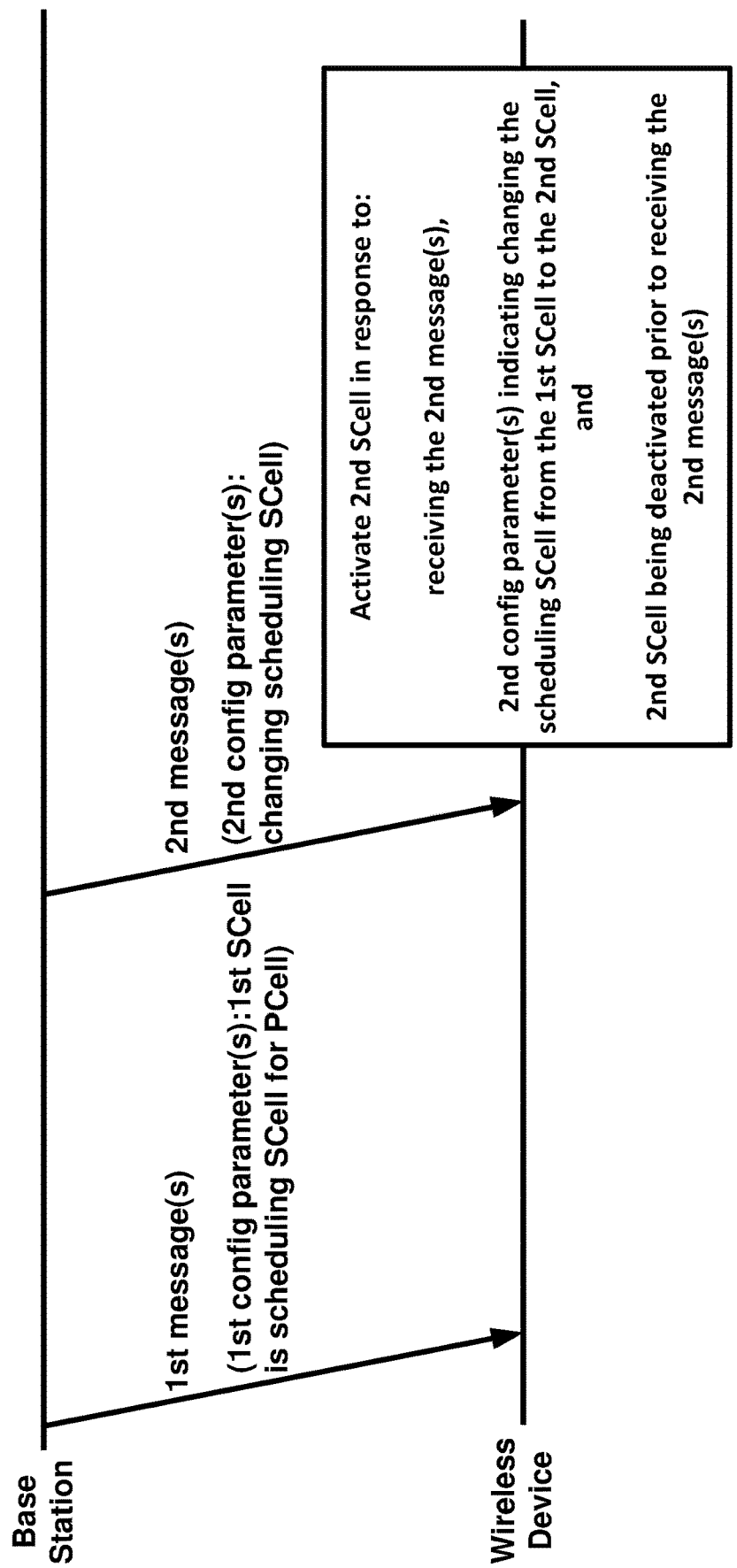
FIG. 32 shows an example process in accordance with several of various embodiments of the present disclosure.

In an example embodiment as shown in FIG. 32, a wireless device may receive one or more first messages. The one or more first messages may comprise one or more RRC messages. The one or more first messages may comprise configuration parameters of a plurality of cells comprising a primary cell and a first secondary cell. The one or more first messages may comprise one or more first configuration parameters that indicate that the first secondary cell is a scheduling cell for the primary cell. For example, the one or more first configuration parameters may comprise a parameter indicating an identifier of the first secondary cell as the scheduling secondary cell for the primary cell.

A scheduling secondary cell may be configured for receiving scheduling information associated with a downlink transmission (e.g., for a downlink transmission of a downlink transport block via PDSCH) via the primary cell or for receiving scheduling information associated with an uplink transmission (e.g., for an uplink transmission of an uplink transport block via PUSCH) via the primary cell. The one or more first messages may comprise configuration parameters of one or more search spaces (e.g., wireless device specific search spaces) of the first secondary cell and the wireless device may monitor the one or more search spaces. The wireless device may receive the scheduling information associated with the uplink transmission or the downlink transmission via the primary cell based on monitoring the one or more search spaces of the first secondary cell that is the scheduling cell for the primary cell.

The wireless device may receive one or more second messages. In an example, the one or more second messages may comprise one or more second RRC messages comprising an RRC reconfiguration message. The one or more second messages may comprise one or more second configuration parameters. The one or more second configuration parameters may indicate changing the scheduling secondary cell, e.g., changing the scheduling the scheduling secondary cell from the first secondary cell to a second secondary cell. For example, the one or more second configuration parameters may comprise a parameter indicating an identifier of the second secondary cell as the scheduling secondary cell for the primary cell. For example, the one or more second configuration parameters may comprise parameters associated with one or more search spaces (e.g., wireless device specific search spaces) of the second secondary cell for the wireless device to monitor and to receive, based on the monitoring, scheduling information associated with an uplink transmission or a downlink transmission via the primary cell.

The second secondary cell may be deactivated prior to receiving the one or more second messages. In response to receiving the one or more second messages and based on/in response to the one or more second messages indicating changing the scheduling secondary cell from the first secondary cell to the second secondary cell and based on/in response to the second secondary cell being deactivated prior to receiving the one or more second messages, the wireless device may activate the second secondary cell. The wireless device may activate the second secondary cell in a first timing after a timing of receiving the one or more second messages. The first timing may be based on a reference timing, e.g., based on an offset (e.g., an offset configurable based on a configuration parameter) to a reference timing. The reference timing may be based on a system frame number (SFN, e.g., SFN=0). The wireless device may perform one or more processes associated with an activated secondary cell after the first timing. The one or more processes associated with an activated secondary cell may comprise one or more of: SRS transmission via the secondary cell, CSI reporting via the secondary cell, PDSCH monitoring on the secondary cell or for the secondary cell, PUCCH transmission via the secondary cell. For example, the wireless device may start a deactivation timer associated with the second secondary cell in response to receiving the one or more second messages and/or in response to activating the second secondary cell.

Figure 33:
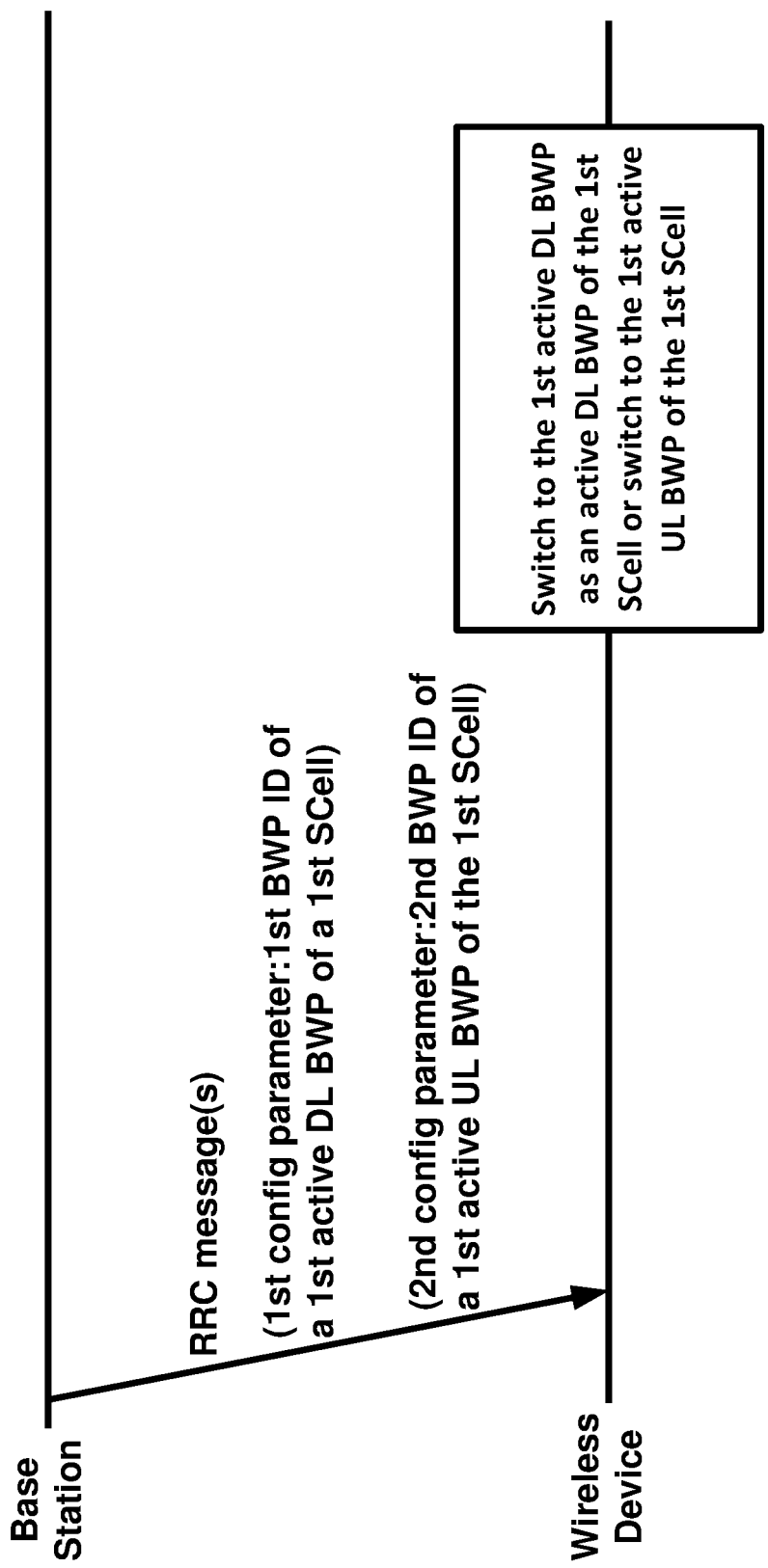
FIG. 33 shows an example process in accordance with several of various embodiments of the present disclosure.

In an example embodiment as shown in FIG. 33, a wireless device may one or more messages, e.g., one or more RRC messages. For example, the one or more messages may comprise an RRC reconfiguration message indicating reconfiguration of one or more parameters associated with scheduling the primary cell via a scheduling secondary cell. The one or more messages may comprise configuration parameters comprising a first configuration parameter, indicating a first BWP identifier, and a second configuration parameter indicating a second BWP identifier. The first BWP identifier may indicate an identifier of a first active downlink BWP of a first secondary cell. The second BWP identifier may indicate an identifier of a first active uplink BWP of the first secondary cell.

The first secondary cell may be a scheduling secondary cell for the primary cell. The wireless device may monitor one or more search spaces (e.g., wireless device specific search spaces) of an active downlink BWP of the scheduling secondary cell and, in response to the monitoring, may receive scheduling information for an uplink transmission (e.g., an uplink transmission of an uplink transport block via PUSCH) via the primary cell or a downlink transmission (e.g., downlink transmission of a downlink transport block via PDSCH) via the primary cell. The one or more messages may comprise search space configuration parameters of the one or more search spaces for the active downlink BWP of the scheduling secondary cell.

The wireless device may switch to the first active downlink BWP (e.g., may switch from a second downlink BWP/current active downlink BWP to the first active downlink BWP) as the active downlink BWP or may switch to the first active uplink BWP (e.g., may switch from a second uplink BWP/current active downlink BWP to the first active uplink BWP) as the active uplink BWP. The switching may be in response to receiving the one or more messages (e.g., the one or more RRC messages) and in response to/based on the first secondary cell being a scheduling cell for the primary cell. For example, the wireless device may switch to the first active downlink BWP without receiving a PDCCH comprising a downlink assignment. For example, the wireless device may switch to the first active uplink BWP without receiving a PDCCH comprising an uplink grant.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

FIG. 34 shows an example flow diagram in accordance with several of various embodiments of the present disclosure. At 3410, a wireless device may receive one or more first messages comprising one or more first configuration parameters indicating that a first secondary cell is a scheduling secondary cell for a primary cell. Receiving scheduling information for an uplink transmission or a downlink transmission via the primary cell may be based on monitoring one or more search spaces of a scheduling secondary cell. At 3420, the wireless device may receive one or more second messages comprising one or more second configuration parameters indicating changing the scheduling secondary cell. At 3430, the wireless device may activate a second secondary cell in response to: receiving the one or more second messages; the one or more second configuration parameters indicating changing the scheduling secondary cell from the first secondary cell to the second secondary cell; and the second secondary cell being deactivated prior to receiving the one or more second messages.

In an example embodiment, the one or more second messages, received at 3410, may comprise a radio resource control (RRC) reconfiguration message.

In an example embodiment, the wireless device may start a deactivation timer, associated with the second secondary cell, in response to receiving the one or more second messages at 3420.

In an example embodiment, the one or more second messages, received at 3420, may indicate changing the one or more search spaces from one or more first search spaces of the first secondary cell to one or more second search spaces of the second secondary cell.

In an example embodiment, the activating the second secondary cell, at 3430, may be in a first timing after receiving the one or more second messages. In an example embodiment, the first timing may be based on a reference timing.

In an example embodiment, the activating the second secondary cell, at 3430, may comprise at least one of: sounding reference signal (SRS) transmission via the second secondary cell; channel state information (CSI) reporting via the second secondary cell; physical downlink control channel (PDCCH) monitoring on the second secondary cell; PDCCH monitoring for the second secondary cell; and physical uplink control channel (PUCCH) transmission via the first secondary cell.

In an example embodiment, the one or more second configuration parameters, included in the one or more second messages received at 3420, may indicate an identifier of the second secondary cell as the scheduling secondary cell for the primary cell.

In an example embodiment, the one or more search spaces may be wireless device specific search spaces.

In an example embodiment, the wireless device may receive, before a timing of the one or more second messages received at 3420, first scheduling information for an uplink transmission or a downlink transmission of a first transport block via the primary cell based on monitoring one or more first search spaces of the first secondary cell. The wireless device may receive, after the timing of the one or more second messages received at 3420, second scheduling information for an uplink transmission or a downlink transmission of a second transport block via the primary cell based on monitoring one or more second search spaces of the second secondary cell.

FIG. 35 shows an example flow diagram in accordance with several of various embodiments of the present disclosure. At 3510, a wireless device may receive one or more messages comprising one or more configuration parameters indicating changing a scheduling secondary cell from a first secondary cell to a second secondary cell. Receiving scheduling information for an uplink transmission or a downlink transmission via a primary cell may be based on monitoring one or more search spaces of a scheduling secondary cell. At 3520, the wireless device may activate the secondary cell in response to: receiving the one or more messages; and the second secondary cell being deactivated prior to receiving the one or more second messages.

FIG. 36 shows an example flow diagram in accordance with several of various embodiments of the present disclosure. At 3610, a wireless device may receive one or more configuration parameters indicating changing a scheduling secondary cell from a first secondary cell to a second secondary cell. A scheduling secondary cell may be for receiving scheduling information for a primary cell. At 3620, the wireless device may activate the second secondary cell in response to: receiving the one or more configuration parameters; and the second secondary cell being deactivated prior to receiving the one or more configuration parameters.

Figure 37:
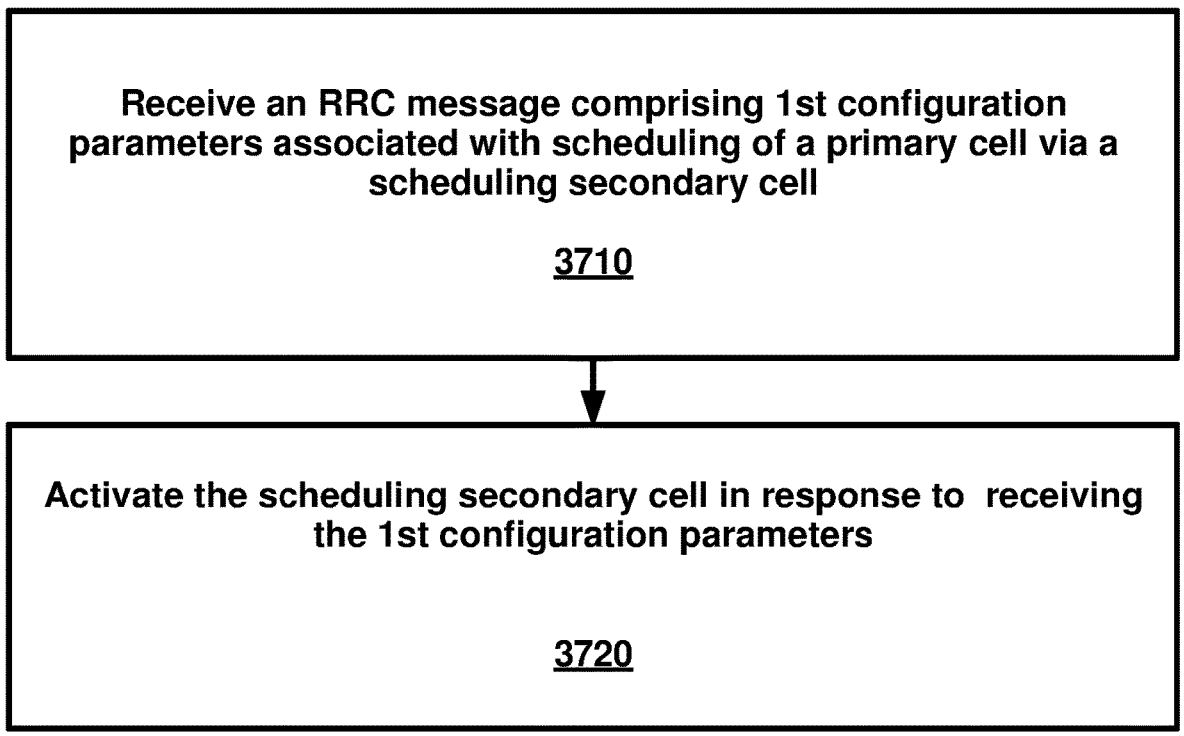
FIG. 37 shows an example flow diagram in accordance with several of various embodiments of the present disclosure.

FIG. 37 shows an example flow diagram in accordance with several of various embodiments of the present disclosure. At 3710, a wireless device may receive a radio resource control (RRC) message comprising first configuration parameters associated with scheduling of a primary cell via a scheduling secondary cell. At 3720, the wireless device may activate the scheduling secondary cell in response to receiving the first configuration parameters.

In an example embodiment, the RRC message, received at 3710, may be an RRC reconfiguration message.

In an example embodiment, the first configuration parameters, included in the RRC message received at 3710, may indicate changing the scheduling secondary cell from a first secondary cell to a second secondary cell. The activating, at 3720, may be for the second secondary cell and may be based on the second secondary cell being deactivated prior to receiving the RRC message.

Figure 38:
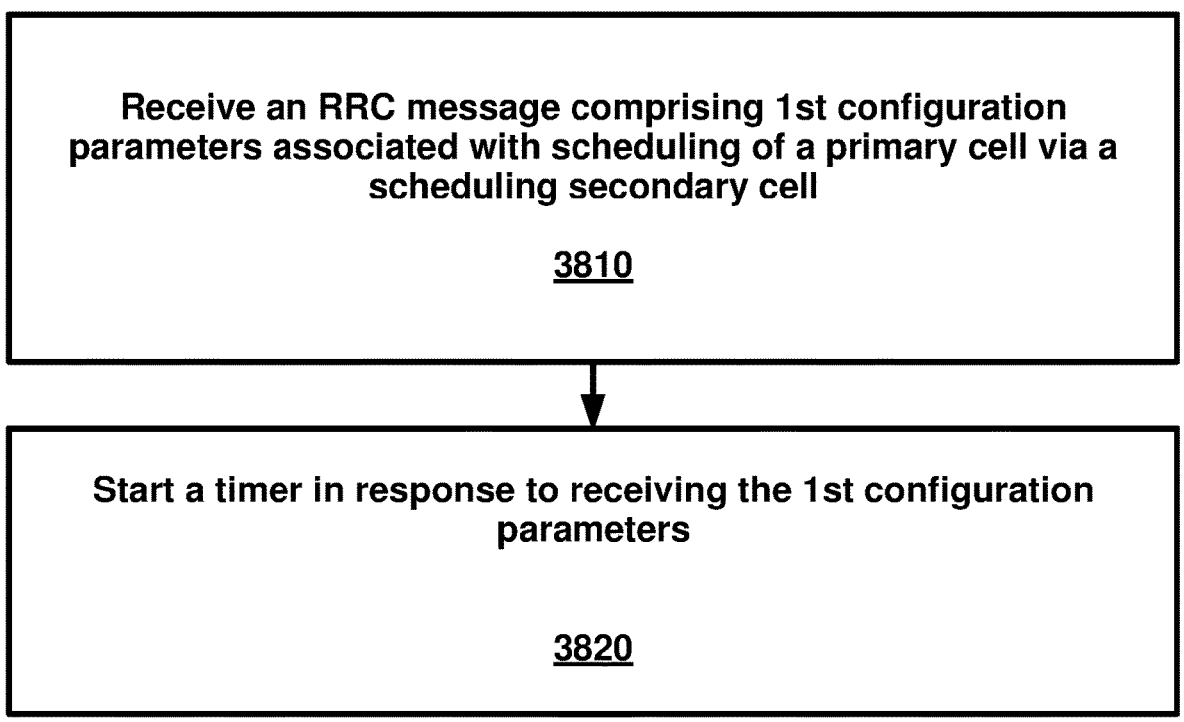
FIG. 38 shows an example flow diagram in accordance with several of various embodiments of the present disclosure.

FIG. 38 shows an example flow diagram in accordance with several of various embodiments of the present disclosure. At 3810, a wireless device may receive a radio resource control (RRC) message comprising first configuration parameters associated with scheduling of a primary cell via a scheduling secondary cell. At 3820, the wireless device may start a timer in response to receiving the first configuration parameters.

In an example embodiment, the wireless device may receive, based on monitoring one or more search spaces of the scheduling secondary cell, scheduling information associated with scheduling of an uplink transmission or a downlink transmission via the primary cell.

In an example embodiment, the RRC message, received at 3810, may be an RRC reconfiguration message. In an example embodiment, the RRC message, received at 3810, may indicate changing the scheduling secondary cell from a first cell to a second cell. In an example embodiment, the RRC message, received at 3810, may indicate reconfiguration of one or more parameters associated with scheduling of the primary cell via the scheduling secondary cell.

In an example embodiment, the first configuration parameters, included in the RRC message received at 3810, may comprise a first parameter indicating an identifier of the scheduling secondary cell.

In an example embodiment, the first configuration parameters, included in the RRC message received to 3810, may comprise search space configuration parameters of one or more search spaces of the scheduling secondary cell for receiving scheduling information associated with an uplink transmission or a downlink transmission via the primary cell. In an example, the one or more search spaces may comprise wireless device specific search spaces.

In an example embodiment, the timer, that is started at 3820, may be a deactivation timer of the scheduling secondary cell.

In an example embodiment, the timer, that is started at 3820, may be an inactivity timer of a bandwidth part of the scheduling secondary cell.

In an example embodiment, the timer, that is started at 3820, may be associated with search space monitoring for receiving scheduling information associated with scheduling of the primary cell.

In an example embodiment, the timer, that is started at 3820, may be associated with one or more first search spaces, of the scheduling secondary cell, that are configured for receiving scheduling information for an uplink transmission or a downlink transmission via the primary cell. In an example embodiment, monitoring the one or more first search spaces may be based on the timer running.

In an example embodiment, the starting the timer, at 3820, may be in a first timing. In an example embodiment, the first timing may be based on a reference timing.

Figure 39:
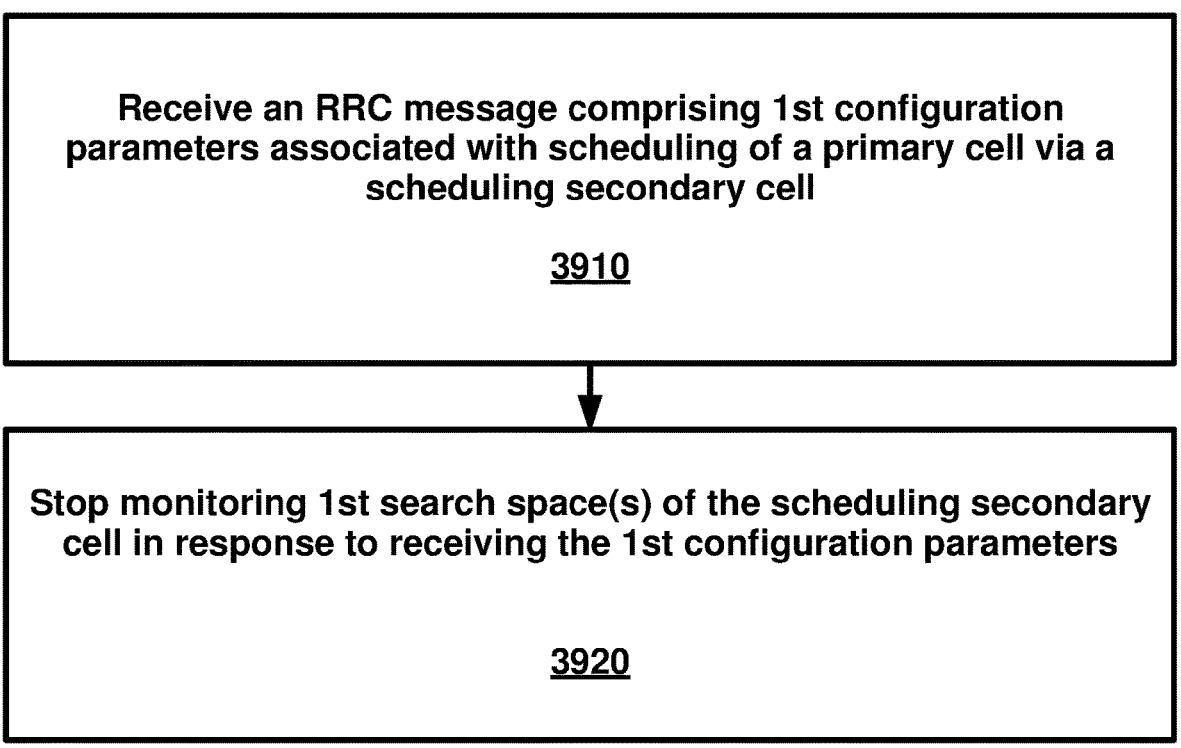
FIG. 39 shows an example flow diagram in accordance with several of various embodiments of the present disclosure.

FIG. 39 shows an example flow diagram in accordance with several of various embodiments of the present disclosure. At 3910, a wireless device may receive a radio resource control (RRC) message comprising first configuration parameters associated with scheduling of a primary cell via a scheduling secondary cell. At 3920, the wireless device may stop monitoring one or more first search spaces of the scheduling secondary cell in response to receiving the first configuration parameters.

In an example embodiment, the first configuration parameters, included in the RRC message received at 3910, may comprise a first parameter indicating an identifier of the scheduling secondary cell.

In an example embodiment, the RRC message, received at 3910, may be an RRC reconfiguration message. In an example embodiment, the RRC message may indicate reconfiguration of one or more parameters associated with scheduling of the primary cell via the scheduling secondary cell. In an example embodiment, the RRC message may indicate changing the scheduling secondary cell from a first cell to a second cell.

In an example embodiment, the stopping monitoring the one or more first search spaces of the scheduling secondary cell, at 3920, may be in a time window after receiving the RRC message. In an example embodiment, a duration of the time window may be based on a processing time of the RRC message. In an example embodiment, a starting time of the time window may be based on a reference timing. In an example embodiment, the wireless device may monitor, during the time window, one or more second search spaces of the primary cell for receiving scheduling information associated with scheduling an uplink transmission or a downlink transmission via the primary cell. In an example embodiment, the monitoring, during the time window for receiving scheduling information associated with scheduling the uplink transmission or the downlink transmission via the primary cell, may only be for the one or more second search spaces of the primary cell.

Figure 40:
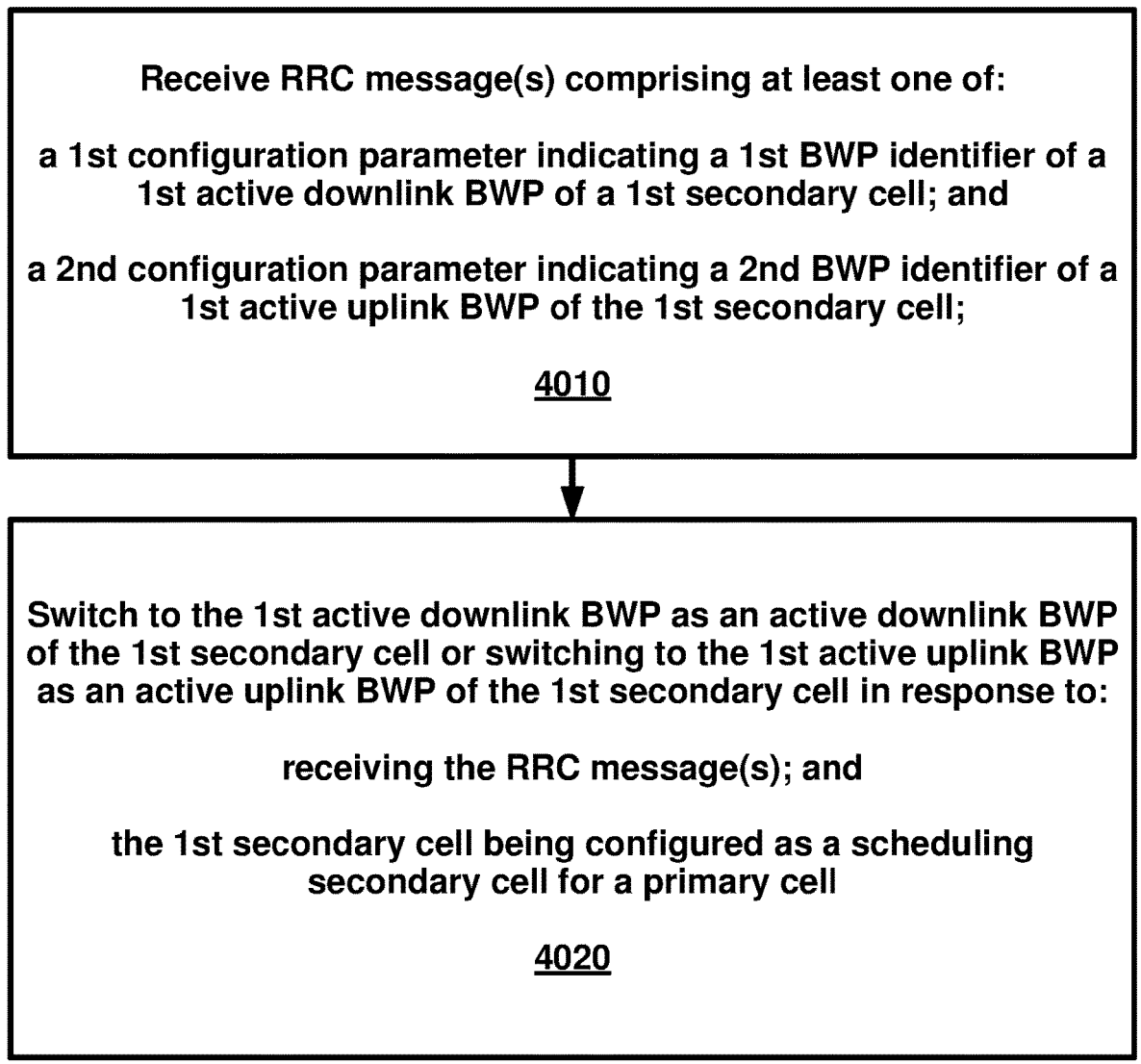
FIG. 40 shows an example flow diagram in accordance with several of various embodiments of the present disclosure.

FIG. 40 shows an example flow diagram in accordance with several of various embodiments of the present disclosure. At 4010, a wireless device may receive one or more radio resource control (RRC) messages comprising at least one of: a first configuration parameter indicating a first bandwidth part (BWP) identifier of a first active downlink BWP of a first secondary cell; and a second configuration parameter indicating a second BWP identifier of a first active uplink BWP of the first secondary cell. At 4020, the wireless device may switch to the first active downlink BWP as an active downlink BWP of the first secondary cell or may switch to the first active uplink BWP as an active uplink BWP of the first secondary cell in response to: receiving the one or more RRC messages; and the first secondary cell being configured as a scheduling secondary cell for a primary cell.

In an example embodiment, the switching, at 4020, to the first active downlink BWP as the active downlink BWP may be without receiving a downlink assignment for the first active downlink BWP.

In an example embodiment, the switching, at 4020, to the first active uplink BWP as the active uplink BWP may be without receiving an uplink grant for the first active uplink BWP.

In an example embodiment, the one or more RRC messages, received at 4010, may comprise an RRC reconfiguration message. In an example embodiment, the RRC reconfiguration message may indicate reconfiguration of one or more parameters associated with scheduling the primary cell via the scheduling secondary cell.

In an example embodiment, the wireless device may receive scheduling information for an uplink transmission or a downlink transmission via the primary cell based on monitoring one or more search spaces of the active downlink BWP of the scheduling secondary cell. In an example embodiment, the one or more messages, received at 4010, may comprise configuration parameters of the one or more search spaces of the active downlink BWP of the scheduling secondary cell.

In an example embodiment, the one or more messages, received at 4010, may comprise one or more third configuration parameters indicating an identifier of the scheduling secondary cell.

In an example embodiment, the switching to the first active downlink BWP, at 4020, may be from a second downlink BWP.

In an example embodiment, the switching to the first active uplink BWP, at 4020, may be from a second uplink BWP.

Figure 41:
FIG. 41 shows an example flow diagram in accordance with several of various embodiments of the present disclosure.

FIG. 41 shows an example flow diagram in accordance with several of various embodiments of the present disclosure. At 4110, a wireless device may receive one or more radio resource control (RRC) messages comprising a configuration parameter indicating a bandwidth part (BWP) identifier of a first active BWP of a secondary cell. At 4120, the wireless device may switch to the first active BWP as an active BWP of the secondary cell in response to: receiving the one or more RRC messages; and the first secondary cell being configured as a scheduling secondary cell for a primary cell.

Figure 42:
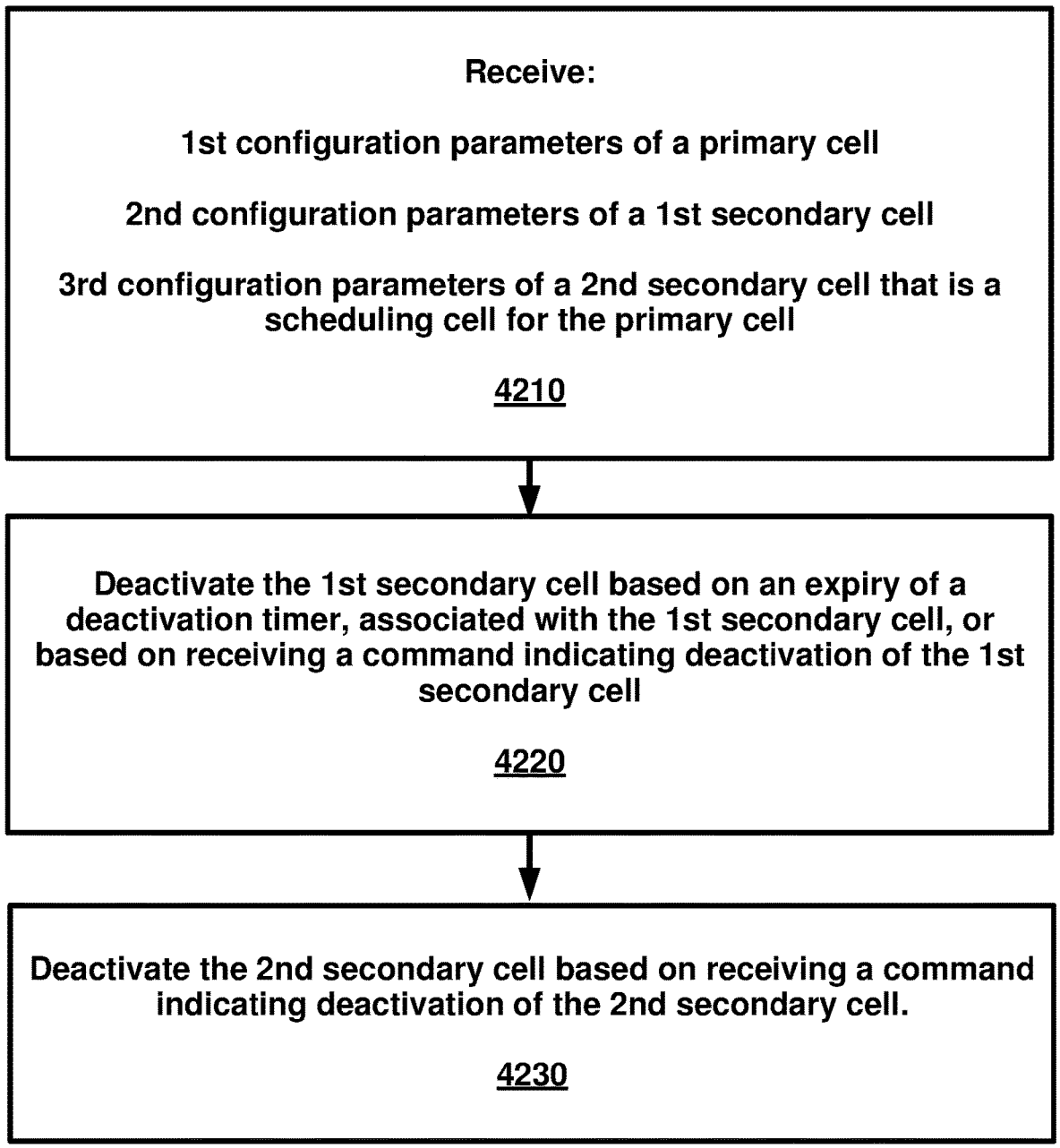
FIG. 42 shows an example flow diagram in accordance with several of various embodiments of the present disclosure.

FIG. 42 shows an example flow diagram in accordance with several of various embodiments of the present disclosure. At 4210, a wireless device may receive first configuration parameters of a primary cell; second configuration parameters of a first secondary cell; and third configuration parameters of a second secondary cell that is a scheduling cell for the primary cell. At 4220, the wireless device may deactivate the first secondary cell based on an expiry of a deactivation timer, associated with the first secondary cell, or based on receiving a command indicating deactivation of the first secondary cell. At 4230, the wireless device may deactivate the second secondary cell based on receiving a command indicating deactivation of the second secondary cell.

In an example embodiment, the second configuration parameters, received at 4210, may indicate a value of the deactivation timer. The third configuration parameters, received at 4210, may not indicate a deactivation timer value based on the secondary cell being the scheduling cell for the primary cell.

In an example embodiment, based on the second secondary cell being a scheduling cell for the primary cell, the deactivating the second secondary cell, at 4230, may not be based on expiry of a deactivation timer. In an example embodiment, based on the second secondary cell being a scheduling cell for the primary cell, the deactivating the second secondary cell, at 4230, may only be based on receiving a command indicating deactivation of the second secondary cell.

In an example embodiment, the command, at 4220 and 4230, may be a secondary cell activation deactivation medium access control (MAC) control element (CE).

In an example embodiment, the first configuration parameters, received at 4210, may comprise a parameter indicating an identifier of the second secondary cell as the scheduling secondary cell for the primary cell.

In an example embodiment, the third configuration parameters, received at 4210, may comprise a parameter indicating an identifier of the second secondary cell as the scheduling secondary cell for the primary cell.

In an example embodiment, the wireless device may receive scheduling information for an uplink transmission or a downlink transmission via the primary cell based on monitoring one or more search spaces of the scheduling secondary cell. In an example embodiment, the uplink transmission may be for an uplink transport block and the downlink transmission may be for a downlink transport block.

In an example embodiment, the deactivating the first secondary cell, at 4220, or the deactivating the second secondary cell, at 4230, may comprise one or more of: stopping a deactivation timer associated with the scheduling secondary cell; stopping a bandwidth part inactivity timer associated with the scheduling secondary cell; clearing configured downlink assignments or Type 2 configured uplink grants; clearing resources for semi-persistent channel state information (CSI) reporting; suspend Type 1 configured uplink grants; and flushing one or more hybrid automatic repeat request (HARQ) buffers.

In an example embodiment, based on the first secondary cell not being a scheduling cell for the primary cell, the deactivating the first secondary cell, at 4220, may either be based on the expiry of the deactivation timer or based on receiving the command indicating deactivation of the first secondary cell.

Figure 43:
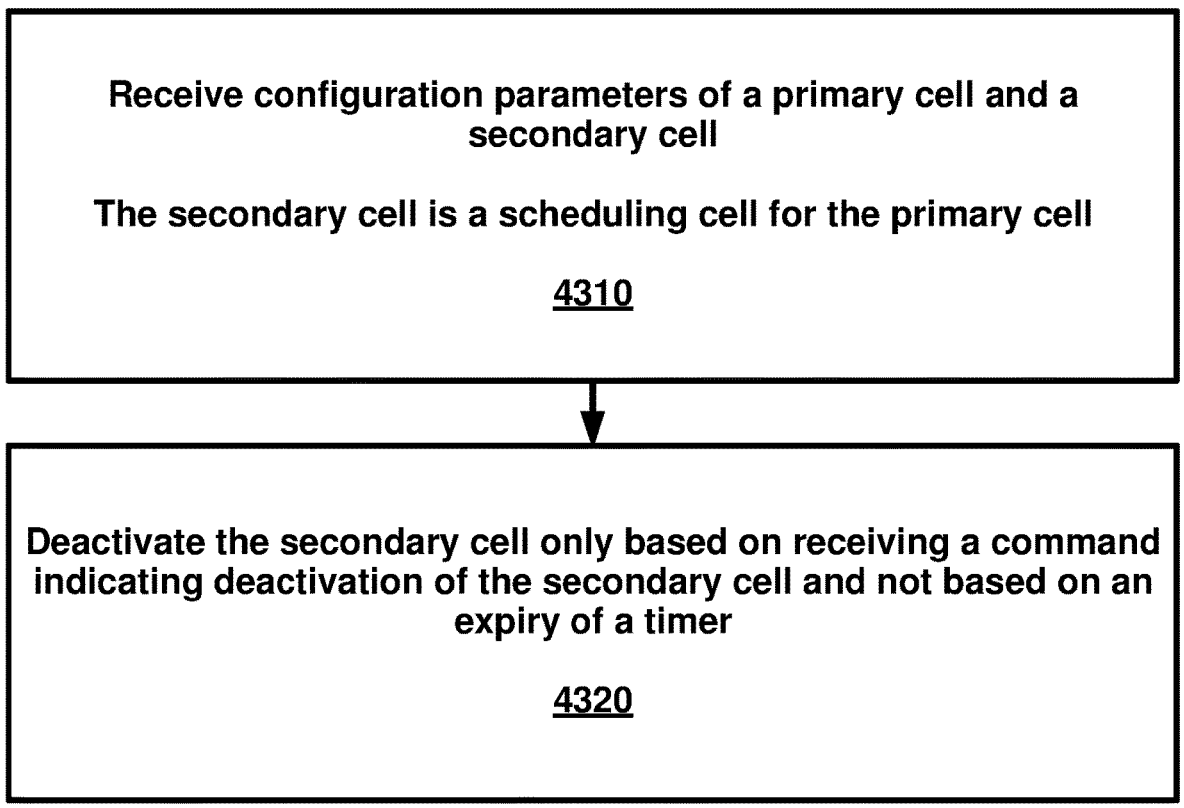
FIG. 43 shows an example flow diagram in accordance with several of various embodiments of the present disclosure.

FIG. 43 shows an example flow diagram in accordance with several of various embodiments of the present disclosure. At 4310, a wireless device may receive configuration parameters of a primary cell and a secondary cell. The secondary cell may be a scheduling cell for the primary cell. At 4320, the wireless device may deactivate the secondary cell only based on receiving a command indicating deactivation of the secondary cell and not based on an expiry of a timer.

In an example embodiment, the deactivating the secondary cell, at 4320, may only be based on the command and not based on the expiry of the timer in response to the secondary cell being the scheduling cell for the primary cell.

FIG. 44 shows an example flow diagram in accordance with several of various embodiments of the present disclosure. At 4410, a wireless device may receive configuration parameters of one or more first search spaces of a primary cell and one or more second search spaces of a secondary cell. The one or more first search spaces and the one or more second search spaces may be associated with receiving scheduling information of an uplink transmission or a downlink transmission via the primary cell. At 4420, the wireless device may determine, based on the configuration parameters: a first plurality of monitoring occasions for monitoring the one or more first search spaces; and a second plurality of monitoring occasions for monitoring the one or more second search spaces. At 4430, based on a first monitoring occasion of the first plurality of monitoring occasions and a second monitoring occasion of the second monitoring occasions overlapping in the one or more symbols: the wireless device may monitor the one or more first search spaces in the first monitoring occasion and may not monitor the one or more second search spaces in the second monitoring occasion; or the wireless device may monitor the one or more second search spaces in the second monitoring and may not monitor the one or more first search spaces in the first monitoring occasion.

FIG. 45 shows an example flow diagram in accordance with several of various embodiments of the present disclosure. At 4510, a wireless device may receive configuration parameters of a plurality of cells comprising a first secondary cell and a primary cell. The first secondary cell may be a scheduling cell of a primary cell. The first secondary cell and the primary cell may be in the same physical uplink control channel group. At 4520, the wireless device may receive a first transport block via the primary cell based on a first downlink control information (DCI) received via the primary cell. At 4530, the wireless device may receive a second transport block via the primary cell based on a second DCI received via the first secondary cell. At 4540, the wireless device may transmit a first HARQ feedback, associated with the first transport block, and a second HARQ feedback, associated with the second transport block, via one or more cells in the physical uplink control channel group.

In an example embodiment, the first secondary cell and the primary cell may be in the same physical uplink control channel group based on the first secondary cell being the scheduling cell for the primary cell.

In an example embodiment, the physical uplink control channel group may be a primary physical uplink control channel group.

FIG. 46 shows an example flow diagram in accordance with several of various embodiments of the present disclosure. At 4610, a wireless device may receive configuration parameters indicating that a first secondary cell is a scheduling cell of a primary cell. At 4620, the wireless device may receive, in a first timing via the first secondary cell, first scheduling information for an uplink or a downlink transmission of a first transport block via the primary cell. At 4630, the wireless deice may receive, in a second timing that overlaps with the first timing and via the primary cell, second scheduling information for an uplink or a downlink transmission of a second transport block via the primary cell. A relative timing of a third timing of the second transport block and a fourth timing of the first transport block may be based on the second timing and the first timing overlapping.

In an example embodiment, the second timing and the first timing may overlap in one or more symbols.

In an example embodiment, the third timing may be earlier than the fourth timing. In an example, the third timing may be earlier than the fourth timing based on the second timing and the first timing overlapping.

In an example embodiment, the third timing may be later than the fourth timing. In an example embodiment, the third timing may be later than the fourth timing based on the second timing and the first timing overlapping.

Figure 47:
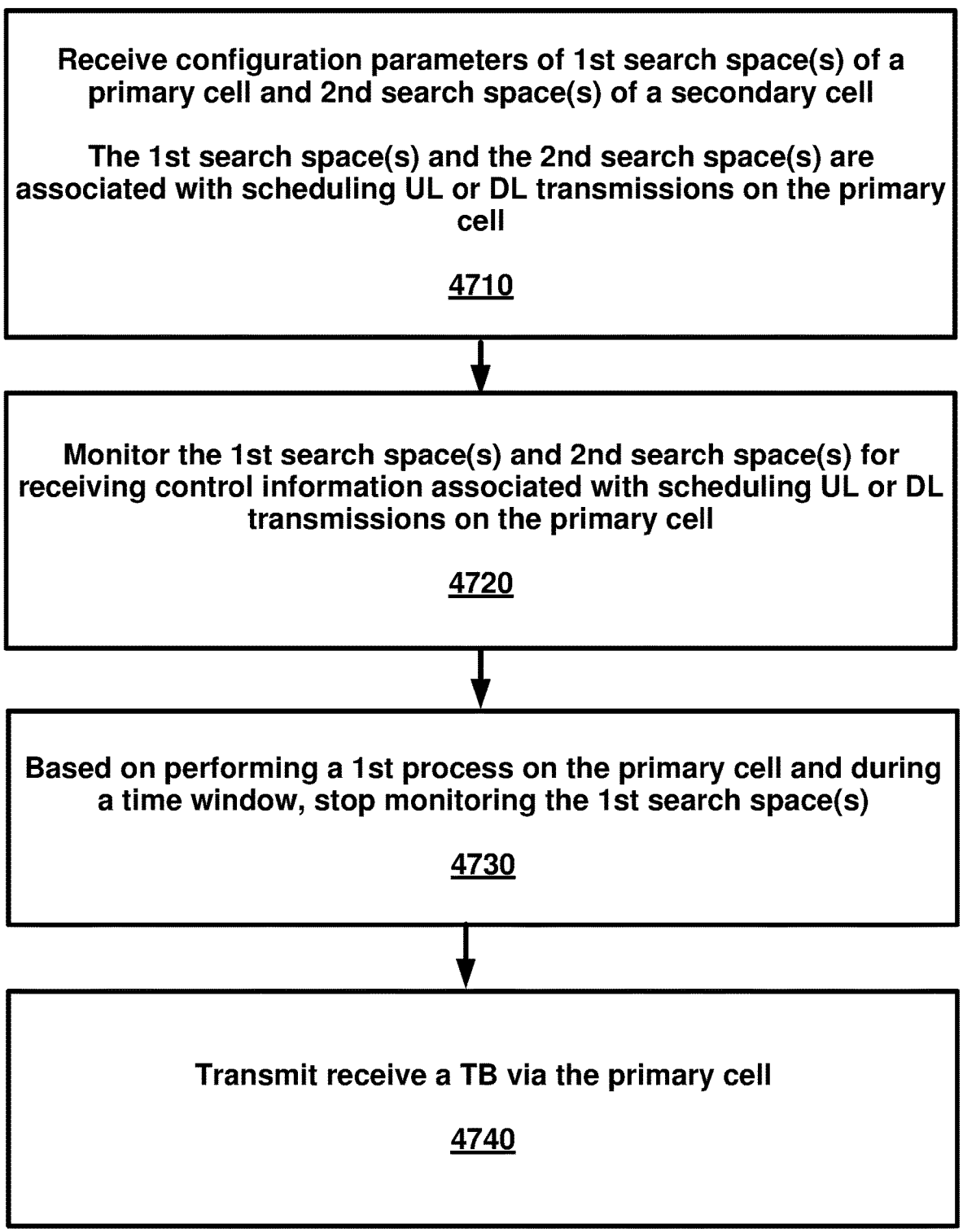
FIG. 47 shows an example flow diagram in accordance with several of various embodiments of the present disclosure.

FIG. 47 shows an example flow diagram in accordance with several of various embodiments of the present disclosure. At 4710, a wireless device may receive configuration parameters of one or more first search spaces of a primary cell and one or more second search spaces of a secondary cell. The one or more first search spaces and the one or more second search spaces may be associated with scheduling uplink transmissions or downlink transmissions on the primary cell. At 4720, the wireless device may monitor the one or more first search spaces and one or more second search spaces for receiving control information associated with scheduling uplink or downlink transmissions on the primary cell. At 4730, based on performing a first process on the primary cell and during a time window associated with the first process, the wireless device may stop monitoring the one or more first search spaces. At 4740, the wireless device may transmit or may receive a transport block via the primary cell.

In an example embodiment, the first process may be a random access process.

In an example embodiment, the first process may be associated with bandwidth part (BWP) switching.

In an example embodiment, the wireless device may monitor the one or more second search spaces during the time window.

FIG. 48 shows an example flow diagram in accordance with several of various embodiments of the present disclosure. At 4810, a wireless device may transmit, to a base station, one or more capability messages comprising one or more information elements indicating that the wireless device is capable of monitoring for scheduling information of downlink or uplink transmissions on a primary cell, on the primary cell and the scheduling secondary cell during a time window associated with a first process on the primary cell. At 4820, the wireless device may receive configuration parameters of one or more first search spaces of a primary cell and one or more second search spaces of a secondary cell. The one or more first search spaces and the one or more second search spaces may be associated with scheduling uplink transmissions or downlink transmissions on the primary cell. The wireless device may monitor the one or more first search spaces and the one or more second search spaces during the time window associated with the first process on the primary cell. The wireless device may transmit or receive a transport block via the primary cell.

In an example embodiment, the first process may be a random access process.

In an example embodiment, the first process may be associated with bandwidth part (BWP) switching.

In an example embodiment, the wireless device may monitor the one or more second search spaces during the time window.

Figure 49:
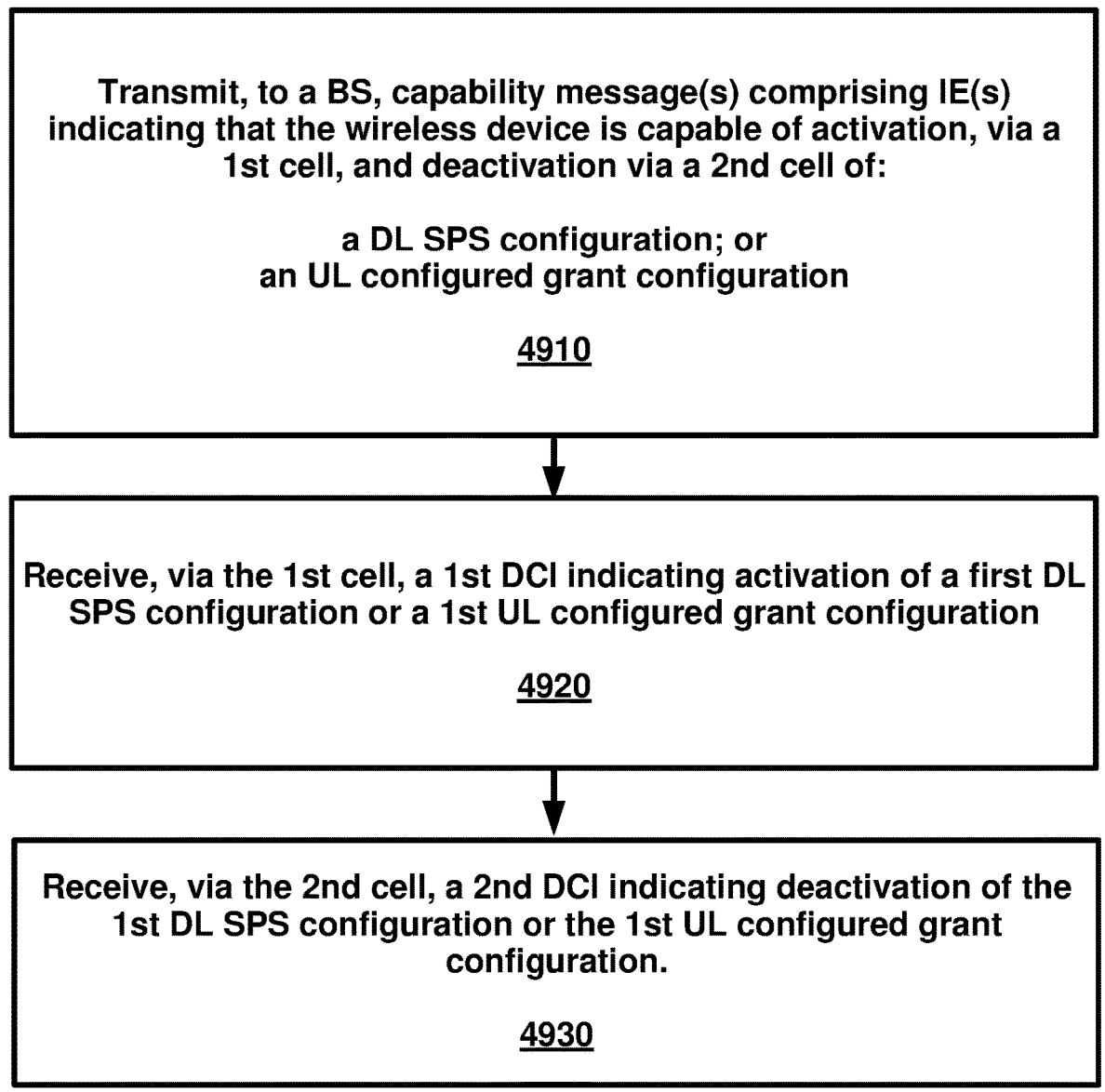
FIG. 49 shows an example flow diagram in accordance with several of various embodiments of the present disclosure.

FIG. 49 shows an example flow diagram in accordance with several of various embodiments of the present disclosure. At 4910, a wireless device may transmit, to a base station, one or more capability messages comprising one or more information elements indicating that the wireless device is capable of activation, via a first cell, and deactivation via a second cell of: a downlink semi-persistent scheduling (SPS) configuration; or an uplink configured grant configurations. At 4920, the wireless device may receive, via the first cell, a first downlink control information (DCI) indicating activation of a first downlink SPS configuration or a first uplink configured grant configuration. At 4930, the wireless device may receive, via the second cell, a second DCI indicating deactivation of the first downlink SPS configuration or the first uplink configured grant configuration.

In an example embodiment, the first cell may be one of a primary cell and a scheduling secondary cell. In an example, the scheduling secondary cell may be a scheduling cell for the primary cell.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
    receiving, by a wireless device, a first radio resource control (RRC) message comprising one or more first configuration parameters:
        indicating that a first secondary cell is a scheduling secondary cell for a primary cell; and
        comprising a search space parameter of a first search space of the first secondary cell, wherein a first value of the search space parameter indicates that the first search space is configured for monitoring to receive scheduling information for the primary cell and a second value of the search space parameter indicates that the first search space is not configured for monitoring to receive scheduling information for the primary cell;
    monitoring the first search space of the first secondary cell to receive scheduling information of the primary cell;
    receiving a second RRC message comprising one or more second configuration parameters indicating changing the scheduling secondary cell;
    activating a second secondary cell in a first timing that is:
        after a reception timing of the second RRC message; and
        based on an offset from a reference system frame number; and
    wherein, the activating is without receiving an activation command and is in response to:
        receiving the second RRC message;
        the one or more second configuration parameters indicating changing the scheduling secondary cell from the first secondary cell to the second secondary cell; and
        the second secondary cell being deactivated prior to receiving the second RRC message.

2. The method of claim 1, wherein the second RRC message is an RRC reconfiguration message.

3. The method of claim 1, further comprising starting a deactivation timer, associated with the second secondary cell, in response to receiving the second RRC message.

4. The method of claim 1, wherein the second RRC message indicates changing one or more search spaces, for receiving the scheduling information of the primary cell, from one or more first search spaces of the first secondary cell to one or more second search spaces of the second secondary cell.

5. The method of claim 1, wherein the offset is in a first number of symbols or in a first number of slots.

6. The method of claim 1, further comprising receiving a third configuration parameter indicating the offset.

7. The method of claim 1, wherein the activating the second secondary cell comprises at least one of:
    sounding reference signal (SRS) transmission via the second secondary cell;
    channel state information (CSI) reporting via the second secondary cell;
    physical downlink control channel (PDCCH) monitoring on the second secondary cell;
    PDCCH monitoring for the second secondary cell; and
    physical uplink control channel (PUCCH) transmission via the second secondary cell.

8. The method of claim 1, wherein the one or more second configuration parameters indicate an identifier of the second secondary cell as the scheduling secondary cell for the primary cell.

9. The method of claim 1, wherein the one or more search spaces are wireless device specific search spaces.

10. The method of claim 1, further comprising:
    receiving, before the reception timing, first scheduling information for an uplink transmission or a downlink transmission of a first transport block via the primary cell based on monitoring one or more first search spaces of the first secondary cell; and receiving, after the reception timing, second scheduling information for an uplink transmission or a downlink transmission of a second transport block via the primary cell based on monitoring one or more second search spaces of the second secondary cell.

11. A wireless device comprising:
one or more processors; and
memory storing instructions that, when executed by the one or more processors, cause the wireless device to:
receive a first radio resource control (RRC) message comprising one or more first configuration parameters:
indicating that a first secondary cell is a scheduling secondary cell for the primary cell; and
comprising a search space parameter of a first search space of the first secondary cell, wherein a first value of the search space parameter indicates that the first search space is configured for monitoring to receive scheduling information for the primary cell and a second value of the search space parameter indicates that the first search space is not configured for monitoring to receive scheduling information for the primary cell;
monitor the first search space of the first secondary cell to receive scheduling information of the primary cell;
receive a second RRC message comprising one or more second configuration parameters indicating changing the scheduling secondary cell;
activate a second secondary cell in a first timing that is:
after a reception timing of the second RRC message; and
based on an offset from a reference system frame number; and
wherein, the activating is without receiving an activation command and is in response to:
receiving the second RRC message;
the one or more second configuration parameters indicating changing the scheduling secondary cell from the first secondary cell to the second secondary cell; and
the second secondary cell being deactivated prior to receiving the second RRC message.

12. The wireless device of claim 11, wherein the second RRC message is an RRC reconfiguration message.

13. The wireless device of claim 11, wherein the instructions, when executed by the one or more processors, further cause the wireless device to start a deactivation timer, associated with the second secondary cell, in response to receiving the second RRC message.

14. The wireless device of claim 11, wherein the second RRC message indicates changing one or more search spaces, for receiving the scheduling information of the primary cell, from one or more first search spaces of the first secondary cell to one or more second search spaces of the second secondary cell.

15. The wireless device of claim 11, wherein the offset is in a first number of symbols or in a first number of slots.

16. The wireless device of claim 1, wherein the instructions, when executed by the one or more processors, further cause the wireless device to receive a third configuration parameter indicating the offset.

17. The wireless device of claim 11, wherein activating the second secondary cell comprises at least one of:
sounding reference signal (SRS) transmission via the second secondary cell;
channel state information (CSI) reporting via the second secondary cell;
physical downlink control channel (PDCCH) monitoring on the second secondary cell;
PDCCH monitoring for the second secondary cell; and
physical uplink control channel (PUCCH) transmission via the second first secondary cell.

18. The wireless device of claim 11, wherein the one or more second configuration parameters indicate an identifier of the second secondary cell as the scheduling secondary cell for the primary cell.

19. The wireless device of claim 11, wherein the one or more search spaces are wireless device specific search spaces.

20. The wireless device of claim 11, wherein the instructions, when executed by the one or more processors, further cause the wireless device to:
receive, before the reception timing, first scheduling information for an uplink transmission or a downlink transmission of a first transport block via the primary cell based on monitoring one or more first search spaces of the first secondary cell; and
receive, after the reception timing, second scheduling information for an uplink transmission or a downlink transmission of a second transport block via the primary cell based on monitoring one or more second search spaces of the second secondary cell.

* * * * *